(12) United States Patent
Blomquist et al.

(10) Patent No.: US 11,014,259 B2
(45) Date of Patent: May 25, 2021

(54) SPLITTER PROFILER

(71) Applicant: USNR, LLC, Woodland, WA (US)

(72) Inventors: Christopher W. Blomquist, Ridgefield, WA (US); Benjamin Owen Whitaker, Tualatin, OR (US)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 16/574,057

(22) Filed: Sep. 17, 2019

(65) Prior Publication Data

US 2020/0023540 A1     Jan. 23, 2020

Related U.S. Application Data

(63) Continuation of application No. 16/414,710, filed on May 16, 2019.

(Continued)

(51) Int. Cl.
    *B27B 5/08*            (2006.01)
    *B27B 5/06*            (2006.01)
(Continued)

(52) U.S. Cl.
CPC ................ *B27B 5/08* (2013.01); *B27B 5/063* (2013.01); *B27B 5/34* (2013.01); *B27B 31/006* (2013.01); *B27B 33/08* (2013.01)

(58) Field of Classification Search
CPC .... B27B 7/00; B27B 7/04; B27B 5/00; B27B 5/02; B27B 5/04; B27B 5/063;
(Continued)

(56) References Cited

U.S. PATENT DOCUMENTS 3,885,483 A     5/1975    Akeya
4,930,387 A     6/1990    Miettinen
(Continued)

FOREIGN PATENT DOCUMENTS

WO        WO9802286 A1     1/1998

OTHER PUBLICATIONS

Canadian Patent Application No. 3,043,783; Examination Report; dated Nov. 6, 2019.

(Continued)

*Primary Examiner* — Matthew Katcoff
(74) *Attorney, Agent, or Firm* — Schwabe Williamson & Wyatt, P.C.

(57) ABSTRACT

In various embodiments, a splitter profiler apparatus may include at least one profiler head and at least one circular saw mounted to a common arbor. The circular saw may be mounted to a saw arm, and the saw arm may be coupled with an actuator that is selectively operable to move the circular saw along the arbor. The circular saw may be used in a profiling position, in which the circular saw and profiler head are in close proximity, such that the profiler head and circular saw function collectively to form a sideboard edge with a sawn finish. The circular saw may also be used in a splitting position, in which the circular saw is at a distance from the profiler, to divide the sideboard into narrower sideboards before the sideboards are sawn from the primary workpiece. Corresponding methods and systems are also described herein.

20 Claims, 32 Drawing Sheets

Related U.S. Application Data

(60) Provisional application No. 62/672,483, filed on May 16, 2018.

(51) Int. Cl.
*B27B 5/34* (2006.01)
*B27B 31/00* (2006.01)
*B27B 33/08* (2006.01)

(58) Field of Classification Search
CPC ........... B27B 5/065; B27B 5/08; B27B 5/187; B27B 5/228; B27B 5/30; B27B 5/34; B26D 11/00; B26D 7/2635
USPC ..................... 144/39; 83/425.4, 508.3, 499
See application file for complete search history.

(56) References Cited

U.S. PATENT DOCUMENTS

| | | | |
|---|---|---|---|
| 5,579,671 A | 12/1996 | Bowlin | |
| 7,134,372 B2 * | 11/2006 | Flaherty | B23D 35/004 83/425.4 |
| 7,451,790 B2 † | 11/2008 | Vallebrant | |
| 7,861,754 B2 * | 1/2011 | Mitchell | B27B 7/04 144/382 |
| 9,358,699 B2 * | 6/2016 | Dockter | B27B 25/04 |
| 9,993,933 B2 † | 6/2018 | Blomquist | |
| 10,850,423 B2 * | 12/2020 | Rautio | B27B 7/04 |
| 2005/0011328 A1 | 1/2005 | McGehee et al. | |
| 2005/0109423 A1 | 5/2005 | Woodford et al. | |
| 2011/0219930 A1 | 9/2011 | Bailey | |
| 2014/0244023 A1 | 8/2014 | Saastamo | |
| 2016/0288354 A1 | 10/2016 | Blomquist | |

OTHER PUBLICATIONS

PCT Application PCT/US2019/032741; Int'l Search Report & Written Opinion dated Sep. 20, 2019; 13 pgs.
PCT Application PCT/US2019/032741; Int'l Preliminary Report on Patentability; dated Nov. 26, 2020.
U.S. Appl. No. 16/414,710; Restriction Requirement; dated Dec. 14, 2020.
"Millwide Insider", 1-28, 2013, USNR.†

\* cited by examiner
† cited by third party

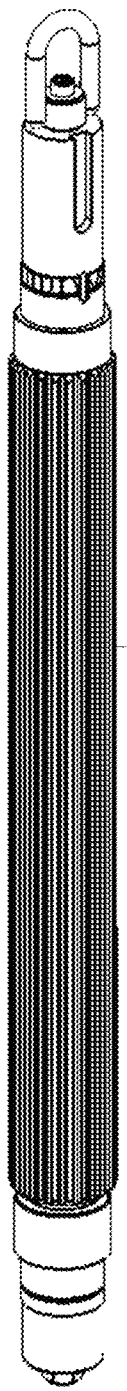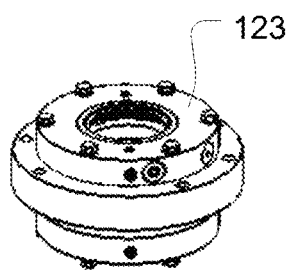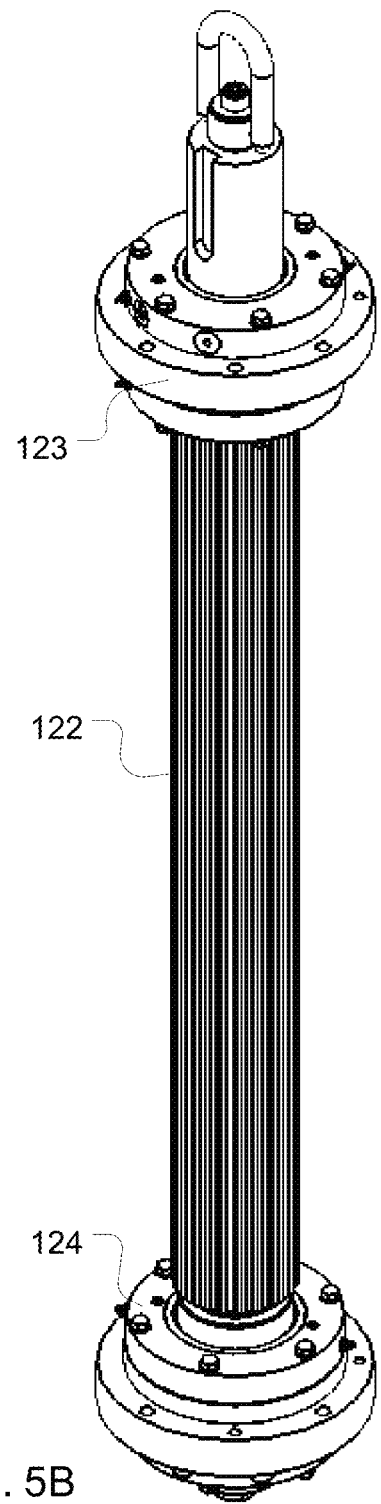
FIG. 5A  FIG. 5B

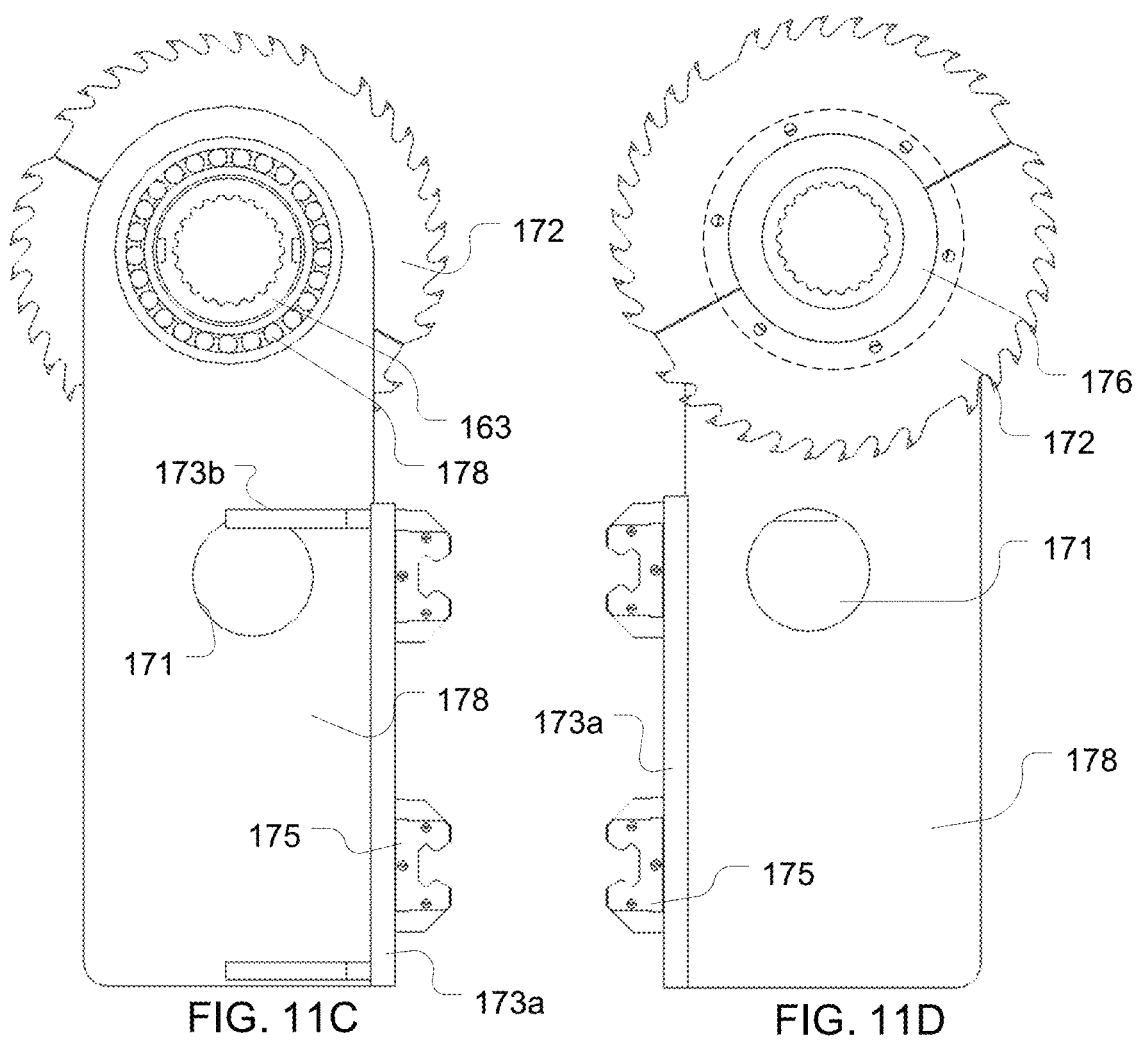
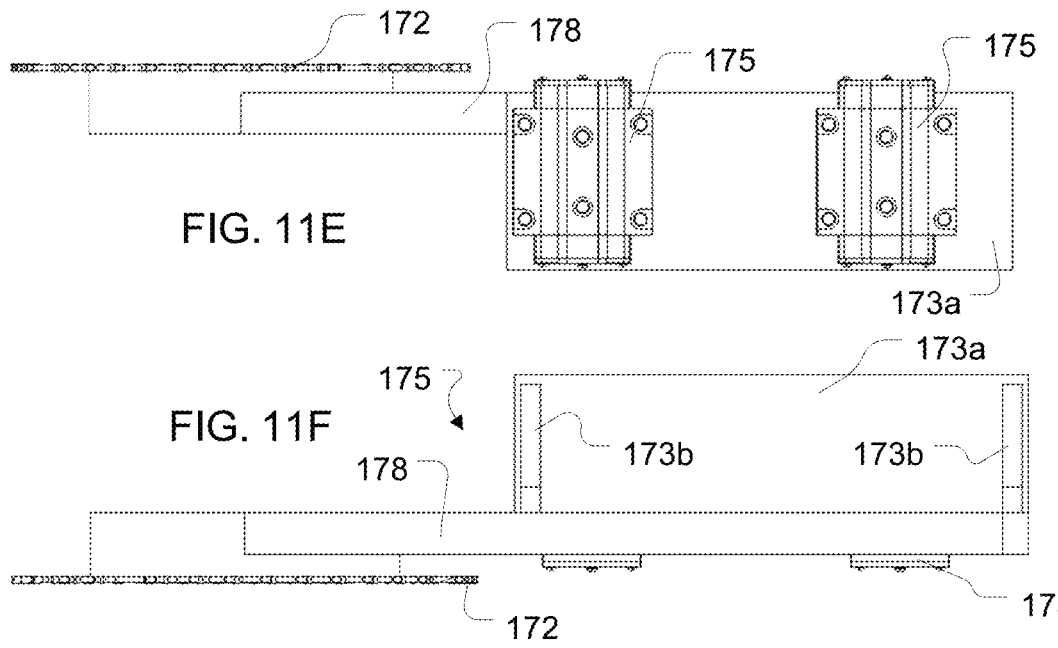

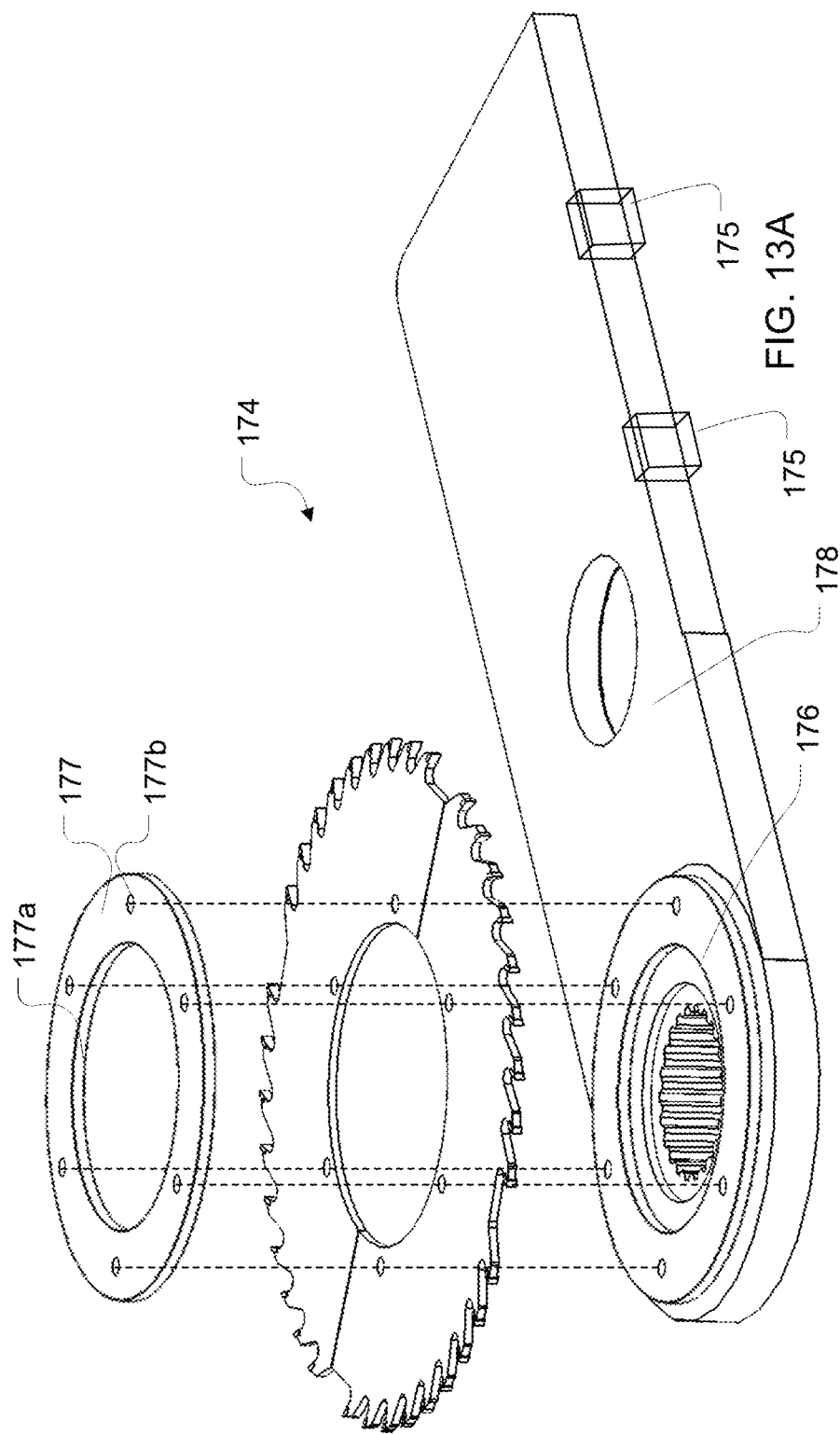

SPLITTER PROFILER

CROSS-REFERENCE TO RELATED APPLICATIONS

This application is a continuation of U.S. patent application Ser. No. 16/414,710 filed May 16, 2019, which claims the benefit of U.S. Provisional Patent Application Ser. No. 62/672,483 filed May 16, 2018, both titled "Splitter Profiler," the entire disclosures of which are hereby incorporated by reference.

BACKGROUND

Large commercial sawmills cut logs into boards in stages. In some sawmills, the logs are transported through a series of machine centers along a primary breakdown line to cut the log into a center cant and one or more sideboards. Some primary breakdown lines have a chipper that opens a flat face along the log and a downstream saw center that cuts longitudinally through the log, parallel to the flat face, to release a flitch with planar faces and wane edges. The flitch is then diverted to an edger along a secondary breakdown line to be cut into the desired sideboard. In this scenario, the edger forms the longitudinal edges of the sideboard.

Edgers typically require at least one human operator. Edgers can also be significantly more expensive to purchase and maintain than profilers. Thus, some mills have reduced operating costs by installing a profiler along the primary breakdown line between the chipper and the saw and eliminating the edger along the secondary breakdown line. In these processing lines, the profiler chips the log or cant to form the longitudinal edges of the desired sideboard, thereby forming a profile of the sideboard, and the downstream saw center cuts the sideboard from the remaining cant.

While eliminating the edger may eliminate some costs, it may also reduce the number of board combinations that can be obtained from the log.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 5A and 5B are perspective views of an arbor and bearing assemblies for a splitter profiler module;

FIGS. 11A-F illustrate an example of a saw arm assembly for a splitter profiler module;

FIGS. 13A-D illustrate another example of a saw arm assembly and a corresponding example of a splitter profiler module, with some parts removed for clarity;

DETAILED DESCRIPTION OF DISCLOSED EMBODIMENTS

Figure 1A:
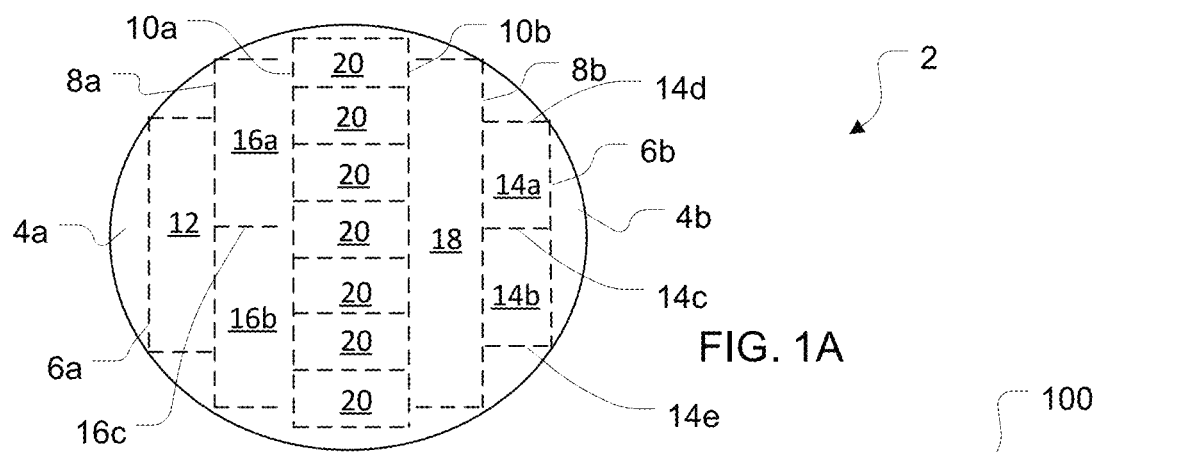
FIG. 1A illustrates a schematic view of a cut solution.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In the description below, the term "circular saw blade" encompasses generally annular saw blades and 'split' circular/annular saw blades (e.g., blades having multiple sections that can be combined to form a generally annular saw blade).

The present disclosure describes embodiments of methods, apparatuses, and systems for forming multiple sideboards simultaneously along a primary workpiece, such as a log or a cant. In exemplary embodiments, a computing device may be endowed with one or more components of the disclosed apparatuses and/or systems and may be employed to perform one or more methods as disclosed herein.

In various embodiments, a splitter saw may include a saw arm assembly. The saw arm assembly may include a saw arm and a saw sleeve assembly. The saw sleeve assembly may include a first portion configured to slideably engage an arbor such that the first portion is rotatable with, and movable axially along, the arbor. The saw sleeve assembly and/or the first portion thereof may be configured to be coupled to a circular saw blade. A second portion of the saw sleeve assembly may be configured to retain the first portion while permitting rotation of the first portion with the arbor. Optionally, the first portion may be a bushing or sleeve bearing, and the second portion may be a rotary bearing (e.g., a rolling-element bearing). The saw arm may be configured to retain the second portion of the sleeve assembly. Optionally, the saw arm may have one or more guides configured to moveably engage a corresponding one or more guide members. The guide member(s) may help to guide the saw arm along a path of movement generally parallel to the arbor as the saw sleeve assembly moves axially along the arbor.

In various embodiments, a splitter profiler apparatus for forming multiple sideboards may include a pair of splitter profiler modules. Each of the splitter profiler modules may include a frame, a first profiler assembly, and a first saw assembly. The frame may be configured to accommodate an arbor rotatably mounted to the frame. The first profiler assembly may include a profiler arm assembly configured to removably retain a first profiler head rotatably mounted thereto. Likewise, the first saw assembly may include a saw arm assembly configured to removably retain a first circular saw rotatably mounted thereto. The first circular saw assembly may be configured to be movably coupled with the frame and the arbor, such that it is movable along the arbor. In some embodiments, the first profiler arm assembly may also be configured to be movably coupled with the frame and arbor such that it is movable along the arbor.

In some embodiments, the splitter profiler module may further include a second profiler assembly that includes a second profiler arm assembly configured to removably retain a second profiler head rotatably mounted thereto. In such embodiments, the second profiler arm assembly may optionally be configured to be movably coupled with the frame and the arbor, such that it is also movable along the arbor. In other embodiments the second profiler assembly may be omitted.

In various embodiments, the first saw arm assembly may be coupled with a corresponding actuator that is selectively operable to move the saw arm assembly in opposite directions along the arbor. The actuator may be coupled with the frame in some embodiments. Alternatively, the actuator may be coupled with the first profiler arm assembly. In some embodiments, the first and/or second profiler arm assembly may also be coupled with a corresponding actuator that is selectively operable to move the profiler arm assembly in opposite directions along the arbor.

In various embodiments, the first saw arm assembly may be movable along the arbor between a profiling position and one or more splitting positions to thereby move the first circular saw between corresponding saw positions. With the first saw arm assembly in the profiling position, the first circular saw may be in contact with, or in close proximity to (e.g., within 2 millimeters of), the corresponding side of the first profiler head. In each of the splitting positions, the first circular saw may be spaced apart from the profiler head along the arbor by a corresponding distance. In some embodiments the splitting position(s) may be fixed relative to the frame or arbor or may be at fixed increments relative to the first profiler head/arm. In other embodiments, the first saw arm assembly (and thus the position of the circular saw) may have a range of motion along the arbor and may be positionable at any location within that range. In embodiments in which the position of the first profiler arm assembly along the arbor is variable, the profiling position and the range of motion of the first saw arm assembly may also be variable.

In operation, a splitter profiler module may be used to form the profile of a sideboard along one side of a primary workpiece, such as a log or a cant. The profiler head and the circular saw may be used with the circular saw in the splitting position to collectively form one of the longitudinal edges of the sideboard. In this configuration the circular saw may produce a sawn finish along that longitudinal edge. Alternatively, the circular saw may be used in a splitting position. In that case, as the profiler head chips material from the primary workpiece to form a longitudinal edge of the sideboard, the circular saw may cut longitudinally along the primary workpiece to thereby divide the profile into two sideboard profiles. In other words, while the profiler head forms the outer longitudinal edge of a first sideboard, the circular saw forms the inner longitudinal edge of the first sideboard and the inner longitudinal edge of a second sideboard that is coplanar with the first sideboard. In either case, a second profiler head may form the remaining longitudinal edge, and a downstream saw may cut through the workpiece to sever the sideboard(s) from the remaining cant.

In some embodiments the diameter of the first circular saw may be substantially equal to the diameter of the first profiler head. In other embodiments the diameter of the first circular saw may be slightly less than the diameter of the first profiler head, and the difference in diameters may be less than or equal to the width of the kerf produced by the downstream saw.

In various embodiments, one splitter profiler module of the pair may be substantially the mirror image of the other with respect to the frame, first profiler assembly, first saw assembly, and arbor. However, those with ordinary skill in the art will readily appreciate that the modules of a pair may differ in some respects to accommodate surrounding machinery, walkways, safety or maintenance requirements, and the like. Such embodiments are contemplated and encompassed herein.

The splitter profiler modules may be positionable on opposite sides of a workpiece feed axis to thereby chip/cut opposite sides of workpieces traveling along the flow path. Optionally, the splitter profiler modules of the pair may be operatively coupled with a control system configured to control both modules.

In some embodiments, an existing profiler module may be converted to a splitter profiler module by coupling at least one saw arm assembly with the frame and/or arbor of the existing profiler module. The saw arm assembly may also be operatively coupled with an actuator system and/or a control system configured to move the saw arm assembly to a desired position along the arbor. Likewise, an existing profiler apparatus or system may be converted to a splitter profiler apparatus by coupling at least one saw arm assembly with the frame and/or arbor of at least one of the profiler modules. Again, the saw arm assembly may also be operatively coupled with an actuator system and/or or a control system. Optionally, a second profiler module of the same profiler apparatus/system may also be modified in the same manner.

In some embodiments, a splitter profiler module may have two or more circular saws and saw arm assemblies. Such embodiments may be operable to form the profiles of three or more coplanar sideboards along the primary workpiece. For example, in some embodiments a saw arm assembly or some portion thereof may be configured to nest at least partially within or next to a corresponding portion of a profiler arm assembly or second saw arm assembly. This may decrease the minimum distance between the corresponding circular saw and the profiler head or second circular saw, thereby enabling the formation of relatively narrow sideboards along the primary workpiece.

Embodiments of apparatuses, systems, and methods for profiling sideboards along a primary workpiece are described in further detail below with reference to the Figures.

In various embodiments a cut solution for a primary workpiece (e.g., a log or a cant) may define one or more desired sideboards to be cut from a side of the primary workpiece. Some cut solutions may also define other cut products such as an additional sideboard(s), a center cant, and/or center boards. Typically, a cut solution defines cut products by defining a group of predicted cut lines along which the primary workpiece is to be cut (e.g., chipped and/or sawn) to obtain the cut products.

FIG. 1A illustrates an example of a cut solution for a log 10. In this example, the cut solution defines predicted cuts (dashed lines) required to cut log 10 into outer sideboards 12, 14a, and 14b, inner sideboards 16a, 16b, and 18, and center boards 20. Outer sideboards 14a and 14b are coplanar, and inner sideboards 16a and 16b are also coplanar. In a mill with an edger but no profiler, this cut solution would be implemented by cutting flitches from the log and cutting the flitches into the desired boards. A mill with a profiler and no edger might be unable to implement this cut solution, and might instead profile only a single sideboard in place of sideboards 14a and 14b, and another single sideboard in place of sideboards 16a and 16b.

However, providing at least one splitter profiler module or splitter profiler apparatus along a primary breakdown line may enable the production of coplanar sideboards along the primary breakdown line without the use of an edger. In some embodiments, a primary breakdown line may be provided with two splitter profiler apparatuses (see e.g., FIG. 1D) to form the outer and inner sideboards, respectively, along opposite sides of a cant. In other embodiments, a primary breakdown line may be provided with only one splitter profiler apparatus (see e.g., FIG., 1E). For example, one splitter profiler apparatus may be provided along a primary breakdown line if only outer sideboards are desired, or if the primary breakdown line has (or is modified to have) means for sending the cant through the splitter profiler apparatus multiple times. In some embodiments a primary breakdown line may be provided with a splitter profiler module, as opposed to a splitter profiler apparatus. For example, if the primary breakdown line includes a log carriage that is used to move the cant through cutting equipment multiple times, a splitter profiler module may be provided along one side of the flow path. The splitter profiler module may be used to form the desired sideboard(s) along the primary workpiece as the primary workpiece is moved back and forth on the carriage. In that case, if the primary breakdown line includes means for turning the log on the carriage, the splitter profiler module may be used to form the desired sideboard(s) on multiple sides of the primary workpiece. Similarly, in other embodiments the primary workpiece may remain stationary as the splitter profiler module is moved along the primary workpiece, or the primary workpiece and the splitter profiler module may be moved simultaneously in opposite directions.

Figure 1B:
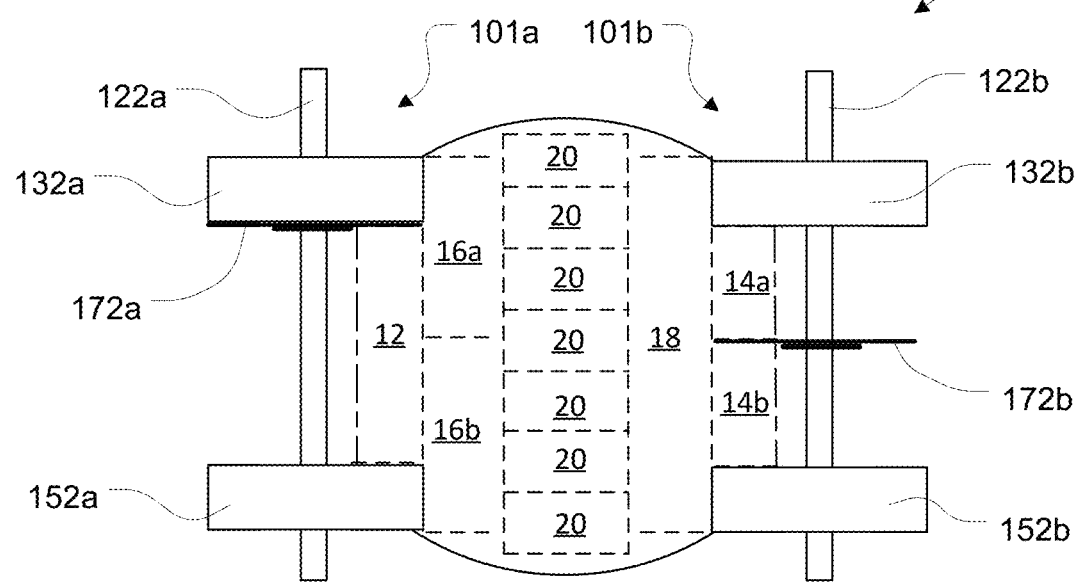
FIGS. 1B and 1C illustrate schematic views of portions of splitter profiler components in operation to implement the cut solution of FIG. 1A.
Figure 1C:
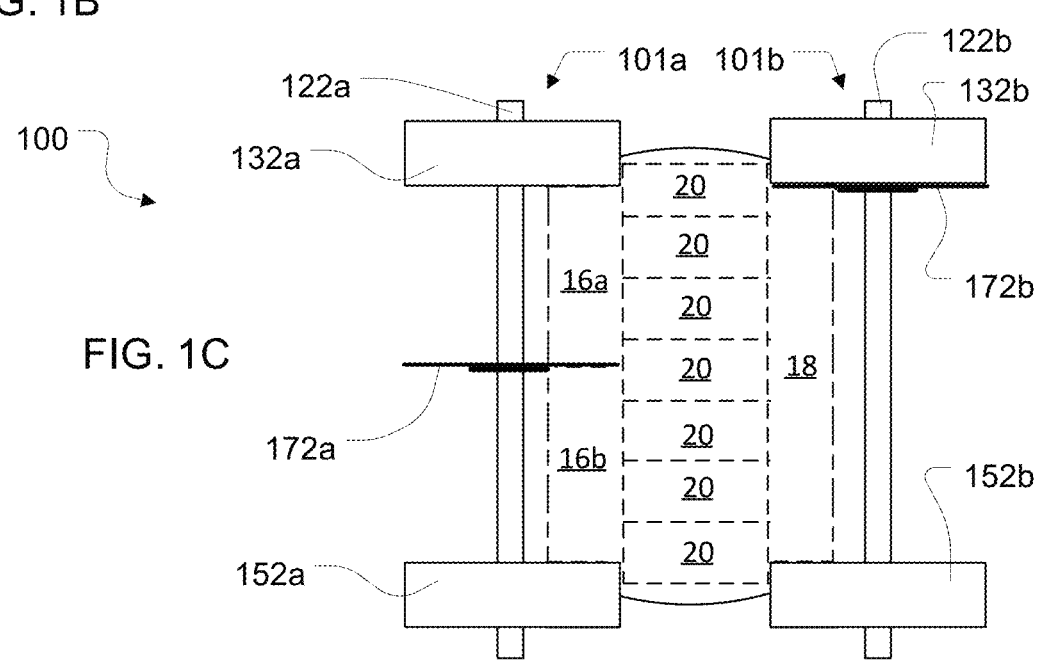
Figure 1D:
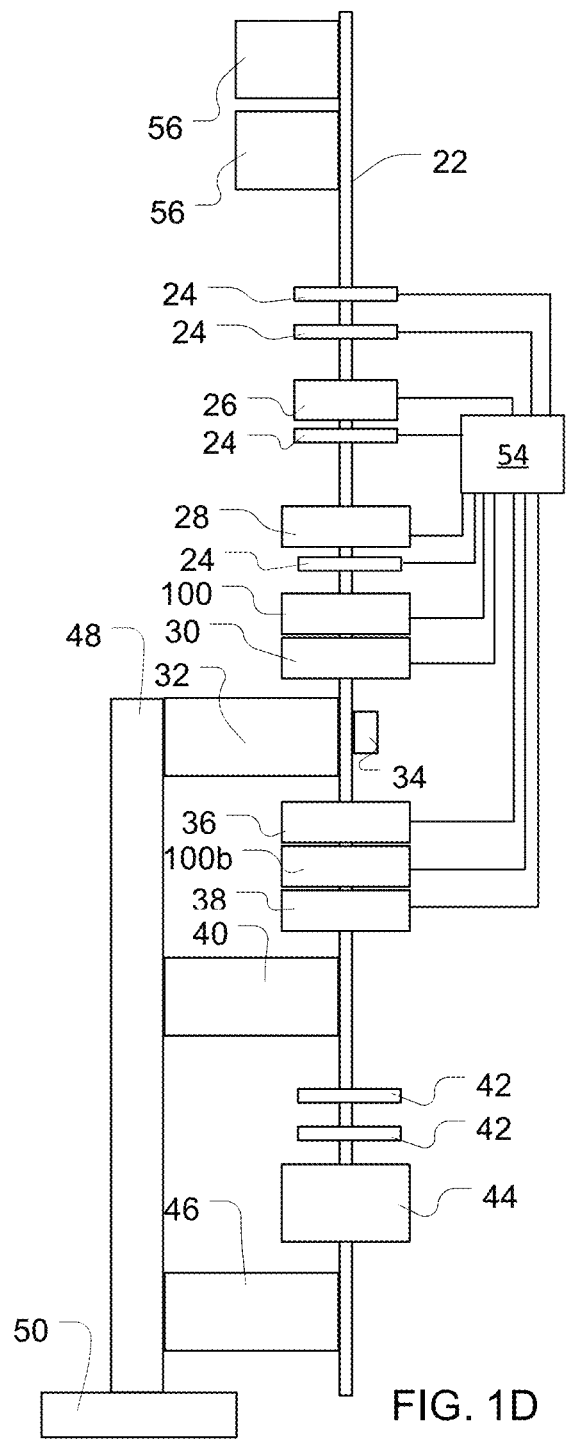
FIGS. 1D and 1E illustrate schematic views of examples of primary breakdown lines with dual and single splitter profiler apparatuses, respectively.
Figure 1E:
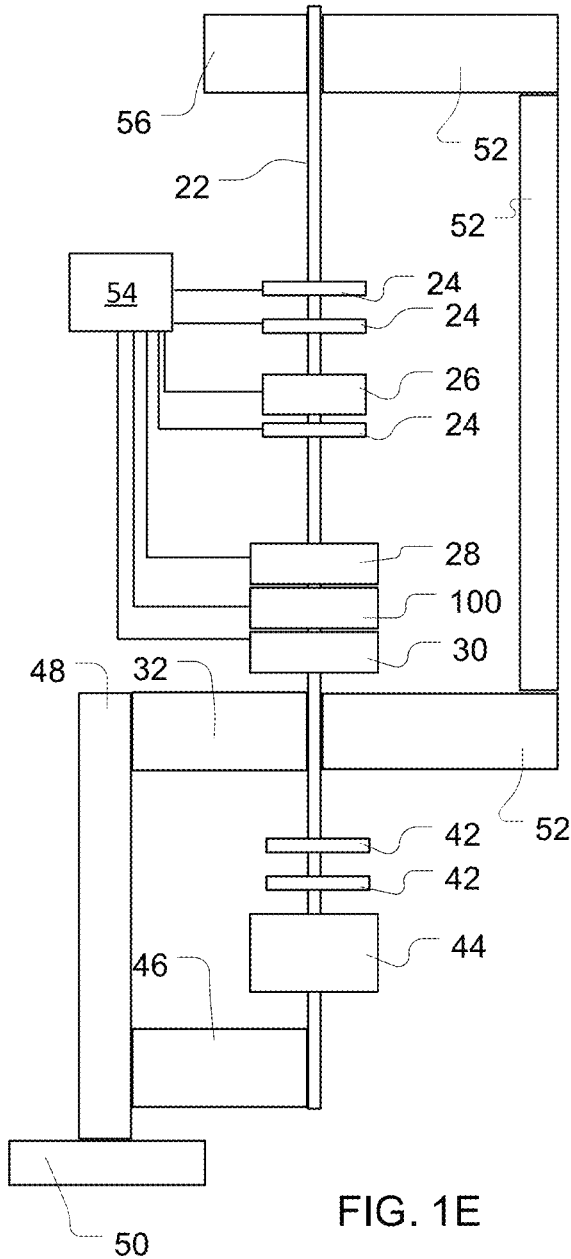

As shown by way of example in FIGS. 1D and 1E, in various embodiments a primary breakdown processing line may include a splitter profiler apparatus 100 and other machinery arranged along a conveyor system 22. For example, a processing line may include one or more sensors 24, a log rotator 26 downstream of at least one sensor 24, a first chipper 28 downstream of log rotator 26, a first splitter profiler apparatus 100 downstream of first chipper 28, and a first saw center 30 downstream of first splitter profiler apparatus 100. Some embodiments may also include a computer system 54 operatively coupled with the splitter profiler apparatus 100. Optionally, computer system 54 may also be coupled with sensor(s) 24, log rotator 26, first chipper 28, and/or first saw center 30). In some embodiments, the processing line may also include a first sideboard conveyor 32 downstream of first saw center 30.

As shown for example in FIG. 1D, some embodiments of a processing line may further include a second chipper 36 downstream of first saw center 30, a second splitter profiler apparatus 100b downstream of second chipper 36, and a second saw center 38 downstream of second splitter profiler apparatus 100b. In such embodiments, computer system 54 may also be operatively coupled with the second splitter profiler module (and optionally, second chipper 36 and/or second saw center 38). Some embodiments may further include a second sideboard conveyor 40 downstream of the second saw center 38 and/or a cant turner 34 between first saw center 30 and second chipper 36.

As shown for example in FIG. 1E, other embodiments may lack second chipper 36, second splitter profiler apparatus 100b, and/or second saw center 38. Optionally, some such embodiments may have means for returning cants to a portion of conveyor system 22 upstream of the first chipper 28 (and optionally, upstream of log turner 26 and/or sensor(s) 24), such as recirculating conveyor 52 or conveyor system 22 (e.g., if an upstream portion of the conveyor system includes a log/cant carriage or a conveyor that is operable in opposite directions). This may enable the mill to send the primary workpiece through the first splitter profiler apparatus 100 twice to obtain outer and inner sideboards, respectively. Alternatively, means for returning cants to an upstream location for a second pass through the first splitter profiler apparatus may be omitted (e.g., if the mill does not wish to cut inner sideboards). Similarly, in some embodiments the conveyor system 22 may include a log carriage, and the first splitter profiler apparatus 100 may instead be a splitter profiler module positioned along one side of the log carriage/conveyor system.

Regardless, some processing lines may further include other features, such as one or more log infeed conveyors 56 along an upstream end of conveyor system 22, a gang saw 44 downstream of the sideboard conveyor(s), a center board conveyor 46 downstream of gang saw 44, and/or one or more additional scanners 42. Scanner(s) 42 may be positioned between the first saw center 30 and the gang saw 44, or positioned elsewhere along conveyor system 22 (e.g., between chipper 28 and first splitter profiler apparatus 100).

Optionally, additional equipment may be provided along the processing line, or along a secondary processing line. For example, in some embodiments a secondary processing line may include a trimmer infeed 48 positioned to accept sideboards from the sideboard conveyor(s) and/or center board conveyor, and a trimmer 50 downstream of trimmer infeed 48. Processing lines may further include other machinery such as feed/positioning rolls, skid bars, lift skids, and other devices for moving or positioning the workpieces and/or portions of the processing line (e.g., cutting devices, conveyors, etc.).

With the exception of splitter profiler apparatus 100, 100b, and computer system 54, any or all of the machine centers and other equipment may be conventional machines. For example, conveyor system 22 may include a flighted chain conveyor followed by a sharp chain conveyor (e.g., with the conveyor interface near the log turner 26), or may be or include a log carriage. Sensor(s) 24 may include laser triangulation sensors and/or vision sensors (and optionally, x-ray sensors or other types of sensors). Log turner 26 may be a dual or quad roll, ring-type, or chain log turner. Each of the chippers 28 and 36 may be a conventional chipper canter with conical or drum chip heads, or a conventional slabber or saw, that is operable to open one or more flat faces along the log. Each of the saw centers 30 and 38 may be a band saw, a twin or quad bandmill, one or more circular saws (e.g., a quad arbor saw with circular saws mounted on corresponding saw arbors), or any other suitable type of saw.

Computer system 54 may include one or more computers (e.g., personal computers and/or programmable logic controllers (PLCs)) programmed to perform various operations as described further below. Optionally, computer system 54 may further include other devices such as position sensors (e.g., encoders, resolvers, magnetic/probe-type position sensors, light curtains, photo-eyes, vision cameras, etc.), motion controllers, and/or other devices known for use to detect or control the position of a workpiece, a machine, or a component of a machine.

In some embodiments, portions of the splitter profiler apparatus 100 may also be conventional. For example, an existing profiler apparatus may be modified to form a splitter profiler apparatus. The existing profiler apparatus may have a pair of profiler modules mounted to a base (e.g., a track or rail), with each of the profiler modules having a frame, and arbor rotatably mounted to the frame, and one or more profiler heads mounted along the arbor such that they are driven in rotation by the rotation of the arbor. Each of the profiler modules may be selectively movable along the track or rail, and one or more (or all) of the profiler heads may be selectively movable along the respective arbors. The profiler heads may be driven in rotation and selectively repositioned during operation to remove portions of wood from a primary workpiece, such as a log or a cant, to thereby form the profile of a sideboard along the primary workpiece. In various embodiments, the existing profiler apparatus may be modified to form a splitter profiler apparatus by movably coupling a saw arm assembly with the existing frame and/or arbor of one of the profiler modules. The saw arm assembly may also be coupled with an actuator/controller configured to reposition the saw arm assembly along the arbor. Optionally, the other profiler module may be modified in the same manner.

In various embodiments, a processing line with a splitter profiler apparatus may be used to implement a cut solution that defines coplanar sideboards. For example, a processing line as shown in FIGS. 1D-E may be used to implement the cut solution shown in FIG. 1A generally as follows.

Log 10 may be transported on log infeed conveyor 56 to an upstream end of conveyor system 22, which may convey log 10 through sensors 24. Computer system 54 may use scan data from sensors 24 to determine a cut solution and a corresponding rotational (and optionally, skew/slew) position for log 10. Log turner 26 may turn (and optionally, skew/slew) the log to the desired position. To cut the log 10 according to the cut solution shown in FIG. 1A, first chipper 28 may chip opposite sides of the log along planes 6a and 6b to open flat faces along the log.

Referring now to FIG. 1B, the resulting cant may be conveyed through first splitter profiler apparatus 100. Splitter profiler apparatus 100 may include two splitter profiler modules 101a and 101b positioned on opposite sides of the workpiece feed path. (Alternatively, a single splitter profiler module may be provided along one side of the feed path instead.) Examples of splitter profiler modules are described in further detail below.

Splitter profiler module 101a may include a first arbor 122a, means for mounting a first pair of profiler heads 132a and 152a along first arbor 122a, and means for mounting a first circular saw 172a along first arbor 122a between profiler heads 132a and 152a. Splitter profiler module 101b may include a second arbor 122b, means for mounting a second pair of profiler heads 132b and 152b along the second arbor 122b, and means for mounting a second circular saw 172b along second arbor 122b between profiler heads 132b and 152b. Preferably, the means for mounting the profiler heads and circular saws are configured to be axially movable along the arbor. Optionally, one or both of the circular saw blades may be a split saw blade with multiple segments (e.g., halves, thirds, quarters, etc.) that collectively form an annular blade. Using split saw blades may allow the operator to replace worn or damaged blades or segments without removing the arbor, profiler head(s), or other large components of the splitter profiler module. Although the Figures show the arbors in a vertical orientation, in other embodiments one or both of the arbors may be in a horizontal orientation or angled relative to the vertical/horizontal.

First splitter profiler apparatus 100 may be used to form the profile of the outer sideboards 12, 14a, and 14b along the open faces of the cant as the cant is moved along the flow path. Because outer sideboard 12 is a single sideboard, circular saw 172a may be used in the profiling position, cooperating with profiler head 132a to form one longitudinal edge of outer sideboard 12 while profiler head 152a forms the other longitudinal edge of that sideboard. In contrast, because outer sideboards 14a and 14b are coplanar, circular saw 172b may be used in a splitting position to form the inner longitudinal edges of outer sideboards 14a and 14b (along the plane of predicted cut line 14c) while the corresponding profiler heads 132b and 152b form the remaining outer longitudinal edges of the outer sideboards 14a and 14b (along the planes of predicted cut lines 14d and 14e), respectively. First saw center 30 may cut through the cant along the planes of predicted cut lines 8a and 8b to sever the outer sideboard 12 and outer sideboards 14a and 14b, respectively, from the remaining portion of the cant.

Referring now to FIG. 1C, the remaining portion of the cant may be conveyed through the second splitter profiler apparatus 100b, or conveyed again through the first splitter profiler apparatus 100, to form the profile of the inner sideboards 16a, 16b, and 18 along the open faces of the cant. Because inner sideboards 16a and 16b are coplanar, circular saw 172a may be used in a splitting position to form the inner longitudinal edges of inner sideboards 16a and 16b while profiler heads 132a and 152a form the outer longitudinal edges of inner sideboard 16a and 16b, respectively. And because inner sideboard 18 is a single sideboard, circular saw 172b may be used in the profiling position, such that circular saw 172b and profiler head 132b collectively form one longitudinal edge of inner sideboard 18 while profiler head 152b forms the other longitudinal edge of that sideboard. Second saw center 38 (or first saw center 30, if the cant was conveyed through the first splitter profiler apparatus again) may cut the cant along the planes of predicted cut lines 10a and 10b to sever the inner sideboards 16a and 16b and inner sideboard 18, respectively, from the remaining center cant. The remaining center cant may be conveyed through gang saw 44 to be sawn into center boards 20, and the sideboards and center boards may be conveyed to trimmer 50 to be trimmed to the desired lengths.

FIGS. 2A-12C illustrate an embodiment of splitter profiler module 101. Other embodiments of a splitter profiler module are illustrated in FIGS. 13A-D and 14A-E, respectively. Again, a splitter profiler apparatus may include a pair of splitter profiler modules that are substantially mirror images of one another with respect to their frames, profiler and saw assemblies, and arbors. Thus, for ease of description only one splitter profiler module is illustrated in those figures. FIG. 15 illustrates an embodiment of a splitter profiler apparatus and system.

Figure 2A:
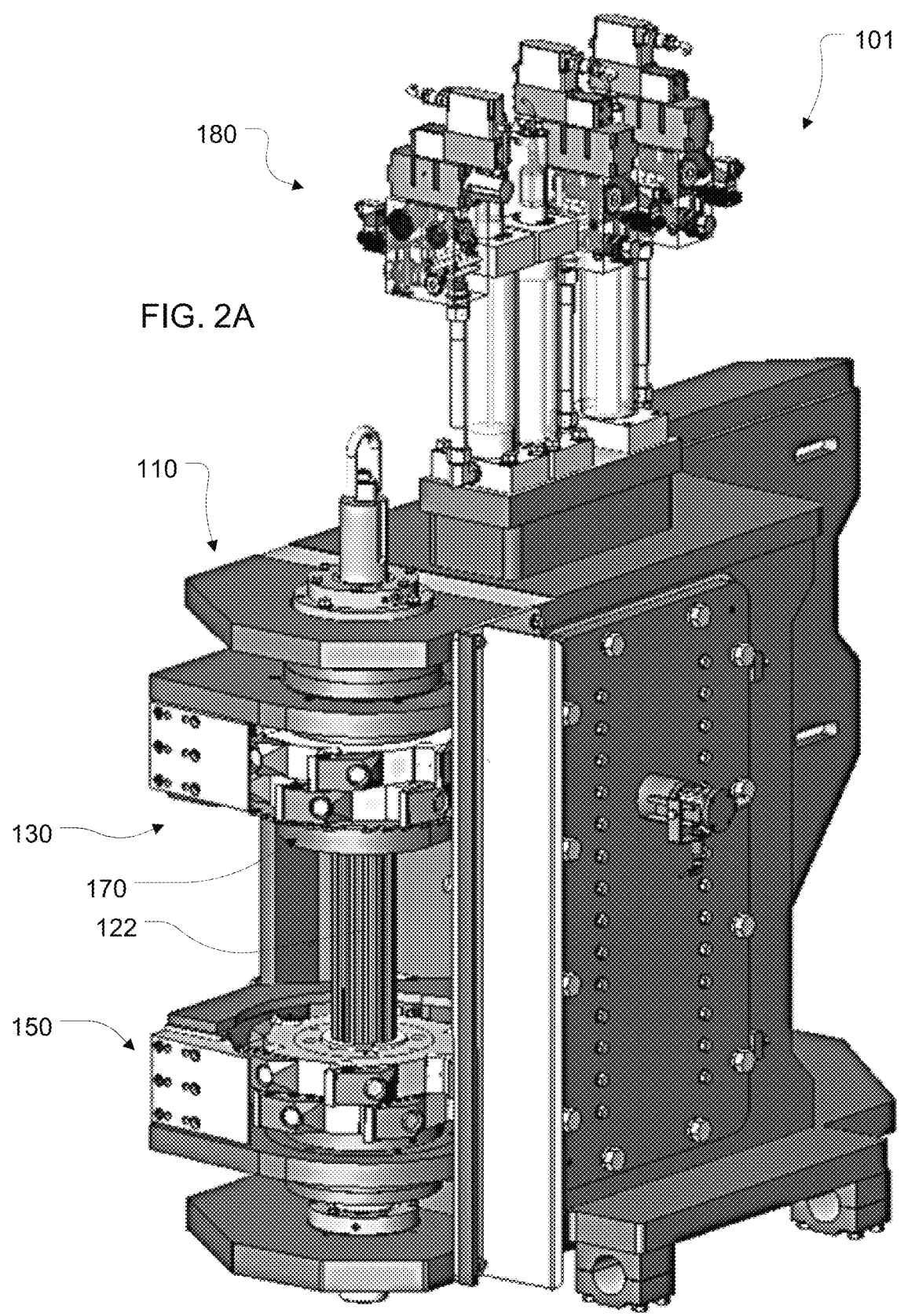
FIGS. 2A and 2B are perspective views of an embodiment of a splitter profiler module with the circular saw shown in a profiling position and in a splitting position, respectively.
Figure 2B:
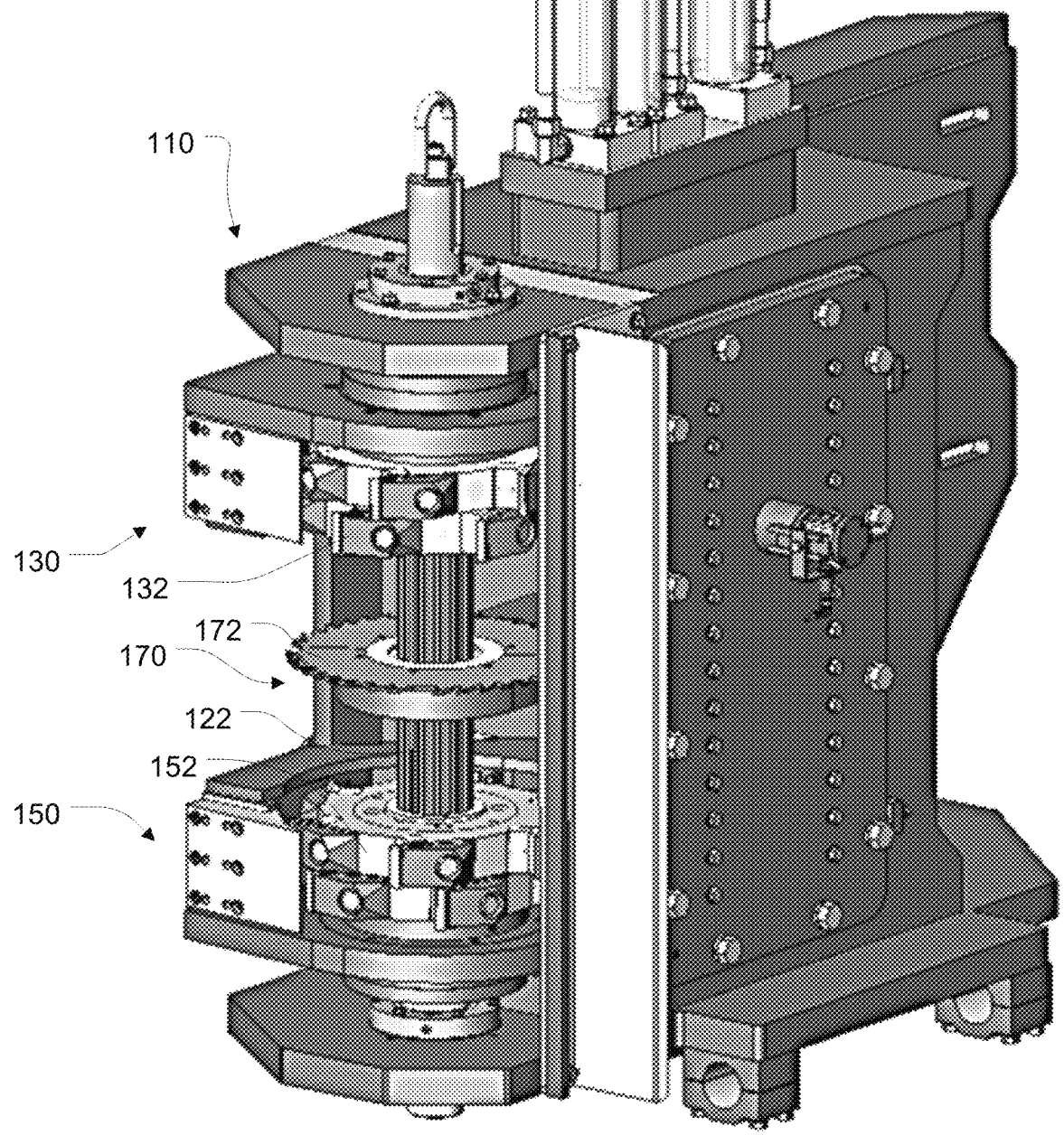

Referring first to FIGS. 2A-B, splitter profiler module 101 may include a frame 110, an arbor 122 rotatably mounted to the frame 110, a first profiler assembly 130, a second profiler assembly 150, and a first circular saw assembly 170 mounted along the arbor 122. Splitter profiler module 101 may further include an actuator assembly 180 coupled with the frame 110.

First profiler assembly 130 may include a first profiler arm assembly 134 configured to be movably coupled with the frame 110 and arbor 122. Optionally, first profiler assembly 130 may further include first profiler head 132, which may be rotatably coupled to first profiler arm assembly 134. Likewise, second profiler assembly 150 may include a second profiler arm assembly 154 configured to be movably coupled with frame 110 and arbor 122. Optionally, second profiler assembly 150 may further include second profiler head 152, which may be rotatably coupled to second profiler arm assembly 154. First circular saw assembly 170 may include a first saw arm assembly 174 configured to be movably coupled with frame 110 and arbor 122. In some embodiments, first saw arm assembly 174 may be disposed substantially between first and second profiler arm assemblies 134 and 154. Optionally, first circular saw assembly 170 may further include first circular saw 172, which may be rotatably coupled to first saw arm assembly 174.

Figure 3:
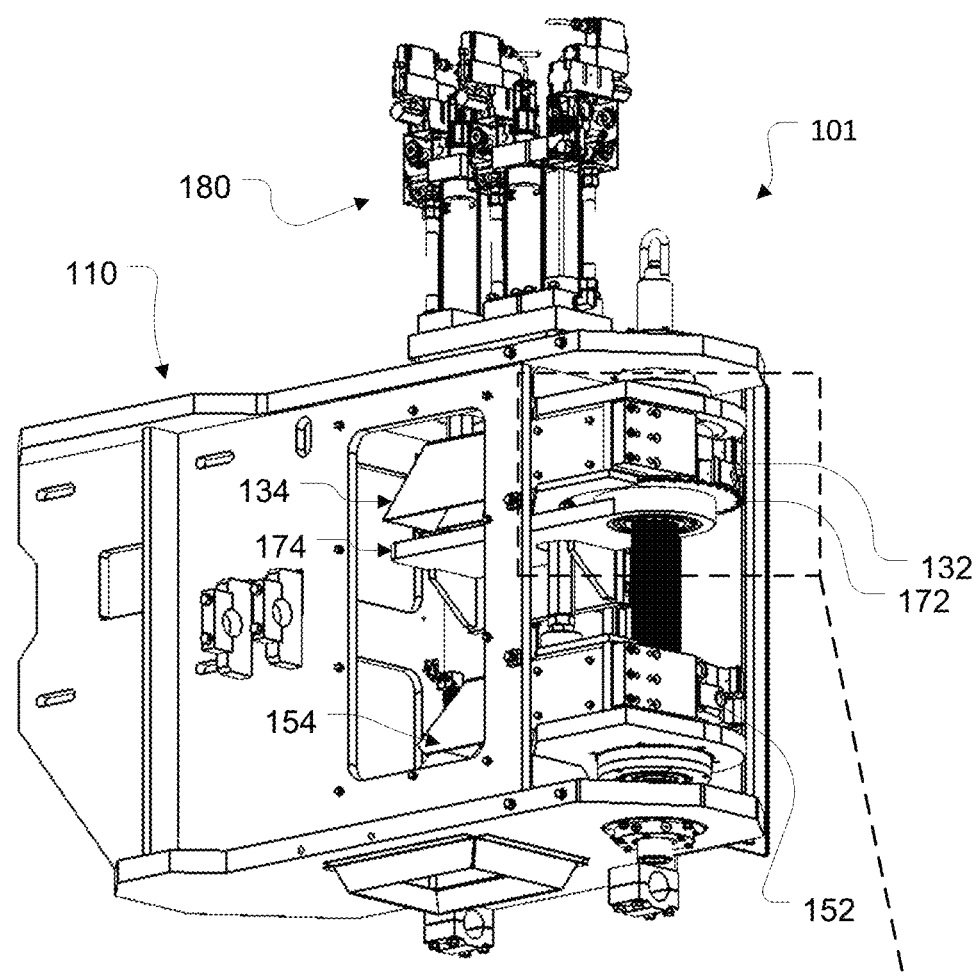
FIG. 3 is another perspective view of the splitter profiler module of FIGS. 1A-B.
Figure 3:
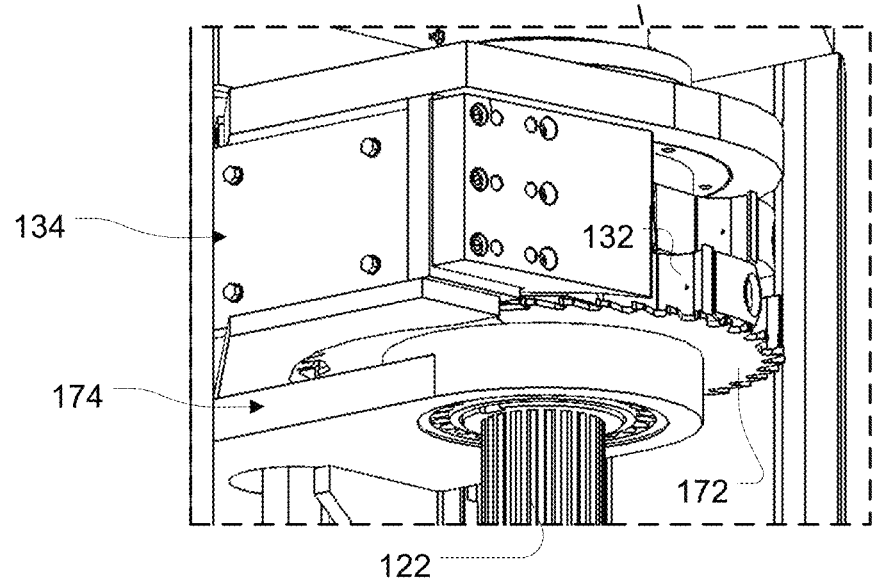

Saw arm assembly 174 may be movable in opposite directions relative to the frame 110, along a path of travel that is generally parallel to the rotational axis of arbor 122, between a profiling position (FIG. 2A) and one or more splitting positions (FIG. 2B) to thereby move first circular saw 172 along arbor 122 between corresponding saw positions. As best shown in FIG. 3, when saw arm assembly 174 is in the profiling position, first circular saw 172 may be in contact with, or in close proximity to (e.g., within 2 millimeters of), a surface of first profiler head 132. In some embodiments, either or both of the profiler arm assemblies 134 and 154 may also be movable in opposite directions along the same or parallel paths of travel as saw arm assembly 174 to thereby move the corresponding profiler head(s) 132/152 along arbor 122. In some such embodiments, the profiler arm assemblies may be movable independently of one another. Alternatively, in other embodiments the profiler arm assemblies may be coupled or controlled to move synchronously toward and away from a reference location, such as a feed axis or a longitudinal centerline of a profile to be formed. As another alternative, one of the profiler arm assemblies may be fixed in position relative to the frame and the other profiler arm assembly may be movable independently of the fixed profiler arm assembly.

Figure 4A:
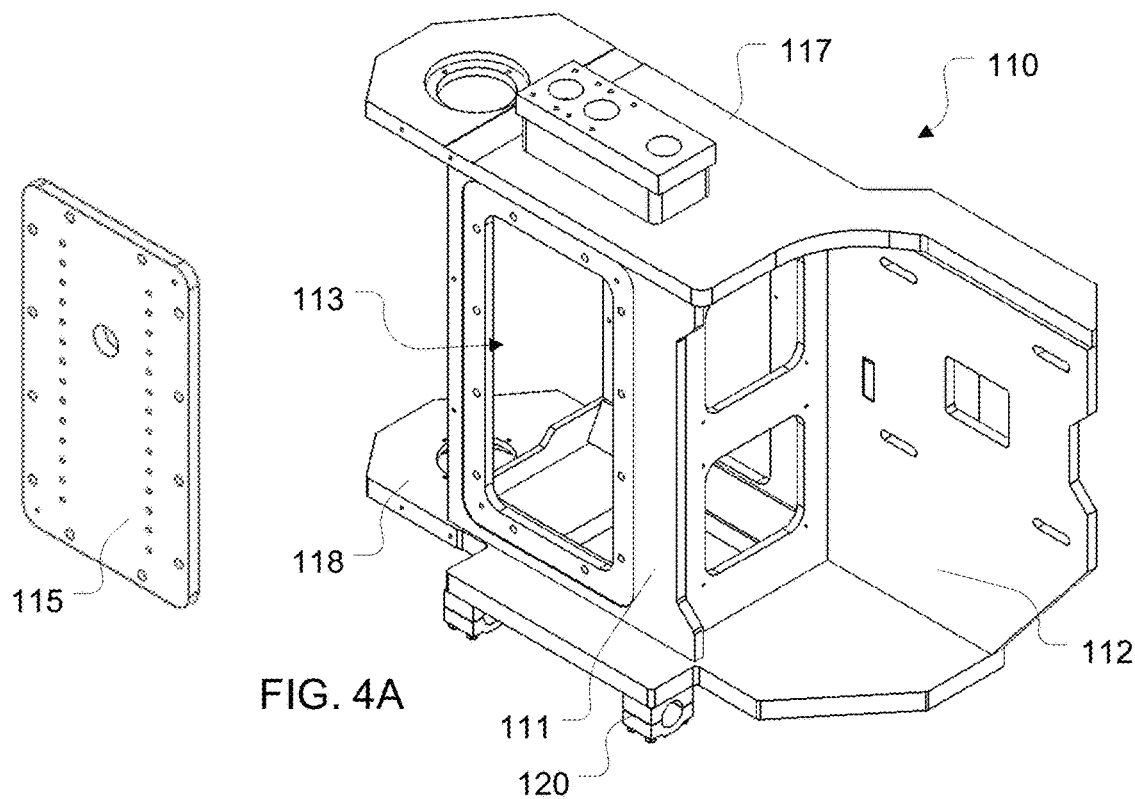
FIGS. 4A and 4B are perspective views of a frame for a splitter profiler module.
Figure 4B:
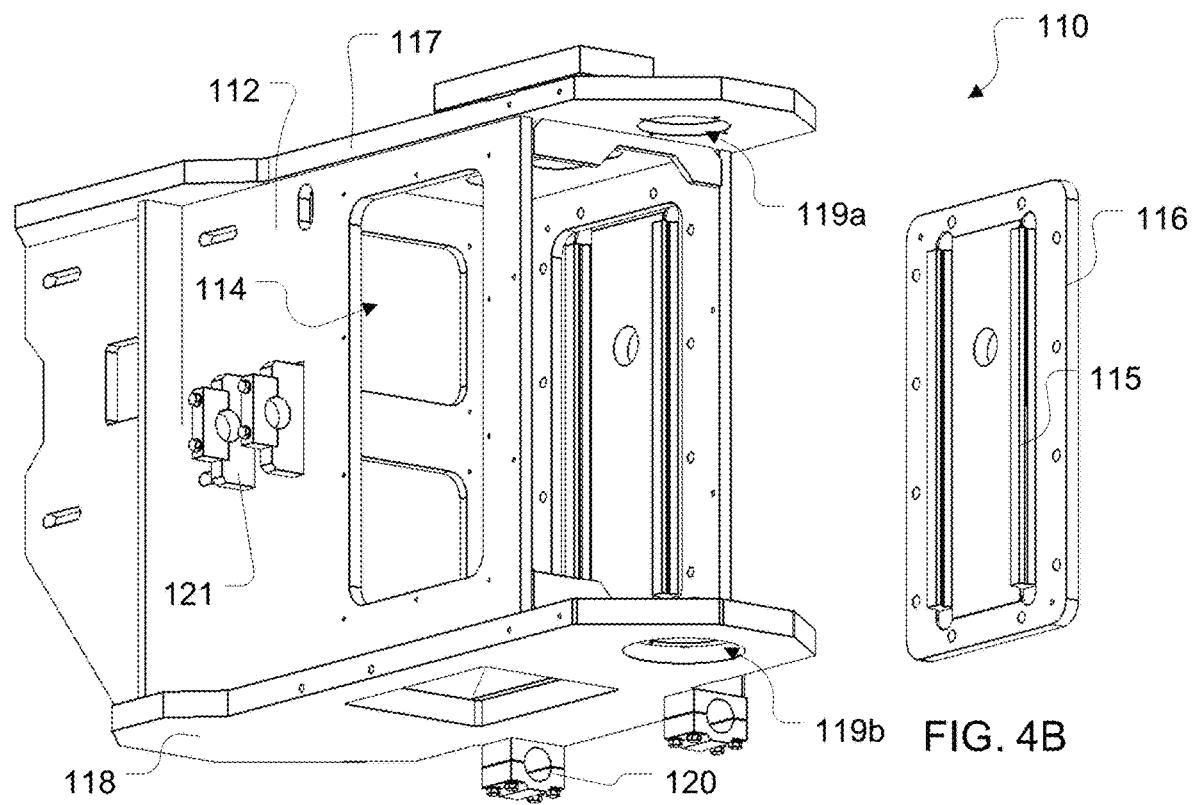

Referring now to FIGS. 4A-B, in various embodiments the frame 110 may have opposite side walls 111 and 112 with corresponding openings 113 and 114, respectively. Frame 110 may further include a panel 116 configured to be removably coupled to side wall 111 over opening 113. One or more guide members 115, such as linear bearings, may be removably coupled to panel 116 to extend at least partially across opening 113. Optionally, frame 110 may include a second panel 116 configured to be removably coupled to side wall 112 to cover opening 114. If present, the second panel 116 may optionally have one or more guide members 115; alternatively, second panel 116 may lack guide members.

Frame 110 may also have additional walls 117 and 118 coupled to corresponding opposite edges of the side walls 111 and 112 and oriented transverse thereto. Collectively, walls 111, 112, 117, and 118 may form a four-sided, open-ended enclosure. An end portion of walls 117 and 118 that extends beyond the open-ended enclosure may have corresponding openings 119a and 119b, respectively, dimensioned to accommodate arbor 122 and corresponding arbor bearings 123 and 124 (FIGS. 5A-B). Optionally, arbor bearing 123 may be a fixed bearing and bearing 124 may be a floating bearing, or vice versa. Regardless, in some embodiments frame 110 may be configured to accommodate arbor 122 in an orientation that is generally parallel to walls 111 and 112 and transverse or substantially perpendicular to walls 117 and 118. In some embodiments frame 110 may be configured to support the arbor at one end of the frame and a motor at the other end of the frame to drive the arbor (see e.g., FIG. 15, motor 199a or 199b). Of course, those with ordinary skill in the art will readily appreciate that other frame configurations are also possible.

In some embodiments, frame 110 may further include one or more features configured for use to reposition the frame relative to the workpiece flow path. For example, frame 110 may optionally include one or more pivot shaft clamps 120 disposed along at least one of the walls. The pivot shaft clamps 120 may have corresponding openings through which a shaft can be inserted to thereby enable pivoting of the frame around a pivot axis that extends through the center of the shaft. This may enable the use of the splitter profiler module for curve profiling. Likewise, frame 110 may include one or more pivot pin clamps 121 with corresponding openings. Pivot pin clamps 121 may be configured to retain a pivot pin for connection to a pivot actuator, as described further below with regard to FIGS. 14C-D.

Figures 6A, 6B:
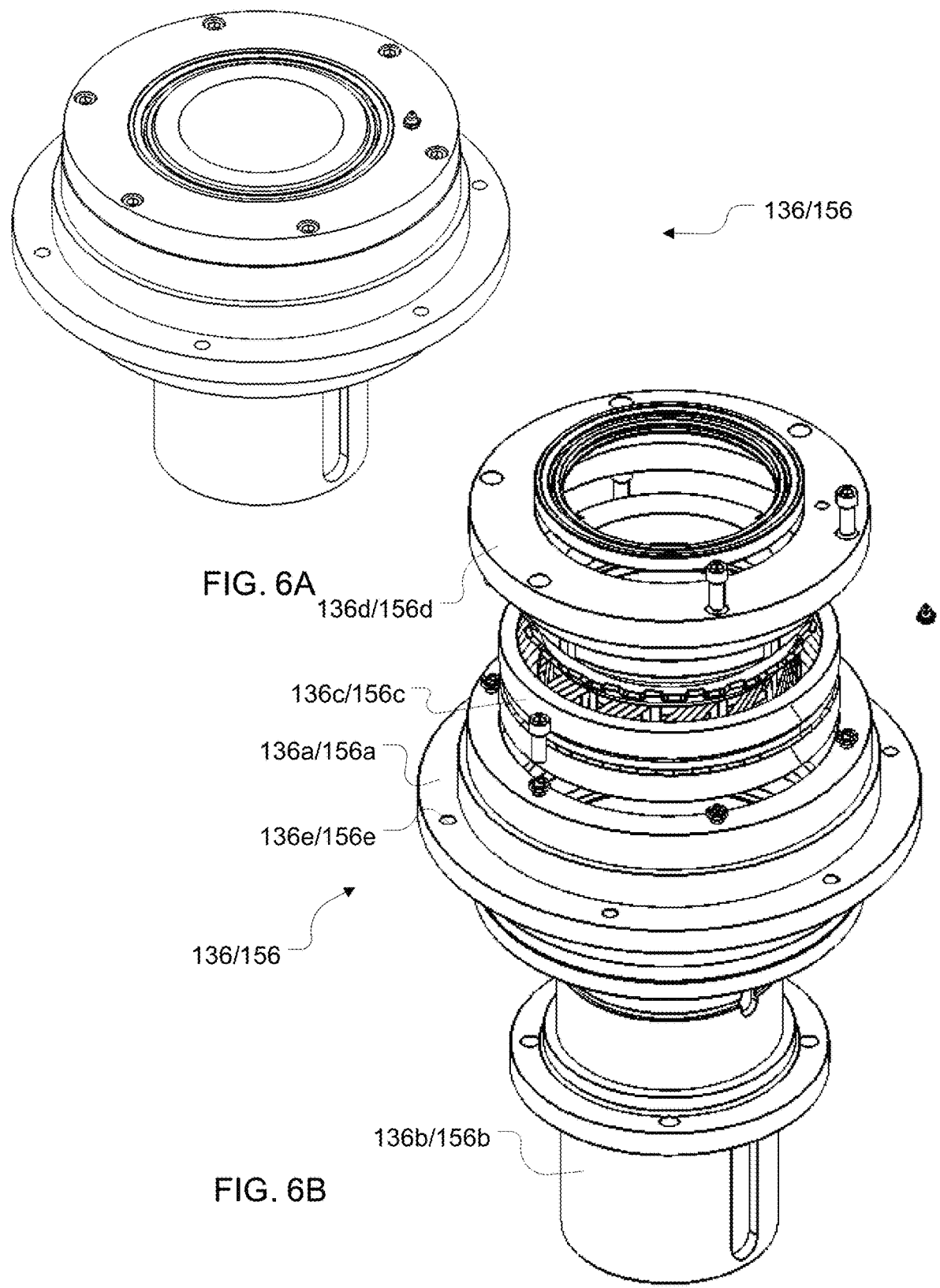
FIGS. 6A and 6B are perspective and exploded perspective views, respectively, of an arbor sleeve assembly for a profiling head.

First profiler arm assembly 134 may include an arbor sleeve assembly 136, and second profiler arm assembly 154 may include a corresponding arbor sleeve assembly 156 (FIGS. 6A-B). Each of the arbor sleeve assemblies 136 and 156 may have a center annulus. The arbor sleeve assemblies may be mounted in opposite orientations along the arbor 122 with the arbor extending through the center annulus of each assembly.

Figure 8A:
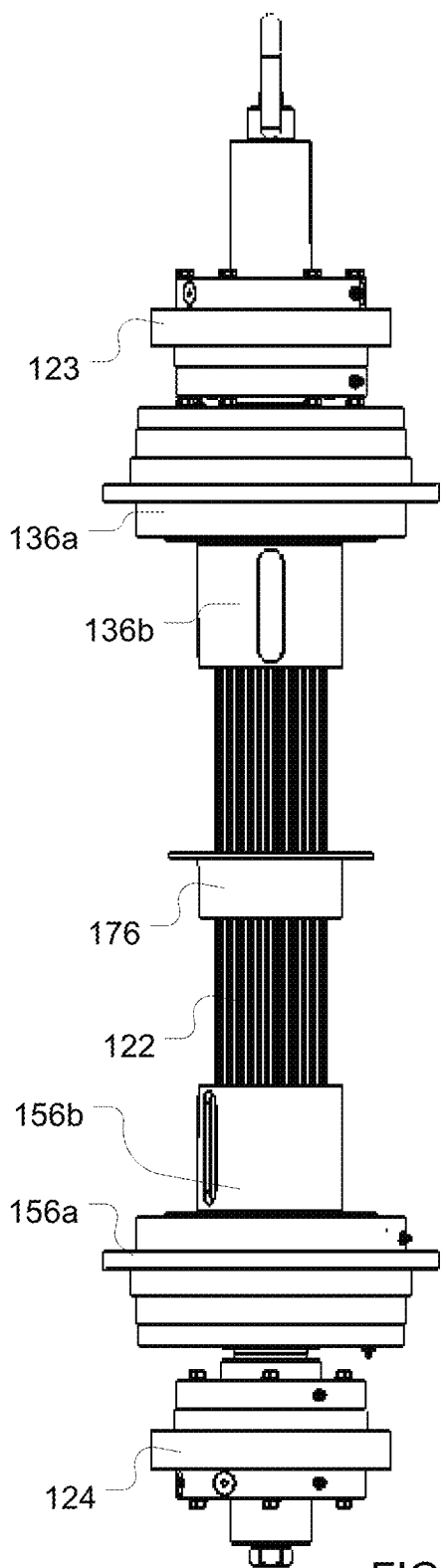
FIGS. 8A and 8B are side elevational views of the components of FIGS. 5A-7B in combination (FIG. 8A) and with profiling heads and a circular saw (FIG. 8B)
Figure 8B:
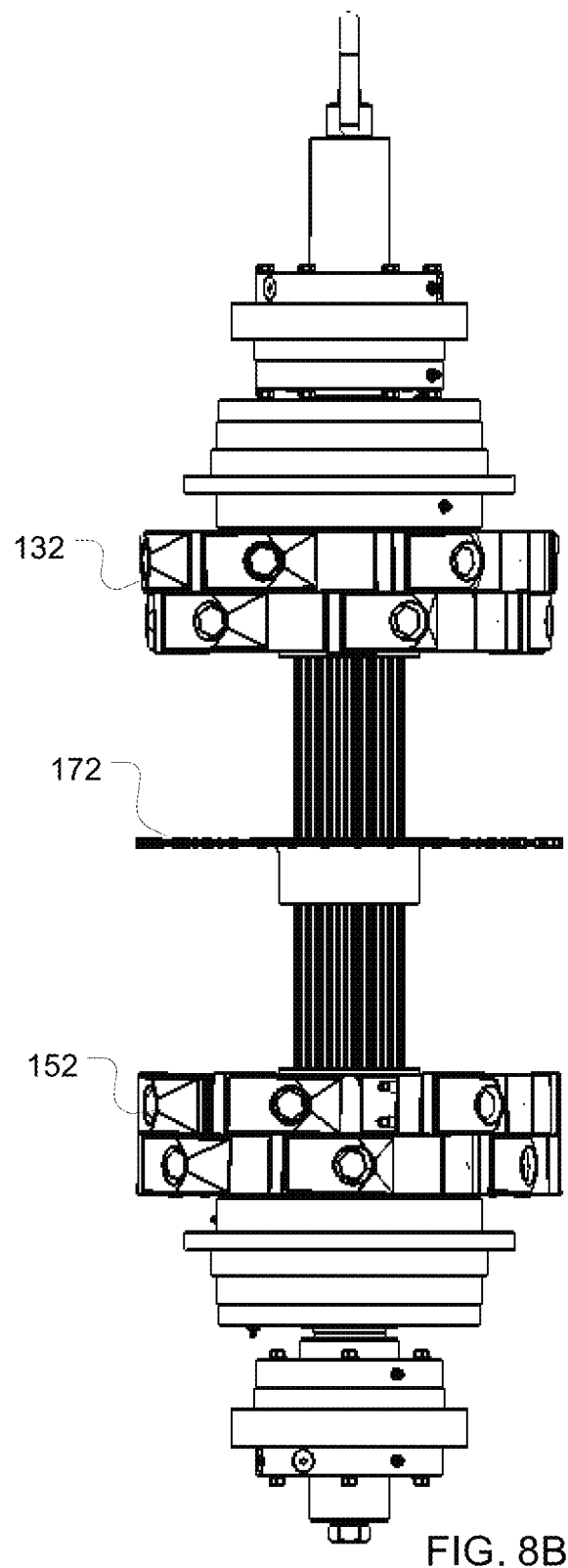
Figure 10A:
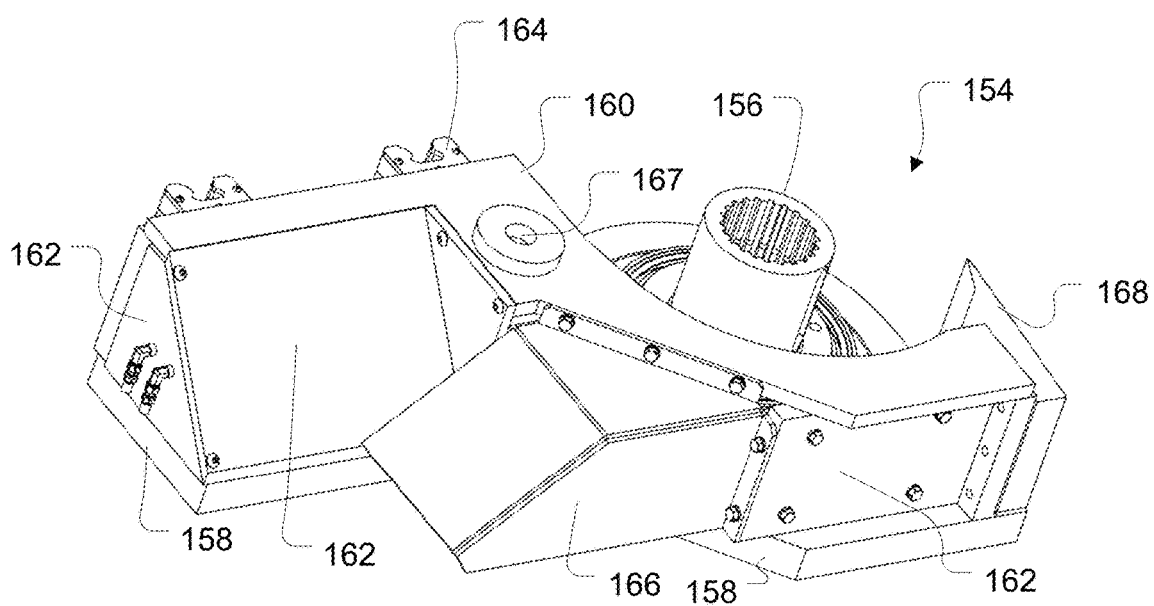
Figure 10B:
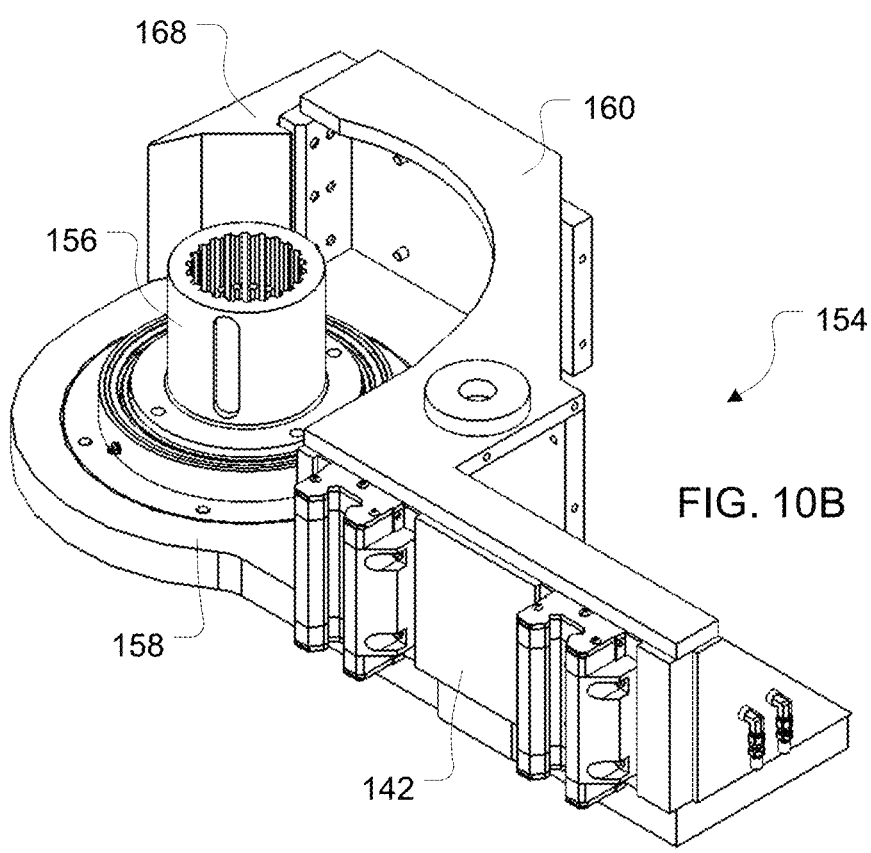
Figure 10C:
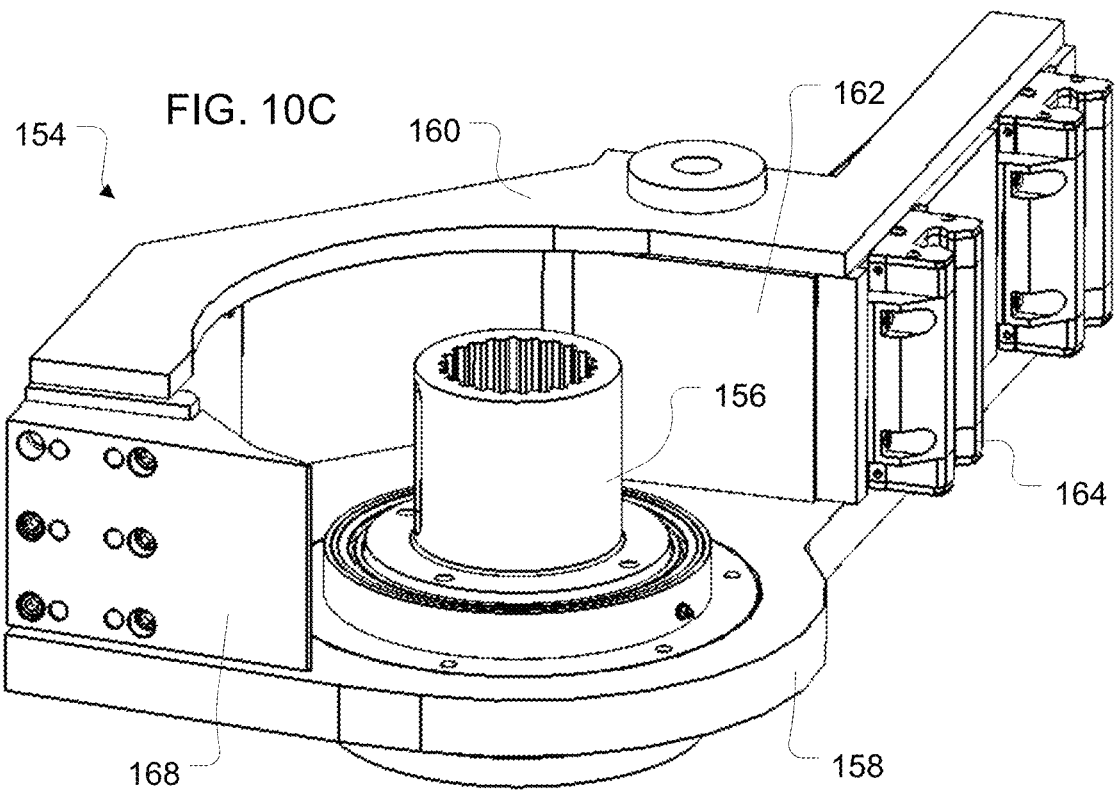

First saw arm assembly 174 may include a saw sleeve assembly 176 (FIG. 7A) and a saw arm 178. The saw sleeve assembly 176 may be mounted along the arbor and coupled to saw arm 178. Preferably, the saw sleeve assembly 176 is mounted along the arbor between the arbor sleeve assemblies 136 and 156 (FIG. 8A).

In various embodiments, the saw sleeve assembly may include a first portion and a second portion. The first portion may be configured to slideably engage the arbor such that the first portion is rotatable with, and movable axially along, the arbor. The second portion may be configured to retain the first portion while allowing the first portion to rotate with the arbor. In some embodiments, the first portion may be (or may include) a bushing, an annular bearing, or a bearing housing, and the second portion may be (or may include) a rotary bearing. Optionally, the second portion may include a rolling-element bearing having annular inner and outer races and rolling elements (e.g., balls, cylindrical rollers, spherical rollers, tapered rollers, or needle rollers) disposed between the races, such that the inner race is rotatable relative to the outer race.

Figure 7A:
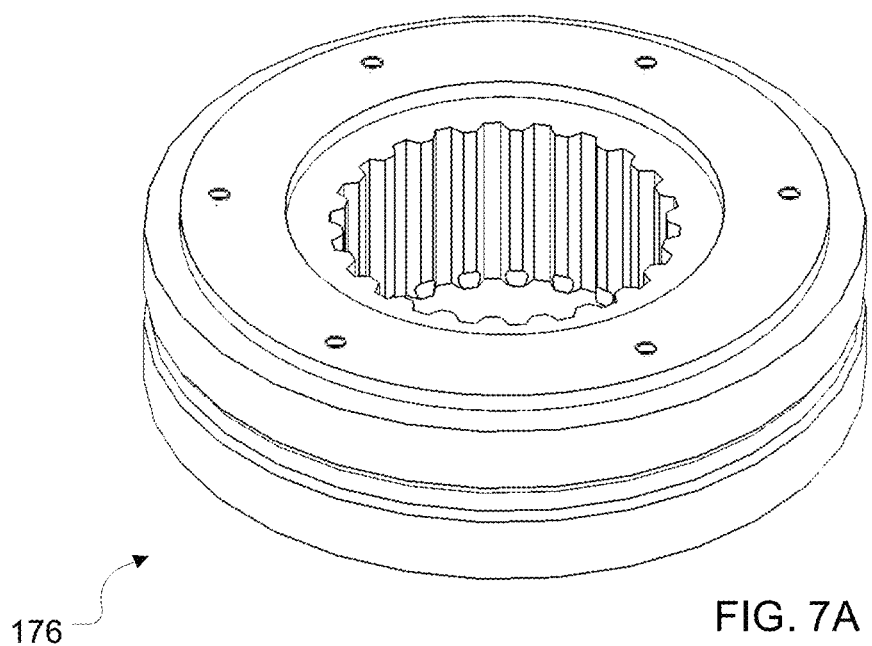
FIGS. 7A and 7B are perspective and exploded perspective views, respectively, of an arbor sleeve assembly for a circular saw.
Figure 7B:
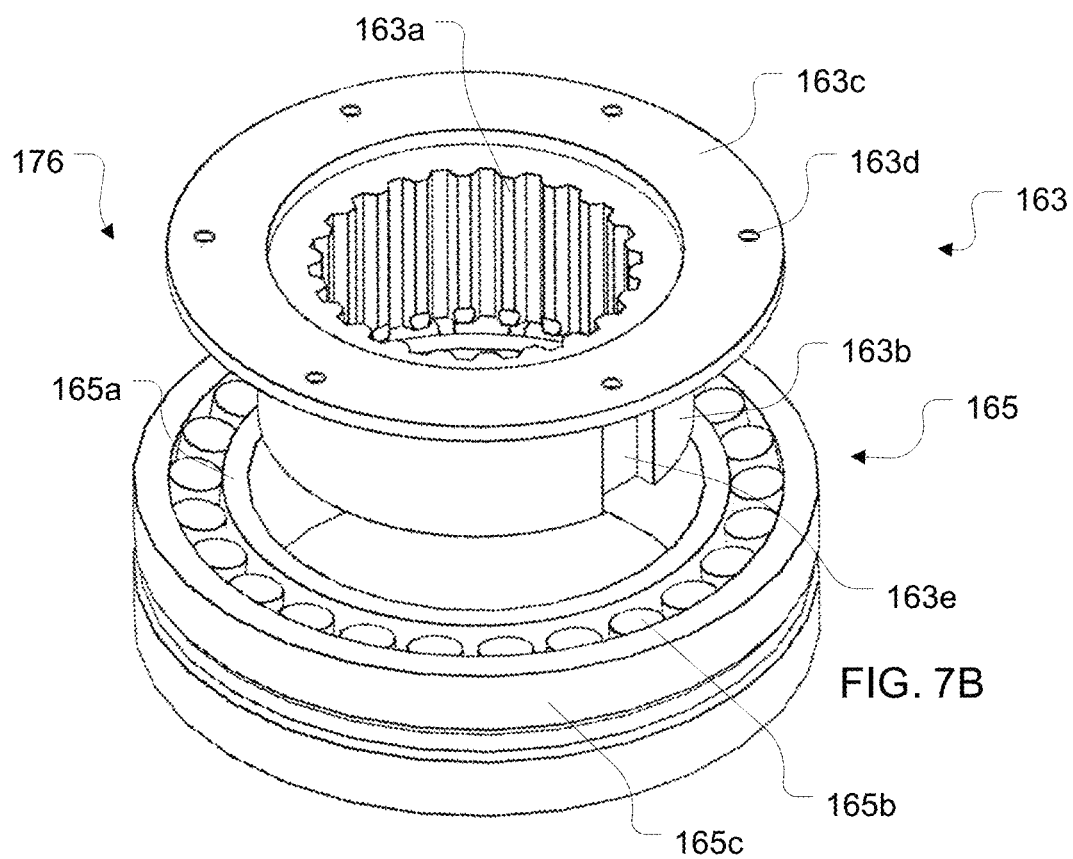

For example, as shown in FIG. 7B, the first portion may be a bearing housing 163 and the second portion may be a roller bearing 165. Bearing housing 163 may have an interior surface 163a configured to slideably engage the arbor. In some embodiments, bearing housing 163 may have a flange portion 163c at one or both ends thereof. Optionally, through-holes 163d may extend through the flange portion 163c. If present, through-holes 163d may be arranged to align with corresponding through-holes of a circular saw blade. In that case, the circular saw blade may be mounted to bearing housing 163 by bolts, screws, or other fasteners disposed through the respective through-holes. In some embodiments an annular collar member with corresponding through-holes may be coupled to one or both faces of the circular saw blade by the fasteners. However, this feature is not essential and may be omitted in other embodiments.

Roller bearing 165 may have an inner race 165a, an outer race 165c, and a plurality of balls or rollers 165b disposed between the inner and outer races. Inner race 165a may dimensioned to accommodate a portion 163b of the bearing housing 163 therein. Optionally, the bearing housing 163 and/or roller bearing 165 may have one or more coupling features. For example, bearing housing 163 may optionally have a keyway 163e through which a respective key member (not shown) can be inserted to secure the bearing housing 163 to the roller bearing 165.

Similarly, in some embodiments one or both of the arbor sleeve assemblies 136/156 may include a bearing housing and a rotary bearing disposed around a portion of the bearing housing. Optionally, additional components may also be included. For example, referring again to FIG. 6B, in some embodiments the arbor sleeve assembly 136 may include an outer bearing housing 136a, an inner bearing housing 136b, a rotary bearing 136c, and a bearing clamp 136d. Inner bearing housing 136b may be configured to slideably engage the arbor, such that it is rotatable with the arbor and axially movable along the arbor. In embodiments with a splined arbor, inner bearing housing 136b may be a splined bearing housing. Rotary bearing 136c may be a rolling-element bearing (e.g., a spherical roller bearing) with an inner annulus dimensioned to accommodate a portion of inner bearing housing 136b. Outer bearing housing 136a may have an inner annulus dimensioned to accommodate rotary bearing 136c. Optionally, outer bearing housing 136a may also have through-holes or other features adapted for use to mount bearing housing 136a to a corresponding profiler arm. Similarly, bearing clamp 136d may have through-holes or other features adapted for use to mount bearing clamp 136d to outer bearing housing 136a and/or the corresponding profiler arm. Arbor sleeve assembly 156 may have the same or similar components and configuration.

In some embodiments, arbor 122 may be a splined arbor, and the bearing housing 163 may be a splined bearing housing (i.e., the interior surface 163a may be splined) configured to engage the arbor 122 to permit axial movement of the saw sleeve assembly along the arbor, and the roller bearing 165 may be a spherical roller bearing with a center annulus through which a portion of the splined bearing housing is disposed (FIG. 7B). Similarly, bearing housing 136b and/or 156b may be a splined bearing housing configured to permit axial movement of the respective arbor sleeve assembly(ies) along arbor 122. Alternatively, one of the arbor sleeve assemblies may be configured to permit axial movement of the respective arbor sleeve assembly along arbor 122 and the other arbor sleeve assembly may be configured for use in a fixed axial position along arbor 122.

Each of the arbor sleeve assemblies 136 and 156 may be provided with coupling features configured for use to attach profiler heads thereto. For example, in some embodiments splined bearing housings 136b and 156b may have a flange with multiple holes that are arranged circumferentially around the center annulus and configured to retain bolts or other such fasteners. Optionally, the bearing housings 136b and 156b may also have a groove dimensioned to fit a protrusion on the profiler head, or vice versa, or any other suitable type(s) of coupling mechanism(s). Again, saw sleeve assembly 176 may be provided with coupling features (e.g., bolt holes) configured for use to attach circular saw 172 to saw sleeve assembly 176. For example, in some embodiments through-holes 163d may be provided in a flange 163c of bearing housing 163. Thus, as shown for example in FIG. 8B, first and second profiler heads 132 and 152 may be mounted to arbor sleeve assemblies 136 and 156, respectively, and first circular saw 172 may be mounted to saw sleeve assembly 176.

Additional features of the first and second profiler arm assemblies 134, 154, and first saw arm assembly 174 are shown in FIGS. 9A-E, 10A-E, and 11A-F, respectively, in accordance with various embodiments.

Figure 9A:
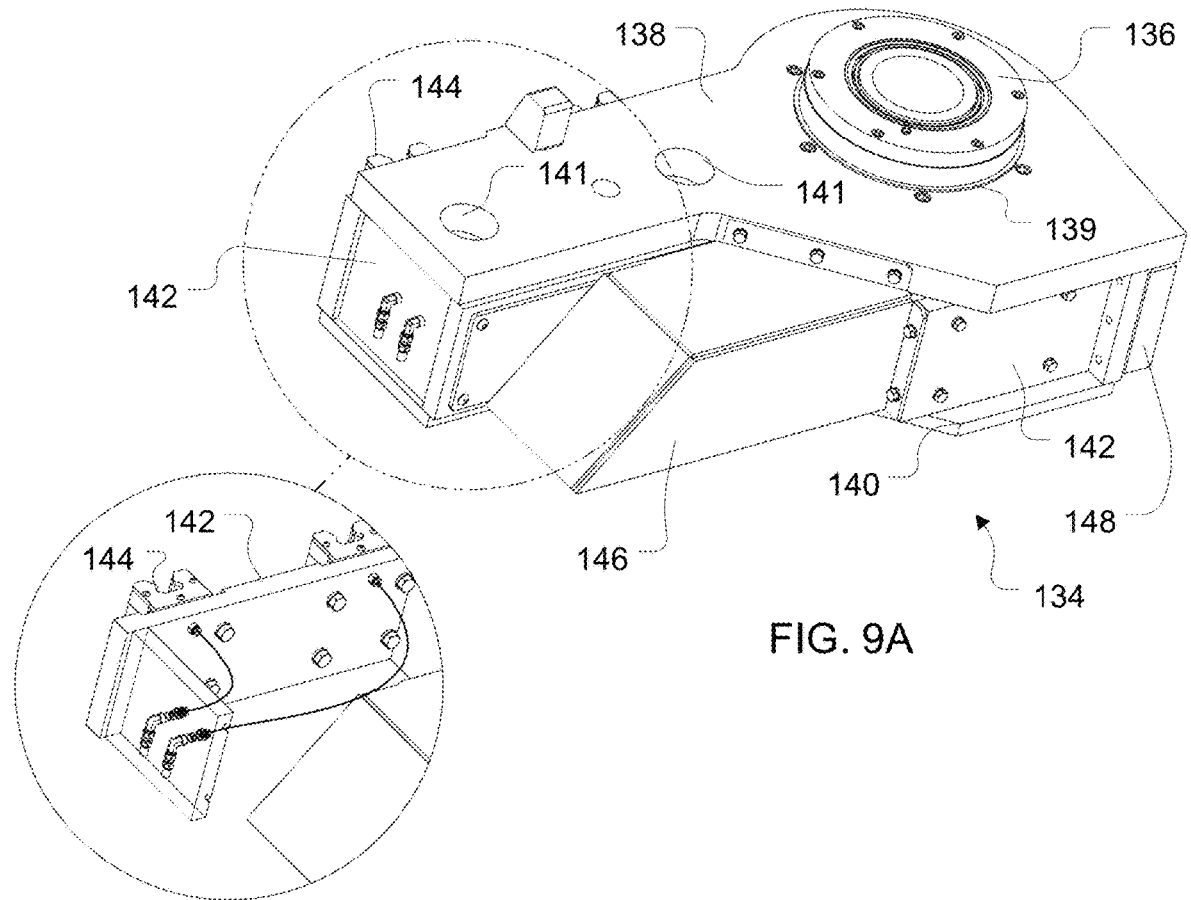
FIGS. 9A-E and 10A-E illustrate examples of proximal and distal profiler arm assemblies, respectively, for a splitter profiler module.
Figure 9B:
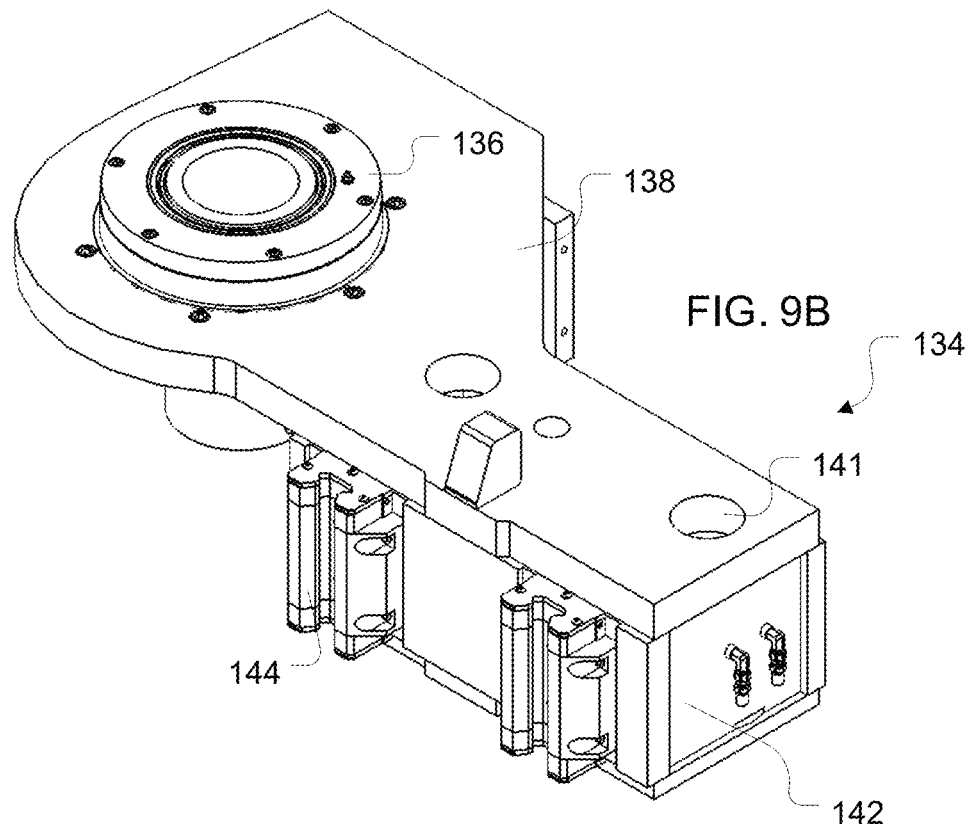
Figure 9C:
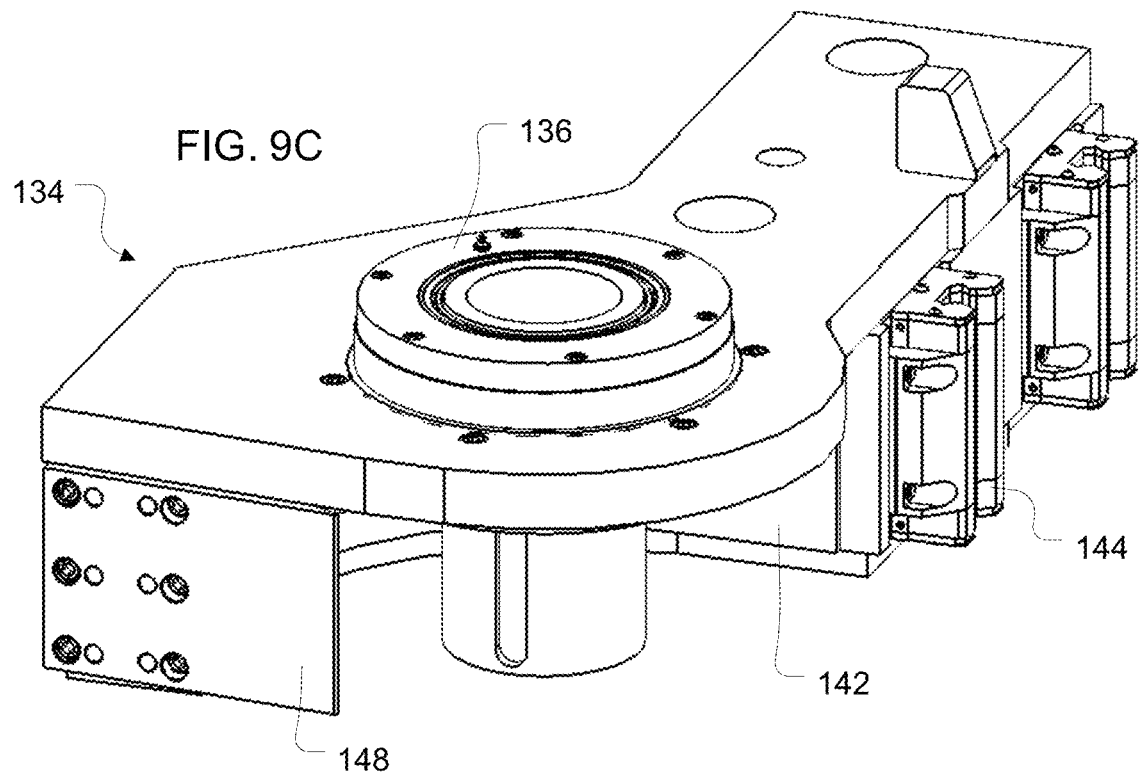
Figure 9D:
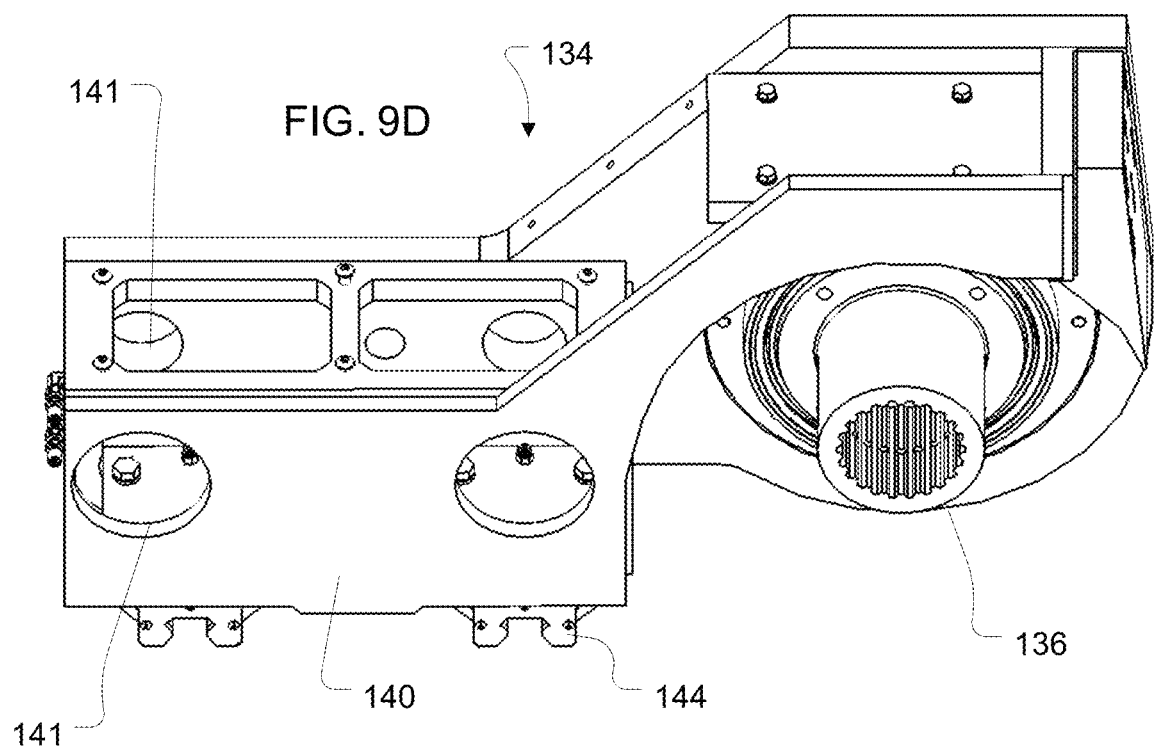
Figure 9E:
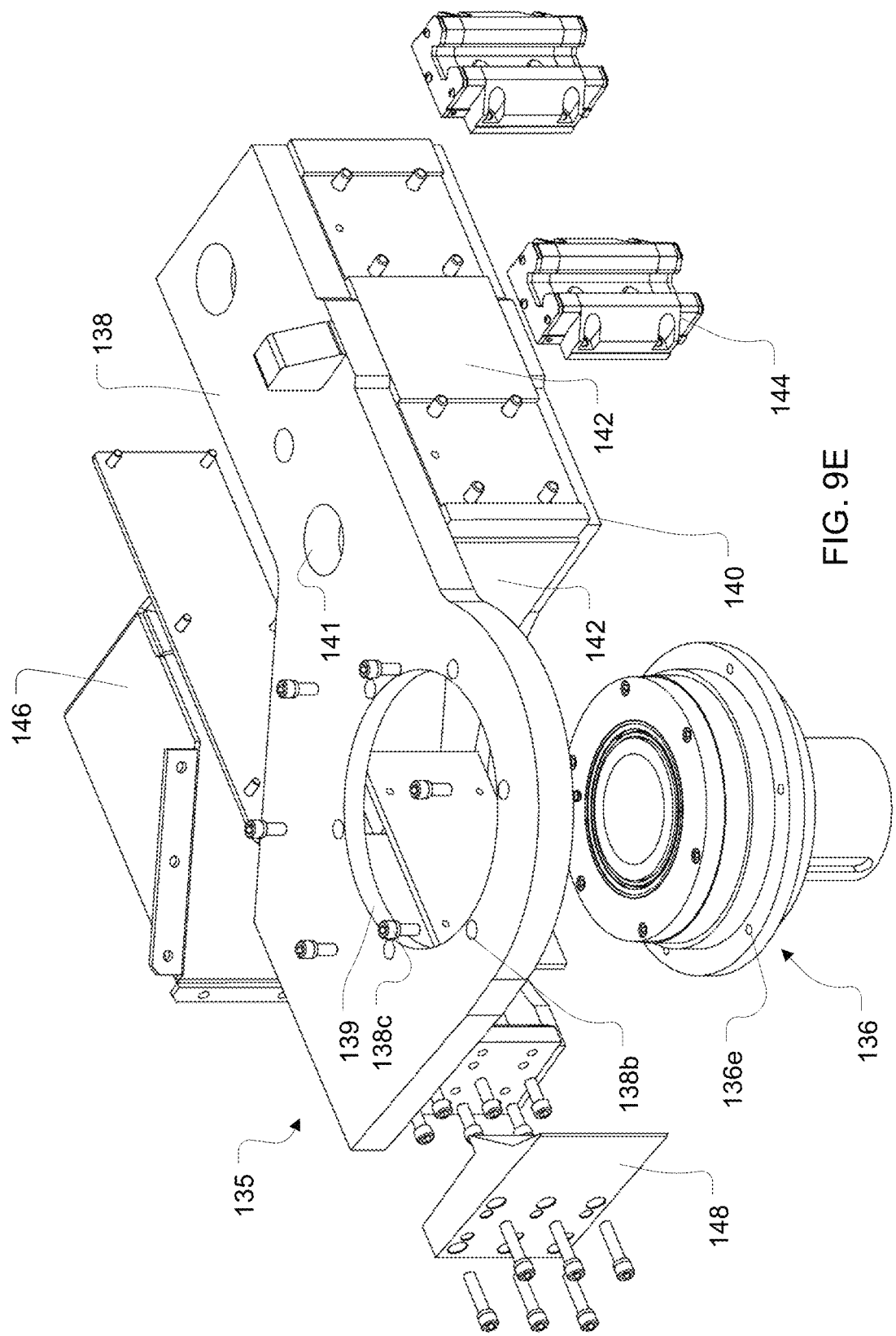
Figure 10E:
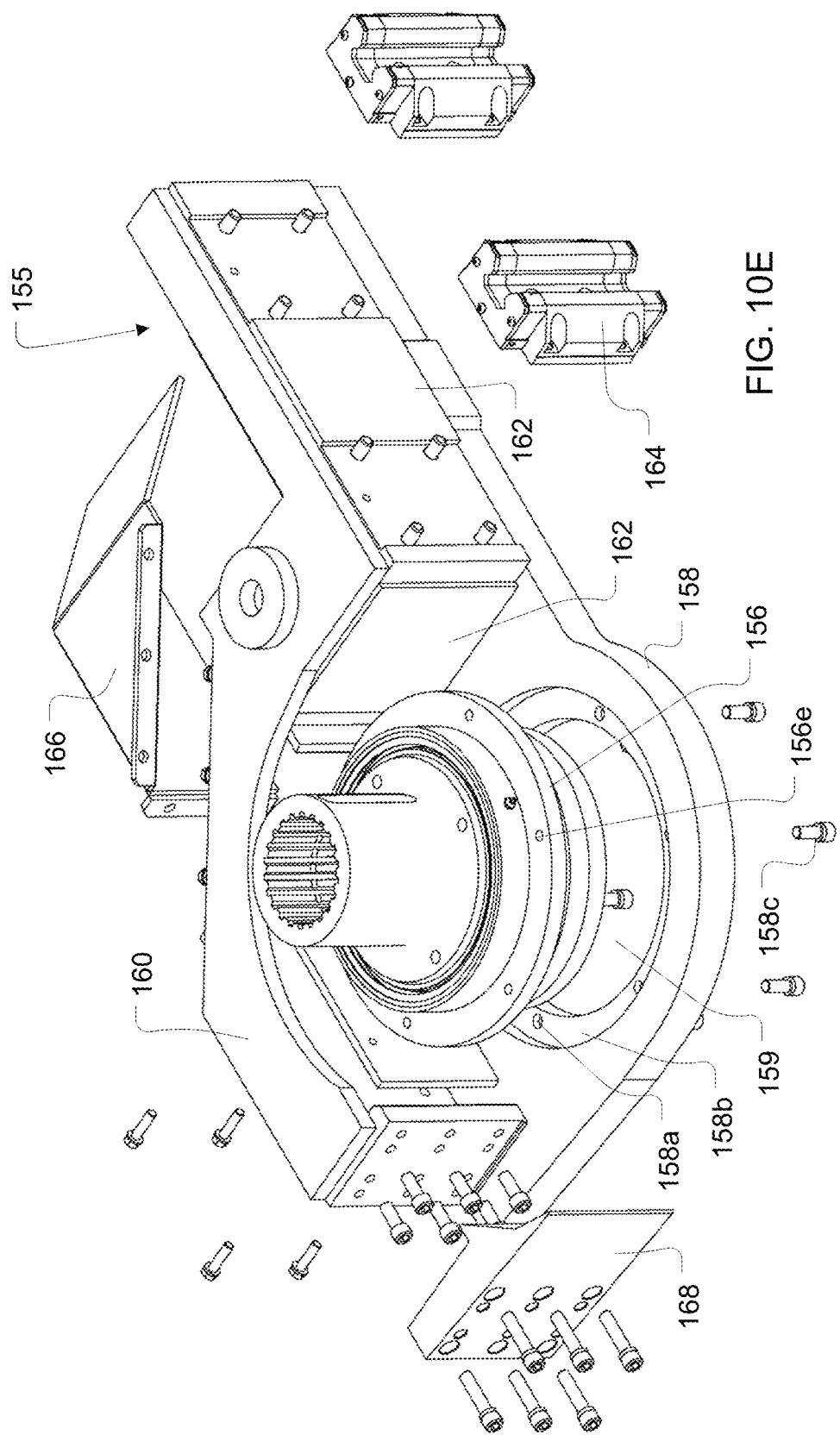
Figure 11A:
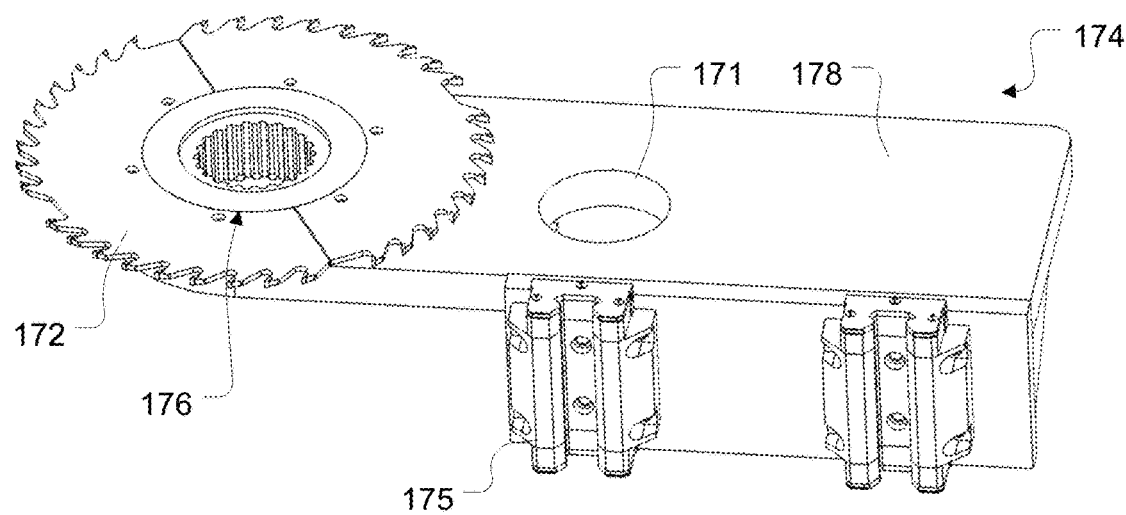
Figure 11B:
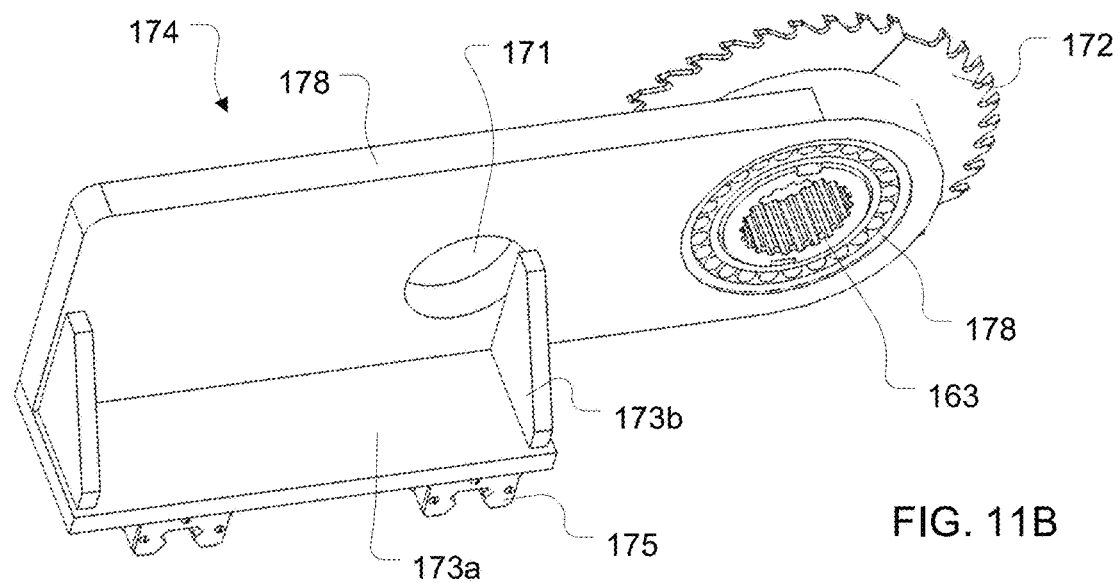

Referring first to FIGS. 9A-E, in addition to arbor sleeve assembly 136, first profiler arm assembly 134 may further include a frame 135 (FIG. 9E). Frame 135 may include a first arm 138 that extends generally perpendicular to the axis of rotation of arbor 122 and one or more carriages 164 coupled to arm 138. In some embodiments, arm 138 may be a plate of steel or other rigid durable material. Alternatively, arm 138 may be a steel tube, or a combination of plates/tubes, or the like. First arm 138 may have an aperture 139 dimensioned to accommodate a portion of arbor sleeve assembly 136, which may be disposed through the aperture 139. Carriages 144 may be oriented such that they are generally parallel to the rotational axis of the arbor 122 when arm 138 is mounted to the arbor. Optionally, frame 135 may further include another arm 140, which may be generally parallel to arm 138. If present, arm 140 may be connected to arm 138 by one or more walls 142 that are transverse to arms 138 and 140. Alternatively, arm 140 may be omitted, and walls 142 may be gussets, plates, or other such features configured to provide additional support to arm 138. In some embodiments, one or more additional apertures 141 may be provided through arm 138 (and arm 140, if present). For example, as shown in FIG. 9D, a pair of apertures 141 may be provided through arm 138 in alignment with a corresponding pair of apertures 141 provided through arm 140. Optionally, first profiler arm assembly 134 may further include a chip chute 146 coupled with the frame 135 and configured to divert chips in a desired direction, and/or a profiler anvil 148 coupled to frame 135.

Figure 10D:
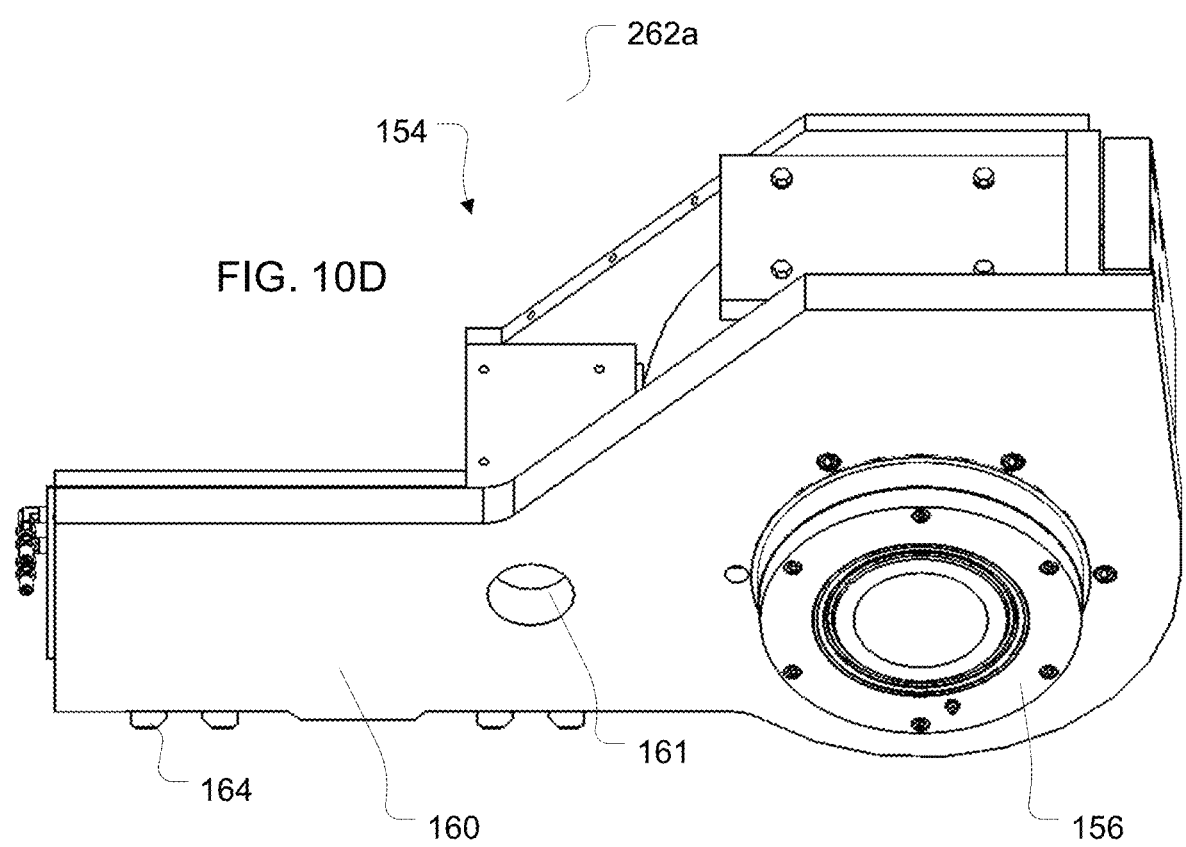

Referring next to FIGS. 10A-E, in addition to arbor sleeve assembly 156, second profiler arm assembly 154 may further include a frame 155. Frame 155 may include an arm 158. Optionally, frame 155 may further include one or more carriages 164 coupled with arm 158. In some embodiments, arm 158 may be a plate of steel or other rigid durable material. Alternatively, arm 158 may be a steel tube, or a combination of plates/tubes, or the like. Arm 158 may have an aperture 159 dimensioned to accommodate a portion of arbor sleeve assembly 156, which may be disposed through the aperture 159. Carriages 164 may be oriented such that they are generally parallel to the rotational axis of the arbor 122 when arm 138 is mounted to the arbor. Optionally, frame 155 may further include another arm 160 that is generally parallel to arm 158. Arm 160 may be connected to arm 158 by one or more walls 162 that are transverse to arms 158 and 160. In some embodiments, second profiler arm assembly 154 may include a chip chute 166 coupled with the frame 155 and configured to divert chips in a desired direction, and/or a profiler anvil 168 coupled to frame 155. Optionally, second profiler arm assembly 154 may further include a coupler 167 (e.g., an annular plate) affixed to an outer surface of arm 158 (FIG. 10A) and/or one or more apertures 161 (FIG. 10D).

Optionally, arm 140 and/or arm 160 (if present) may be curved or angled at one end to extend partially around the outer circumference of the corresponding profiler head and/or the circular saw. Other embodiments may omit arm 140 and/or arm 160. In some embodiments, portions of frame 135 and frame 155 may be substantially similar to one another, but mounted in opposite orientations along arbor 122 (see e.g., FIG. 8A).

Referring now to FIGS. 11A-F, in some embodiments first saw assembly 174 may further include a corresponding saw arm 178 that extends generally perpendicular to the axis of rotation of arbor 122 and one or more carriages 175 coupled with saw arm 178. In some embodiments, saw arm 178 may be a plate of steel or other rigid durable material. Alternatively, saw arm 178 may be a steel tube, or a combination of plates/tubes, or the like. Saw arm 178 may have an aperture 179 dimensioned to accommodate a portion of saw sleeve assembly 176, which may be disposed through the aperture 179. Carriages 175 may be oriented such that they are generally parallel to the rotational axis of the arbor 122 when saw arm 178 is mounted to the arbor. One or more additional apertures 171 may be provided through arm 138 Optionally, saw arm assembly 174 may further include one or more walls 173a and/or 173b coupled with saw arm 178. If present, wall(s) 173a/173b may be oriented transverse to saw arm 178. For example, as shown in FIGS. 11A-F, wall 173a may be an elongated plate that is substantially perpendicular to saw arm 178 and walls 173b may be gussets coupled to both saw arm 178 and wall 173a.

In various embodiments, any or all of the arms 138/158/178 may be coupled to the respective sleeve assemblies (136/156/176) by bolts, keys and keyways, and/or any other suitable means. For example, in some embodiments some or all of the arms may have through-holes arranged around the respective aperture(s)139/159/179 to align with through-holes in the corresponding sleeve assembly(ies), and the arm(s) and the corresponding sleeve assembly(ies) may be coupled together by bolts disposed through the respective through-holes. Optionally, the aperture of the arm may be surrounded by a coaxial recessed portion (e.g., counterbore or countersink) dimensioned to accommodate a portion of the respective sleeve assembly. For example, referring to FIG. 10E, arm 158 may have a recessed portion 158b surrounding aperture 159 and dimensioned to accommodate outer bearing housing 156a. In this example, sleeve assembly 156 may be coupled to arm 158 by bolts 158c disposed through holes 158b that extend through the recessed portion 158b and corresponding through-holes 156b that extend through outer bearing housing 156a. Likewise, sleeve assembly 136 may be coupled to arm 138 by bolts 138c disposed through holes 138b that extend through a recessed portion in arm 136 and corresponding through-holes 136b that extend through the outer bearing housing 136a (see FIG. 9E).

Figure 12A:
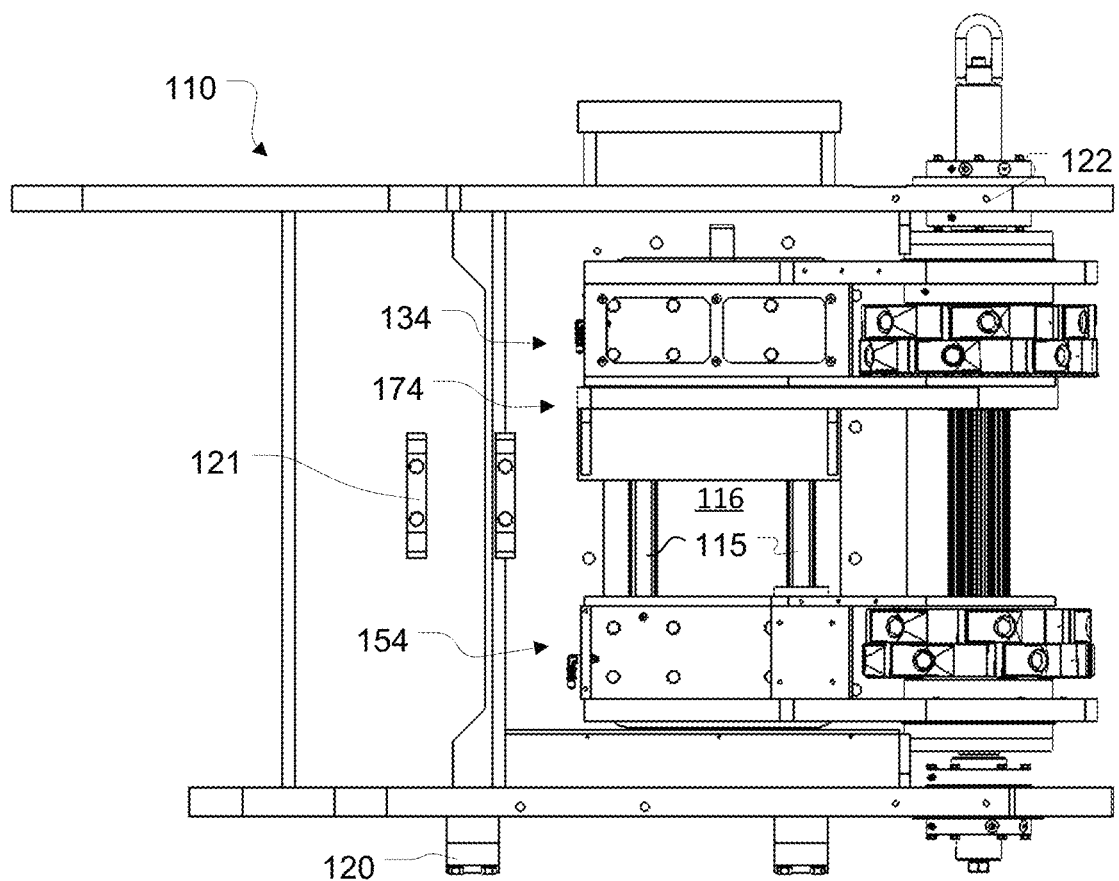
FIGS. 12A-C illustrate side elevational views of an example of a splitter profiler module, with some parts removed for clarity.
Figure 12B:
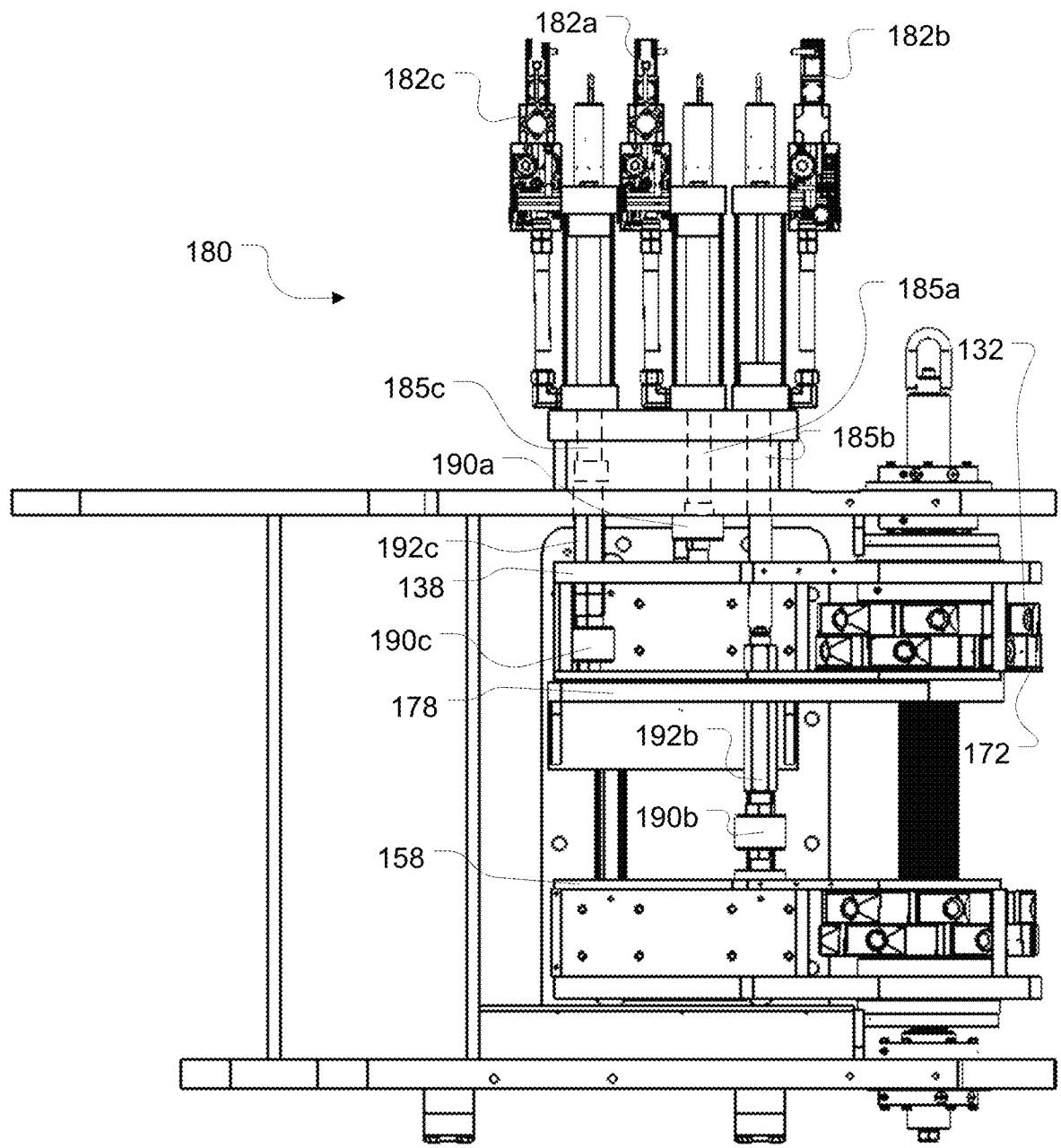
Figure 12C:
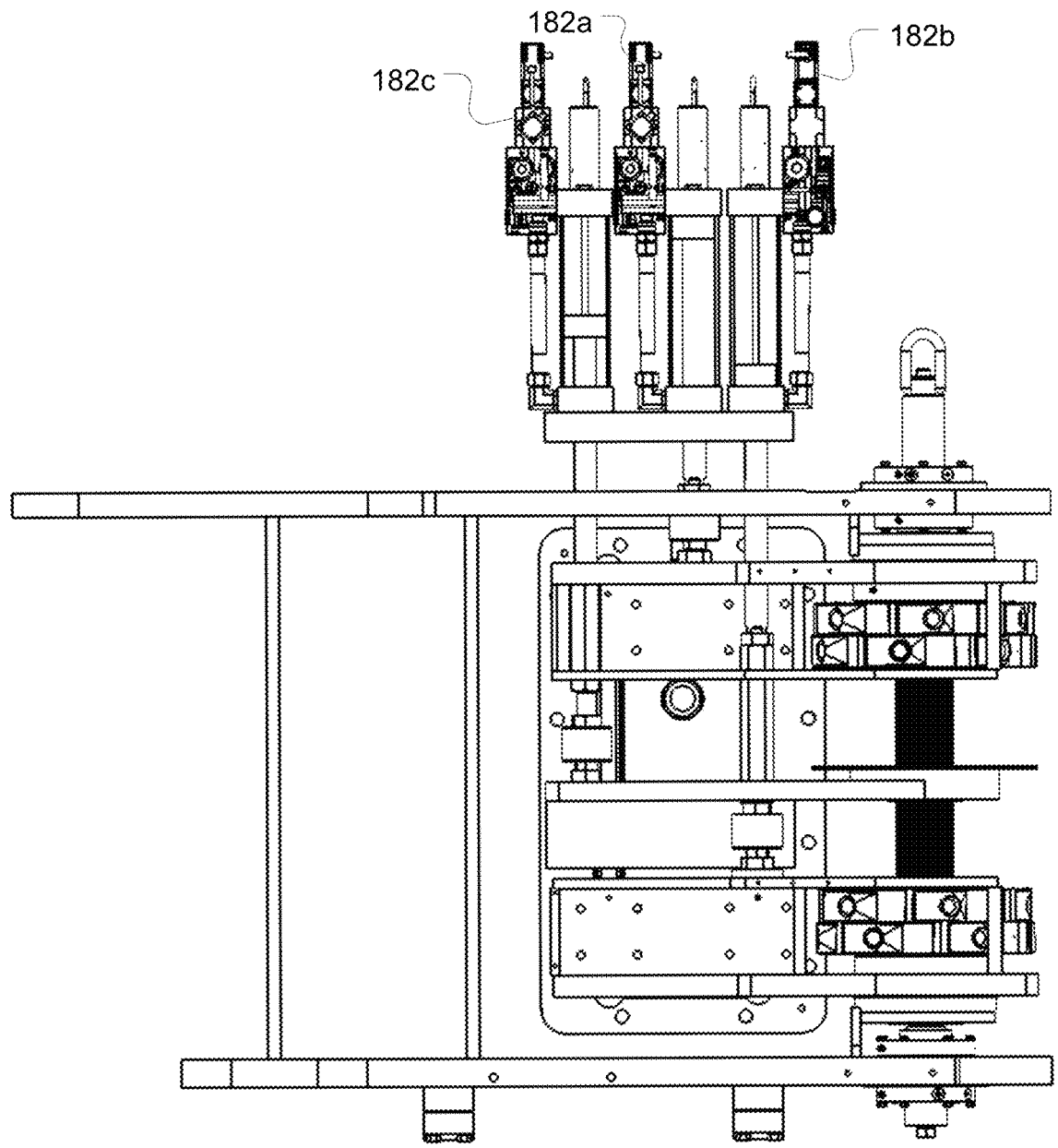
Figure 12D:
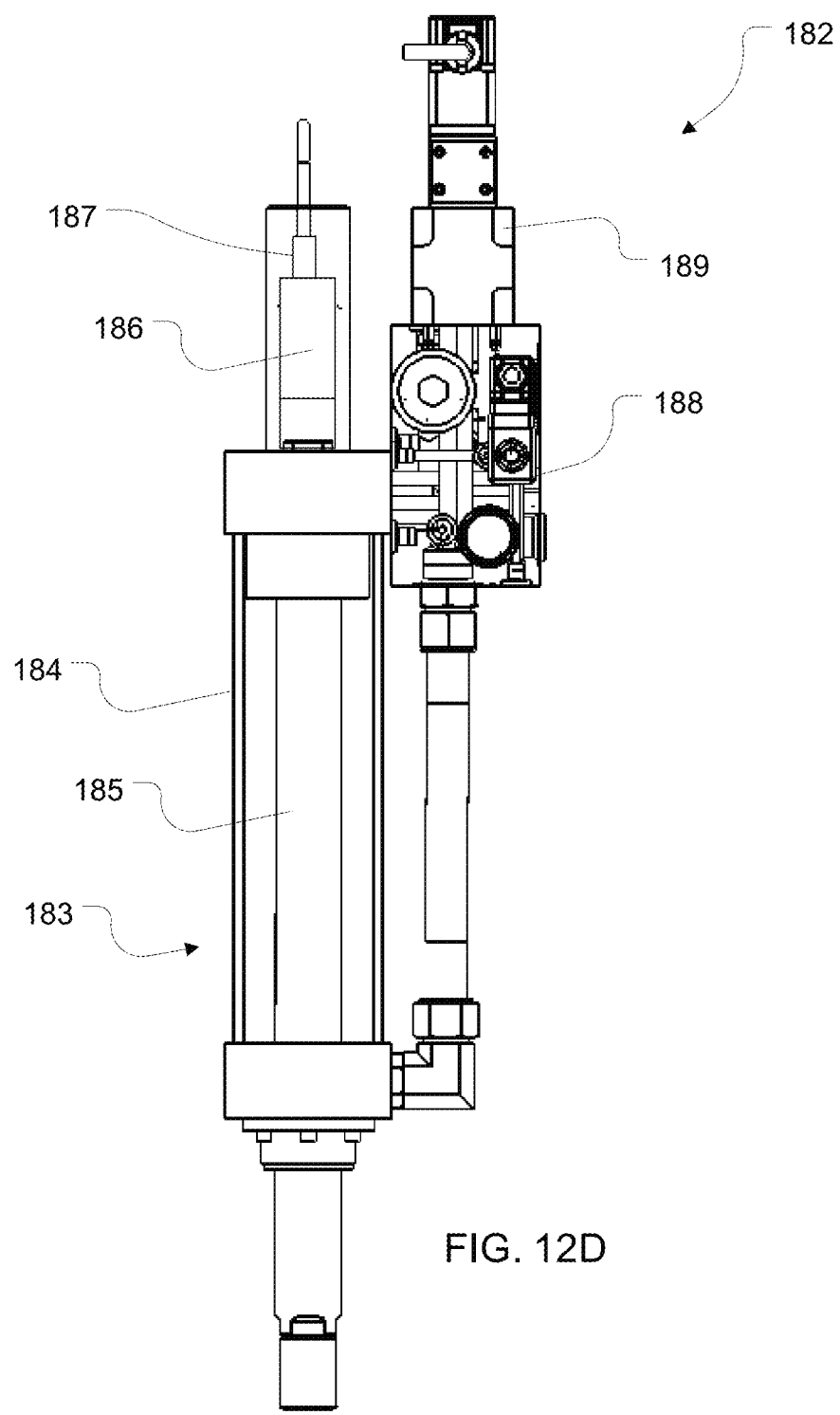
FIG. 12D illustrates a side elevational view of an example of an actuator, with some parts made transparent for clarity.

FIGS. 12A-C illustrate side elevational views of an example of a splitter profiler module 101, and FIG. 12D illustrates a side elevational view of an actuator, with some parts removed or made transparent for clarity. Beginning with FIG. 12A, in various embodiments first profiler arm assembly 134, second profiler arm assembly 154, and first saw arm assembly 174 may be coupled with frame 110 and arbor 122. The carriages 144, 164, and 175 may be movably coupled with corresponding guide members 115, and panel 116 may be fastened to wall 111 of frame 110. For example, some embodiments may include two guide members 115 spaced laterally apart on panel 116, and each of the arm assemblies may have two carriages arranged to engage the guide members 115. Guide members 115 may be linear bearing rails, and the carriages may be recirculating roller bearings configured to slideably engage the guide members 115. Alternatively, other types of linear motion bearings or linear slides may be used instead (e.g., other rolling element bearings, plain bearings, etc.).

Profiler heads 132 and 152 may be coupled to the respective arbor sleeve assemblies 136 and 156, and first circular saw 172 may be coupled to saw sleeve assembly 176. The arbor sleeve assemblies 136 and 156 and saw sleeve assembly 176 may be placed onto the arbor 122 such that the arbor extends through the center annulus of each. Arbor sleeve assemblies 136 and 156 may be coupled to the respective profiler arms 138 and 158, and saw sleeve assembly 176 may be coupled to saw arm 178.

In various embodiments, an actuator assembly 180 may be coupled with the profiler arm assemblies and the saw arm assembly. Actuator assembly 180 may include one or more actuators operable to move the arm assemblies in opposite directions along a path of travel to thereby move the profiling heads and circular saw along arbor 122. In some embodiments, the actuators may be hydraulic cylinder actuators, such as actuator 182 shown in FIG. 12D.

Referring briefly to that Figure, in various embodiments actuator 182 may include a linear actuator 183. In some embodiments, linear actuator 183 may further include a housing 184 and a shaft 185 disposed at least partially within the housing 184. Optionally, a linear position sensor 186 may be operatively coupled to the linear actuator 183. If present, linear position sensor 186 may be any type of sensor suitable for sensing the position of shaft 185 or an item attached thereto. For example, linear position sensor 184 may be a magnetostrictive, absolute, non-contact linear position sensor. Optionally, a transducer cable 187 may be connected to linear position sensor 184. In some embodiments linear actuator 183 may further include a blocking valve 188 operatively coupled with cylinder 183 by a conduit, pipe, or other such means, and optionally a servo valve 189 coupled with blocking valve 188.

As shown in FIG. 12D, in some embodiments the linear actuator 183 may be a hydraulic cylinder (e.g., a Parker 2H series hydraulic cylinder), and shaft 185 may be a piston, as shown in FIG. 12D. Alternatively, actuator 182 may be (or may include) a pneumatic cylinder, a screw actuator, or another type of mechanical/electro-mechanical linear actuator instead of a hydraulic cylinder.

In some embodiments, actuator assembly 180 may include an actuator for each arm assembly. For example, as shown in FIGS. 12B-C, some embodiments of a splitter profiler module may have two profiler arm assemblies and one saw arm assembly, and the actuator assembly 180 may include three actuators 182a, 182b, and 182c. Actuator 182a may be operatively coupled with profiler arm assembly 134, actuator 182b maybe operatively coupled with profiler arm assembly 154, and actuator 182c may be operatively coupled with saw arm assembly 174.

Referring first to FIG. 12B, actuator 182a may be mechanically coupled to profiler arm assembly 134, and actuator 182b may be mechanically coupled to profiler arm assembly 154. For example, the distal end of the shaft 185a may be connected to an alignment cylinder 190a, which may in turn be connected to arm 138 by one or more nuts or other fasteners. Because profiler arm assembly 154 is more distal to the actuators than profiler arm assembly 134, an extension shaft 192b may be coupled to the distal end of the shaft 185b. The distal end of extension shaft 192b may be connected to an alignment cylinder 190b, which may in turn be connected to arm 158 by one or more nuts or other fasteners. An aperture 141 through first profiler arm 138 (and optionally through profiler arm 140, if present) may be dimensioned to allow extension shaft 192b and alignment cylinder 190b to pass through the first profiler arm assembly, and a corresponding aperture 171 through first saw arm 178 may be dimensioned to allow extension shaft 192b and alignment cylinder 190b to pass through the first saw arm assembly.

Likewise, actuator 182c may be mechanically coupled to saw arm assembly 174. Again, an extension shaft 192c may be coupled to the distal end of the shaft 185c. The distal end of extension shaft 192c may be connected to an alignment cylinder 190c, which may in turn be connected to saw arm 178 by one or more nuts or other fasteners. Another aperture 141 through first profiler arm 138 (and optionally through profiler arm 140, if present) may be dimensioned to allow extension shaft 192c and alignment cylinder 190c to pass through the first profiler arm assembly.

Thus, the shaft 185 of each actuator 182 may be extended and retracted to move the corresponding arm assembly in opposite directions along arbor 122. The range of motion of a given profiler arm assembly may be defined by a pair of terminal positions at opposite ends of that range. For example, the terminal positions of a profiler arm assembly may be the positions within the range of motion of that profiler arm assembly that are nearest to one end of the arbor 122 and nearest to the opposite end of the arbor 122 (see e.g., FIGS. 14C and 14D, respectively).

In some embodiments, the range of motion of each of the profiler arm assemblies may be limited by the corresponding shaft 185. However, because the profiling position of the saw arm assembly depends on the position of the first profiler arm assembly, the range of motion of the saw arm assembly may depend in part on the position of the first profiler arm assembly. For example, saw arm assembly 174 may have a wider range of motion when the shaft 185a connected to profiler arm assembly 134 is fully retracted (as shown in FIGS. 12B-C) than when shaft 185a is at least partly extended. Regardless, actuator 182c may be actuated to move saw arm assembly 174 in opposite directions along arbor 122 between a profiling position, in which the circular saw 172 abuts or nearly abuts (e.g., is within 2 mm of) the first profiler head (FIG. 12B), and one or more splitting positions, in which the circular saw 172 is spaced apart from the first profiler head along the arbor (FIG. 12C).

Figure 13B:
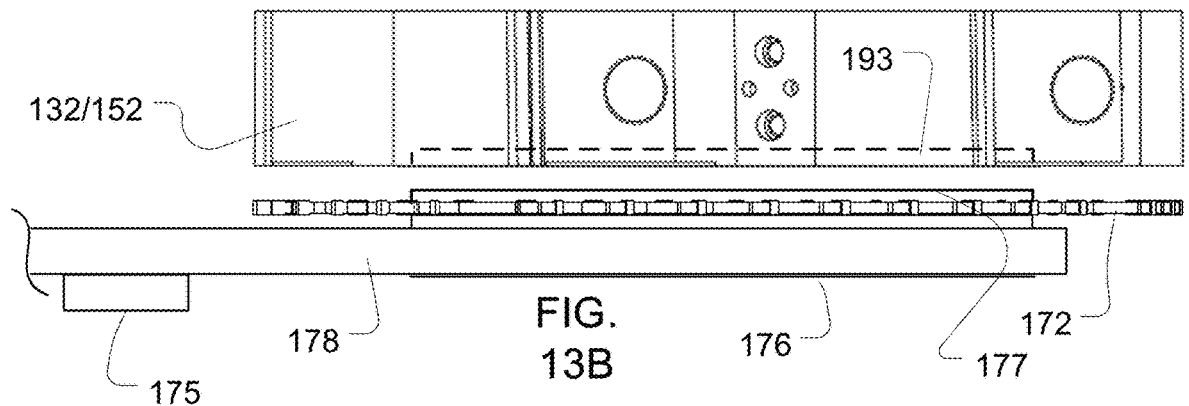
Figure 13C:
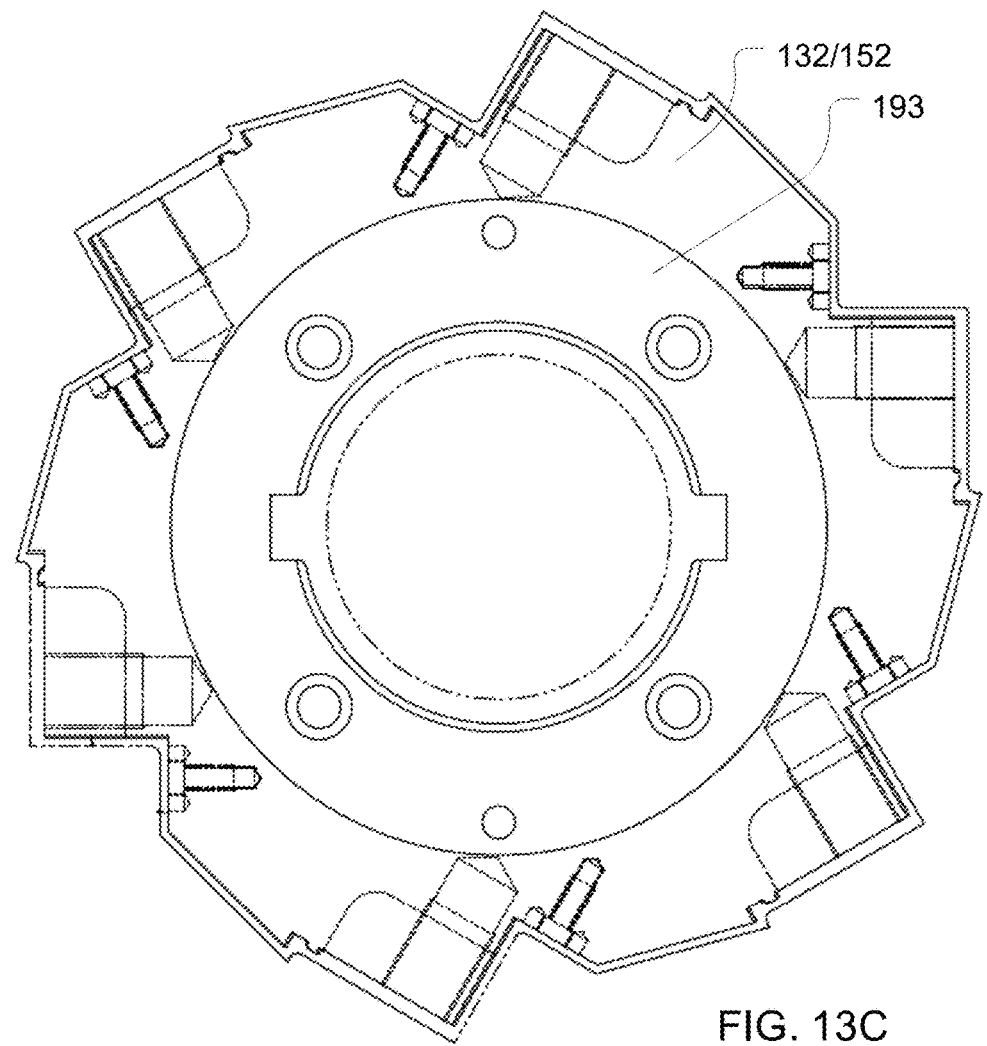
Figure 14A:
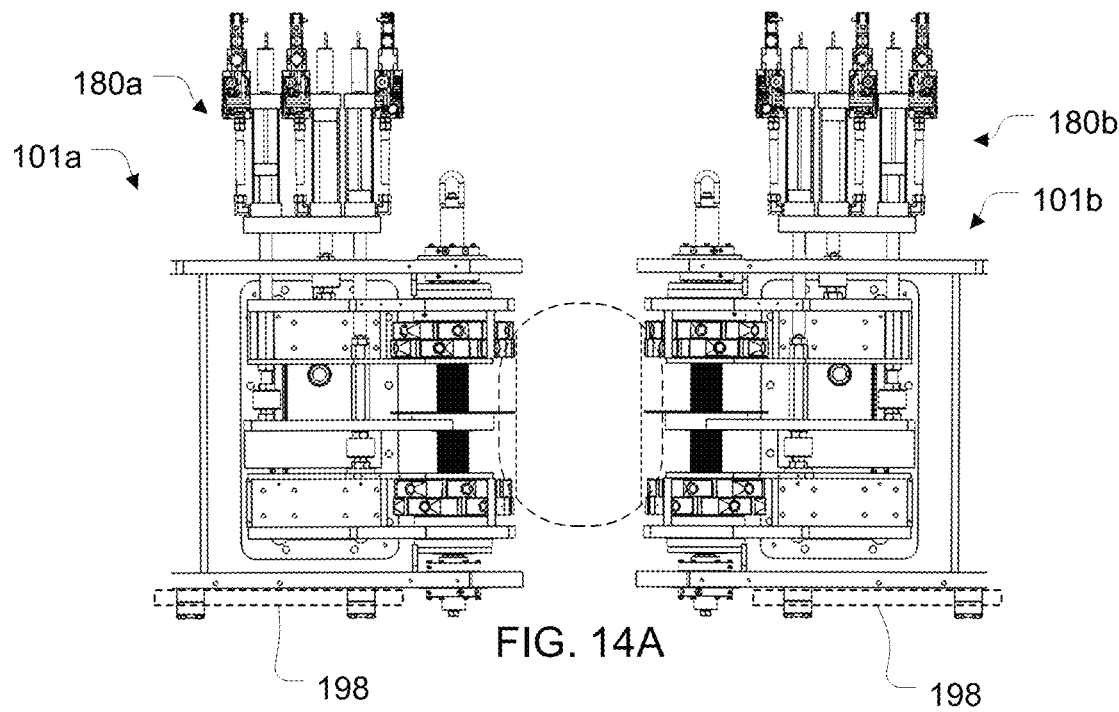
FIGS. 14A-B illustrate examples of splitter profiler assemblies with modules in vertical and horizontal orientations, respectively.
Figure 14B:
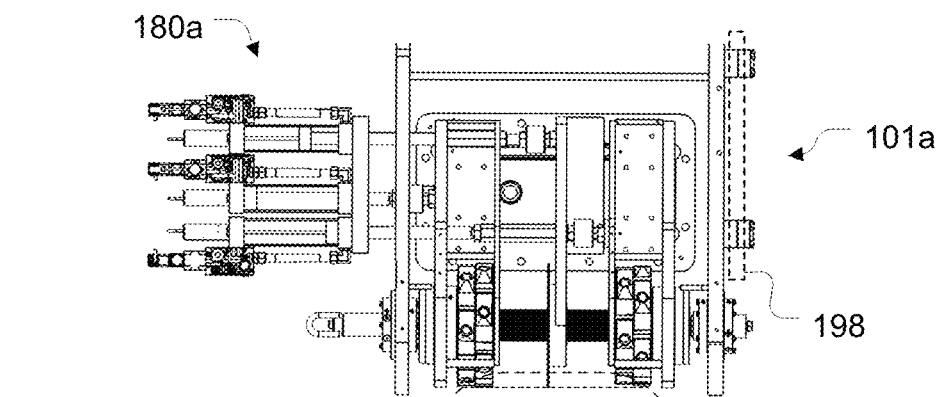

Additional embodiments of a saw arm assembly for a splitter profiler module are shown FIGS. 13A-C. In some embodiments, saw arm assembly 174 may include a stiffening ring 177 (FIG. 13A). Stiffening ring 177 may have a center annulus 177a and a plurality of holes 177b arranged circumferentially around the annulus. Optionally, stiffening ring 177 may be provided in two halves for ease of installation and/or maintenance. The holes 177b may align with corresponding holes in circular saw 172 and saw sleeve assembly 176 (e.g., in an outer rim or flange 163c of bearing housing 163), such that circular saw 172 may be retained between stiffening ring 177 and saw sleeve assembly 176 by screws, bolts, or other fasteners inserted through the holes. Optionally, a corresponding recess 193 may be provided in the corresponding end of first profiler head 132 (FIGS. 13B-C). Recess 193 may be dimensioned to accommodate stiffening ring 177 therein, allowing saw 172 to be moved into contact with the profiler head.

While the profiling position of the first saw arm assembly 174 has been described above with reference to first profiler arm assembly 134, the first saw arm assembly may instead be configured to cooperate with the second profiler head assembly 154 in the profiling position. For example, the saw arm 178 and saw sleeve assembly 176 may be mounted on the arbor in the opposite orientation (i.e., turned 180 degrees about the longitudinal axis of the saw arm), such that circular saw 172 is between the saw arm 178 and second profiler head 152. In that case, other portions of saw arm assembly may be omitted or rearranged accordingly. For example, walls 173a/173b (if present) may be connected to saw arm 178 such that they are between saw arm 178 and first profiler arm assembly 134.

Other arm assembly configurations are also possible. In some embodiments, one arm assembly may nest at least partially within another arm assembly. For example, saw arm assembly 174 may be configured to nest at least partially within first profiler arm assembly 134.

Figure 13D:
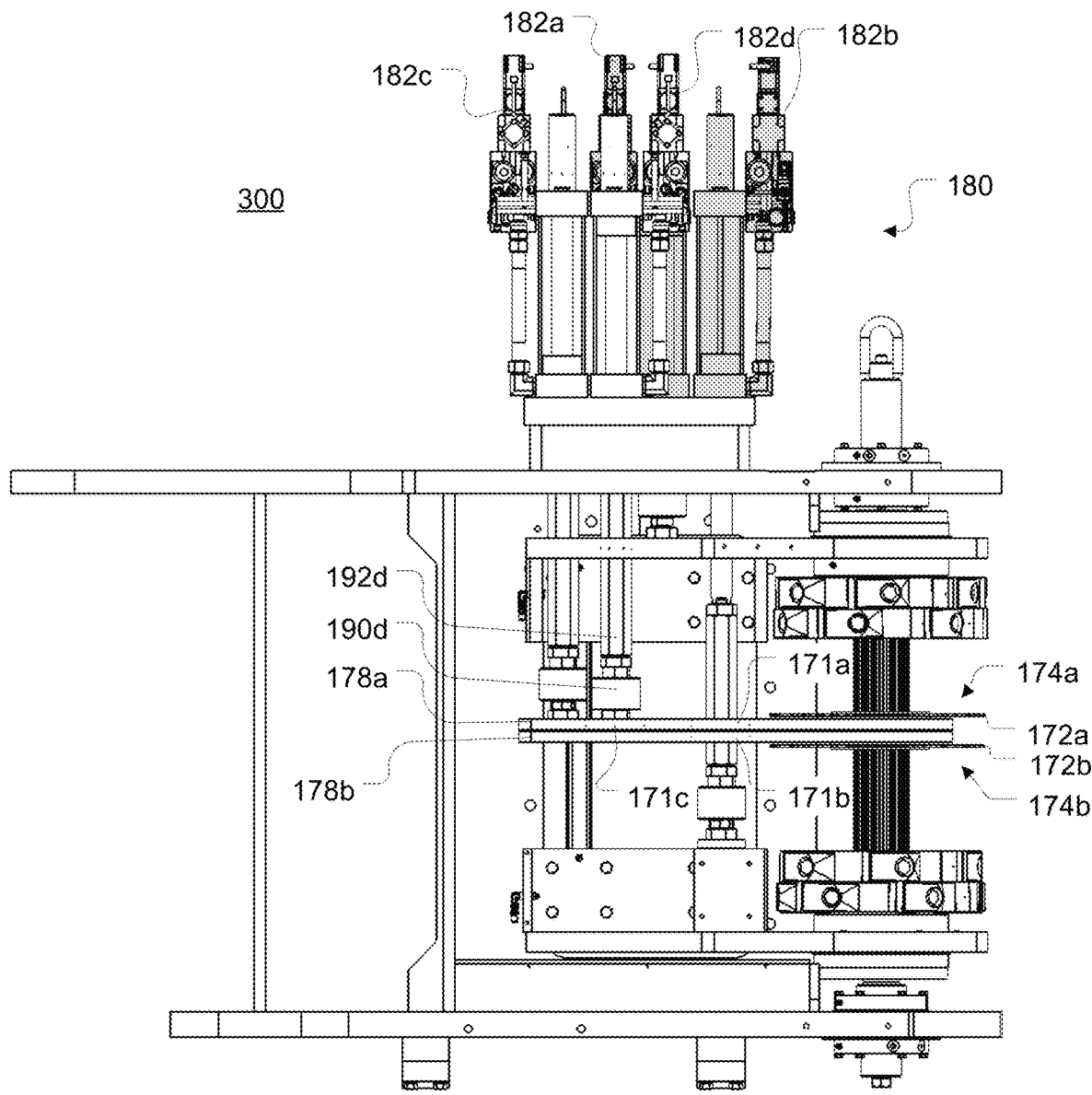

Some embodiments of a splitter profiler module may have two saw arm assemblies. Optionally, such embodiments may also have an additional actuator operatively coupled to the second saw arm assembly. An example of such an embodiment is shown in FIG. 13D. In this example, splitter profiler module 101 includes a second saw arm assembly 174b in addition to the first saw arm assembly 174a, and further includes an actuator 182*d* in addition to actuators 182*a-c*. (For clarity, the components of actuators 182*a* and 182*b* are shown in grey except for the respective shafts 185.) First saw arm assembly 174*a* may have a saw arm 178*a*, and second saw arm assembly 174*b* may have a corresponding saw arm 178*b*. First saw arm assembly 174*a* may be coupled to actuator 182*c* as described above. Second saw arm assembly 174*b* may be coupled to actuator 182*d* in a similar manner. For example, a distal end of the shaft of actuator 182*d* may be connected to an extension shaft 192*d*, which may be connected to a corresponding alignment cylinder 190*d*, which may in turn be connected to saw arm 178*b* by one or more nuts or other fasteners. Again, first saw arm 178*a* may have an aperture 171*a* dimensioned to allow passage of alignment cylinder 190*b* and extension shaft 192*d* through the first saw arm. Similarly, second saw arm 178*b* may have a corresponding aperture 171*b* that is aligned with aperture 171*a*. However, in embodiments with two circular saws, first saw arm 178*a* may have an additional aperture 171*c* dimensioned to allow passage of the alignment cylinder 190*d* and extension shaft 192*d* through first saw arm 178*a*. Like first saw arm assembly 174*a*, second saw arm assembly 174*b* may have a corresponding saw sleeve assembly and a corresponding one or more (e.g. a pair) of carriages positioned to engage guide members 115. However, the sleeve assemblies (and optionally, other components) saw arms 178*a* and 178*b* may be in opposite orientations, such that the saw arms 178*a* and 178*b* are between the corresponding circular saws 172*a* and 172*b* when mounted on arbor 122. In that case, circular saw 172*a* may abut the first profiler head 132 when the corresponding first saw arm assembly is in the profiling position, and circular saw 172*b* may abut the second profiler head 152 when the corresponding second circular saw arm assembly is in the profiling position.

Again, other arm assembly configurations are also possible. For example, in some embodiments, saw arm assembly 174*a* may be configured to nest at least partially within first profiler arm assembly 134 and saw arm assembly 174*b* may be configured to nest at least partially within second profiler arm assembly 154. Alternatively, one of the saw arm assemblies may be configured to nest at least partially within the other saw arm assembly.

A splitter profiler module/apparatus may be used in any suitable orientation relative to the feed path. For example, a single splitter profiler module may be positioned above or below the feed path with the arbor in a generally horizontal orientation, or positioned to one side of the feed path with the arbor in a generally vertical position. Similarly, a splitter profiler apparatus may include a pair of splitter profiler modules 101*a* and 101*b* with respective actuator assemblies 180*a* and 180*b*. In some embodiments, the splitter profiler modules may be configured for use along opposite sides of a feed path with the respective arbors in a generally vertical orientation (FIG. 14A). In other embodiments, the splitter profiler modules may be configured for use above and below the feed path with the respective arbors in a generally horizontal orientation (FIG. 14B). In still other embodiments, the splitter profiler module(s) may be configured for use above, below, or beside the feed path with the arbor(s) tilted relative to the horizontal/vertical.

Optionally, a splitter profiler module may include a tilt assembly that is operable to tilt the arbor and other components during curve/shape profiling operations. The splitter profiler module may have a reference position in which the arbor is in a given orientation, such as a generally vertical orientation (FIG. 14A), a generally horizontal orientation (FIG. 14B), or other known orientation, and the tilt assembly may be selectively operable to tilt the frame, arbor, profiler heads, and circular saw(s) relative to that reference position.

Figure 14C:
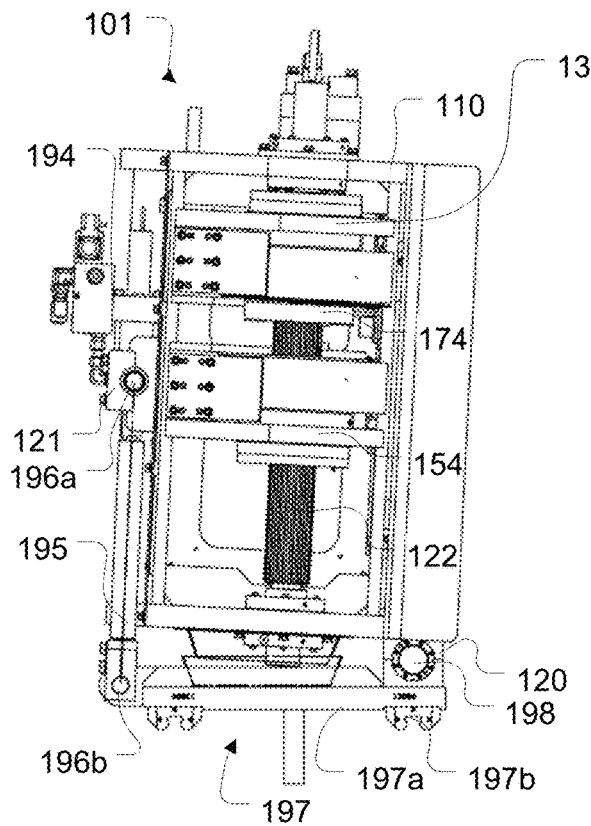
FIGS. 14C-D and FIG. 14E show side elevational views and a plan view, respectively, of a splitter profiler module with a tilt assembly, from a vantage point along the feed path.
Figure 14D:
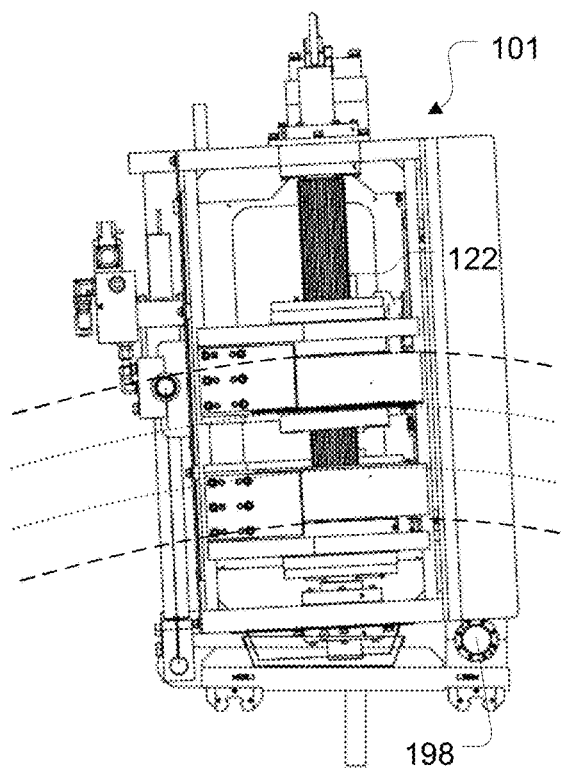
Figure 14E:
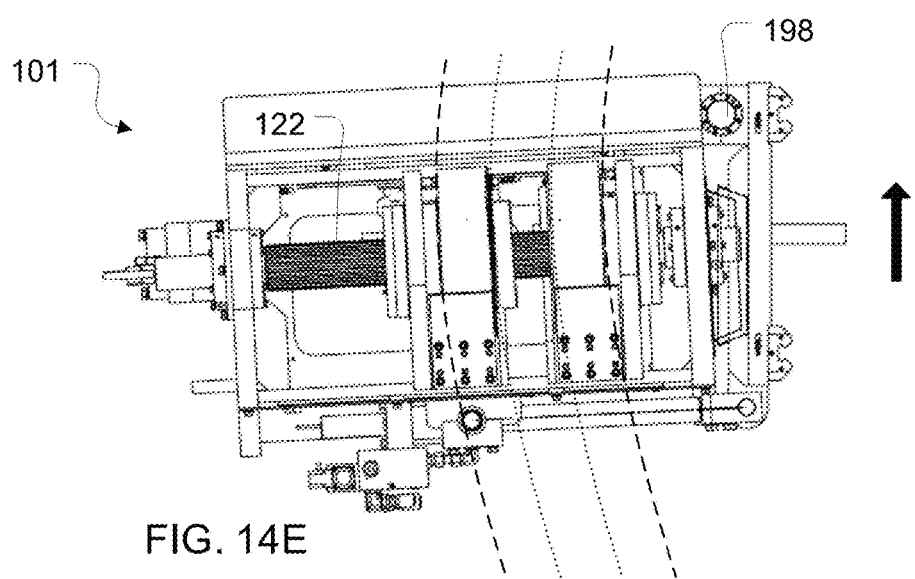
Figure 15:
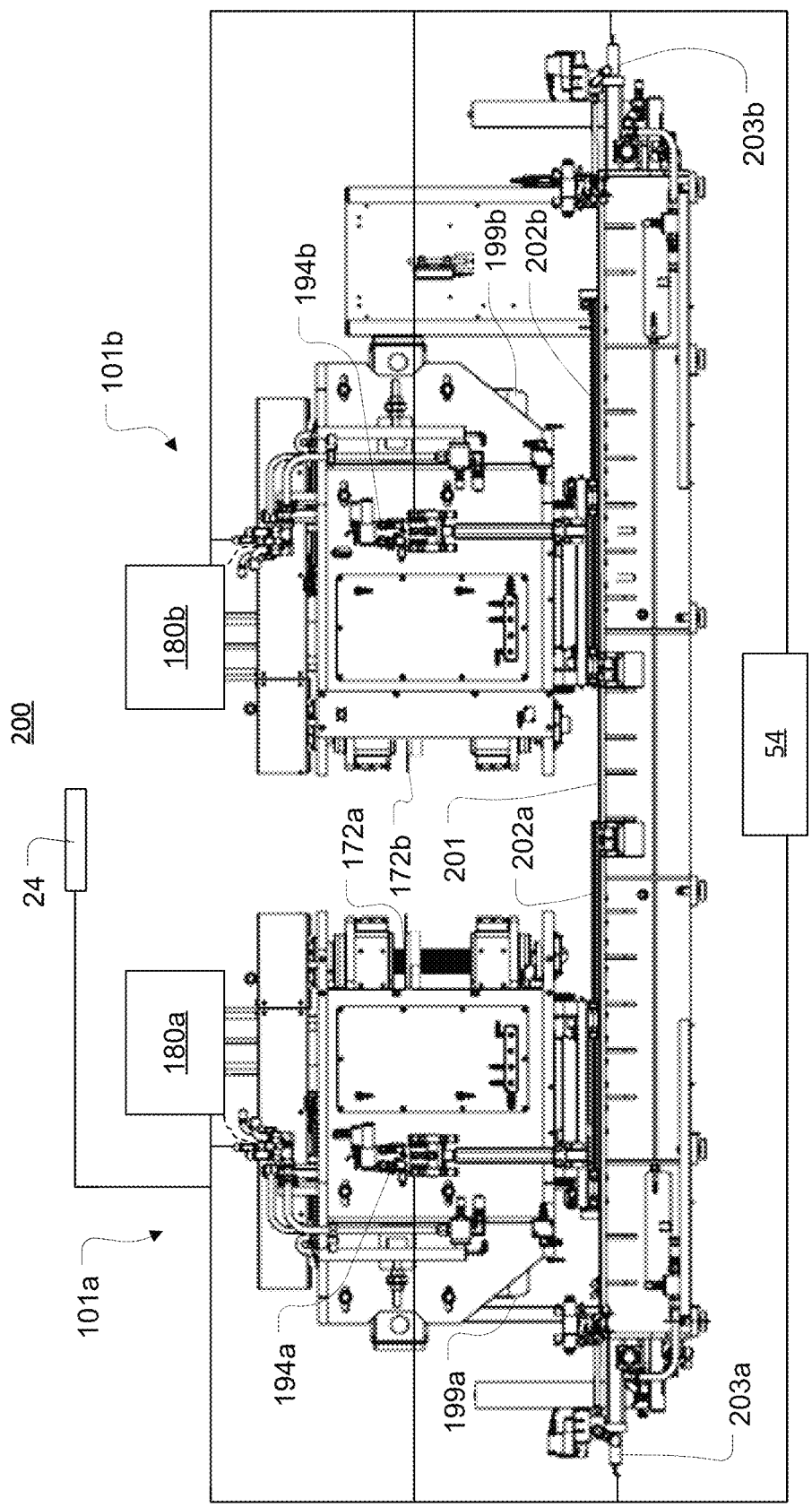
FIG. 15 shows a front elevational view of a splitter profiler apparatus and corresponding system.

FIGS. 14C-D and FIG. 14E show side elevational views and a plan view, respectively, of a splitter profiler module from a vantage point along the feed path. In the configuration of FIGS. 14C-D, the splitter profiler module is configured to tilt relative to vertical (e.g., relative to a reference position in which the arbor is generally vertical), and in the configuration of FIG. 14E, the splitter profiler module is configured to tilt relative to horizontal (e.g., relative to a reference position in which the arbor is generally horizontal).

Referring first to FIG. 14C, in some embodiments the tilt system (if present) may include a pivot actuator 194. Pivot actuator 194 may be, or may include, a linear actuator. The linear actuator may be a hydraulic cylinder. Alternatively, the linear actuator may be a pneumatic cylinder, a screw actuator, or another type of mechanical/electro-mechanical linear actuator. Regardless, pivot actuator 194 may include a shaft 195. In some embodiments, the linear actuator may be a hydraulic or pneumatic cylinder, and shaft 195 may be a piston. Optionally, shaft 195 may include an extension rod coupled to the distal end of the piston. In some embodiments, pivot actuator 194 or portions thereof may be similar or identical to actuator 182.

Pivot actuator 194 may be pivotably coupled to the frame of the splitter profiler module. For example, pivot actuator 194 may be coupled to a pivot pin 196*a* which is in turn coupled to a wall of the frame (e.g., wall 112 of frame 110) by brackets (e.g., pivot pin brackets 121) or other suitable means. The distal end of the shaft 195 may be pivotably coupled to an underlying support. In some embodiments, the underlying support may be a carriage upon which the frame, arbor, arm assemblies, and various other components of the splitter profiler module are supported, and the distal end of the shaft may be pivotably coupled to the carriage. For example, as shown in FIG. 14C, the distal end of shaft 195 may be pivotably coupled to an underlying carriage 197 by a second pivot pin 196*b*. In other embodiments, the distal end of the shaft may be coupled to an underlying carriage by other means, or coupled to a different type of support (e.g., a foundation, a wall, a frame of another machine center, etc.).

Pivot actuator 194 may be selectively operable to tilt the frame and various other components about a pivot axis. In some embodiments, the pivot axis may be defined by a pivot shaft coupled to the frame. For example, a pivot shaft 198 may be coupled with frame 110 by brackets (e.g., pivot shaft brackets 120) attached to the frame and/or the underlying support (e.g., carriage 197). Actuation of pivot actuator 194 to extend the shaft 195 may tilt the frame 110 and other components around the pivot shaft 198 in a first direction relative to the underlying support (e.g., carriage 197). Similarly, retraction of the shaft 195 may tilt the frame and other components about the pivot shaft 198 in the opposite direction.

In some embodiments, the splitter profiler module may have a reference position in which the arbor is in a generally vertical orientation and the pivot shaft 198 is in a generally horizontal orientation (see e.g., FIG. 14A). This configuration may enable tilting of the arbor relative to vertical (FIGS. 14C-D), thereby allowing the profiler heads and circular saw(s) to follow the curvature of a primary workpiece (shown schematically in broken lines, FIG. 14D) that is being fed in a flow direction (arrow) past the module in a 'horns down' or 'horns up' orientation, or in any orientation in which the curvature rises and falls relative to the feed path.

In other embodiments the splitter profiler module(s) may have a reference position in which the arbor is positioned above or below the feed path in a generally horizontal orientation and the pivot shaft 198 is in a generally vertical orientation (see e.g., FIG. 14B). This configuration may enable tilting of the arbor relative to horizontal (FIG. 14E), thereby allowing the profiler heads and circular saw(s) to follow the curvature of a primary workpiece (shown schematically in broken lines, FIG. 14E) that is being fed in a flow direction (arrow) past the module in a 'horns sideways' orientation, or other orientation in which the curvature is primarily lateral.

Other embodiments may lack a tilt assembly. For example, a tilt assembly may be omitted from a splitter profiler module that is intended for use downstream of a feed system that skews/slews the primary workpiece to offset the curvature while moving the primary workpiece through the splitter profiler module.

In various embodiments, carriage 197 (if present) may include a support platform 197a and bearing carriages 197b coupled to support platform 197a. The bearing carriages 197 may be configured to engage an underlying rail or track to allow movement of the carriage 197 (and the other components of the splitter profiler module supported thereon) along the rail or track. Optionally, bearing carriages 197b may be bearing blocks.

FIG. 15 illustrates an embodiment of a splitter profiler apparatus 200, and a corresponding splitter profiler system, in accordance with various embodiments.

Splitter profiler apparatus 200 may include a pair of splitter profiler modules 101 (101a and 101b, respectively). Each of the splitter profiler modules may have a corresponding actuator assembly 180 (180a and 180b, respectively).

In some embodiments, splitter profiler apparatus 200 may further include a base 201 with tracks 202a and 202b mounted to the base on opposite sides of the feed path. Each of the tracks 202a and 202b may be, or may include, a corresponding pair of linear rails oriented transverse to the feed path. The splitter profiler modules 101a and 101b may be movably coupled to the respective tracks and positioned on opposite sides of the feed path. For example, each of the splitter profiler modules may include a corresponding carriage (e.g., carriage 197) that is slideably mounted to the corresponding track (e.g., via bearing carriages 1907b).

Optionally, splitter profiler apparatus 200 may include drives 203a and 203b configured to move the modules 101a and 101b, respectively, along the respective tracks to thereby move the profiler modules toward and away from the flow path. Drives 203a and 203b may be hydraulic linear actuators, pneumatic linear actuators, mechanical/electro-mechanical linear actuators, or any other suitable type of drive.

In some embodiments the splitter profiler modules may have respective tilt assemblies with actuators 194 (194a and 194b, respectively). The tilt assemblies may be selectively operable, independently of one another, to tilt the frames of the respective splitter profiler modules about a pivot axis (e.g., around respective pivot shafts 198). Other embodiments may have other means for tilting the respective splitter profiler modules, or may lack means for tilting the splitter profiler modules.

In some embodiments each of the splitter profiler modules may have a corresponding motor (motors 199a and 199b, respectively) that is operatively coupled with the respective arbor. Collectively, the motors may be operable to drive the arbors of the splitter profiler modules in opposite rotational directions. Optionally, motor 199a may be attached to the frame of splitter profiler module 101a, and motor 199b may be attached to the frame of splitter profiler module 101b. In some embodiments, motors 199a and 199b may be electric motors (e.g., 200 horsepower electric motors). Power may be transmitted by the motors to the respective arbors by V-belts, poly chain, or other suitable means (not shown).

Other components of splitter profiler apparatus 200 may vary among embodiments. For example, embodiments with one or more hydraulic actuators may include a hydraulic system with hoses, manifolds, filters, valves, and other such items collectively configured to supply hydraulic fluid to the actuators of each of the splitter profiler modules as needed. Similarly, embodiments with one or more pneumatic actuators may include a pneumatic system with components collectively configured to supply pressurized air to both splitter profiler modules as needed. Embodiments with one or more mechanical or electro-mechanical actuators may include corresponding electrical systems.

In various embodiments, a splitter profiler system may include at least one splitter profiler module (e.g., splitter profiler module 101, 101a, or 101b). Optionally, in some embodiments the splitter profiler system may further include a control system (e.g., computer system 54) operatively coupled with the splitter profiler module.

The splitter profiler module may include a frame (e.g., frame 110), an arbor rotatably coupled to the frame, and a first saw arm assembly (e.g., saw arm assembly 174) movably coupled to the frame and the arbor. The splitter profiler module may further include a first actuator (e.g., actuator 182) coupled to the first saw arm assembly and the frame.

The control system may be operatively coupled with the first actuator. In some embodiments, the first actuator may include a linear positioner (e.g., linear positioner 182c). The linear positioner may be operable to move the first saw arm assembly along the arbor. The linear positioner may be a hydraulic cylinder linear positioner, a pneumatic cylinder linear positioner, or a mechanical or electro-mechanical linear positioner. Optionally, the actuator may further include a linear position sensor (e.g., linear position sensor 186) configured to detect a current position of the first saw arm assembly and/or an item attached thereto (e.g., the distal end of piston/shaft 185c or extension shaft 192c).

In some embodiments, the splitter profiler module may include both the first saw arm assembly and a second saw arm assembly (e.g., saw arm assemblies 174a and 174b). In that case, the splitter profiler module may include both the first actuator and a second actuator (e.g., actuators 182a and 182b) operatively coupled to the first and second saw arm assemblies, respectively, and the control system may be operatively coupled with the first and second actuators.

Regardless, the splitter profiler module may further include a profiler arm assembly (e.g., profiler arm assembly 134 or 154) movably coupled to the frame/arbor, and an additional actuator (e.g., actuator 182a or 182b) operatively coupled to the frame and the profiler arm assembly. In some embodiments the splitter profiler module may include two profiler arm assemblies (e.g., profiler arm assembles 134 and 154) movably coupled to the frame and the arbor, and two additional actuators (e.g., actuators 182a and/or 182b), each operatively coupled with a respective profiler arm assembly. In either case, the control system may be coupled with the additional actuator(s).

Optionally, the control system may be operatively coupled with one or more additional components of the splitter profiler module. For example, in some embodiments the splitter profiler module may further include a motor (e.g., motor 199a or 199b) coupled to the arbor, and the control system may be operatively coupled to the motor. Some splitter profiler modules may include a tilt assembly with a corresponding additional actuator (e.g., actuator 194a/194), and the control system may be operatively coupled to the additional actuator.

In some embodiments, the splitter profile module may be one of a pair of modules of a splitter profiler system (e.g., splitter profiler system 200). In that case, each of the two splitter profiler modules (e.g., splitter profiler modules 101a and 101b) may have a corresponding frame, arbor, first saw arm, and first actuator as described above, and the control system may be operatively coupled with both of the first actuators. Optionally, each of the splitter profiler modules may have a second saw arm and second actuator, first/second profiler arm(s) and corresponding additional actuator(s), a motor, and/or a tilt assembly with a corresponding additional actuator, as described above. In that case, the control system may be operatively coupled with some or all of the additional actuators.

In addition, in some embodiments the computer system may be operatively coupled with other components of the splitter profiler apparatus. For example, the splitter profiler apparatus may include a base (e.g., base 201) with tracks mounted thereon (e.g., tracks 202a, 202b) and a pair of drives (e.g., drives 203a and 203b) operable to move the splitter profiler modules along the tracks toward and away from the flow path. In such embodiments the control system may optionally be operatively coupled with the drives. Alternatively, the drives may be controlled by other means.

In some embodiments the splitter profiler system may further include a sensor 24 positioned upstream of the splitter profiler modules and operatively coupled with computer system 54. Sensor 24 may include one or more laser triangulation sensors and/or vision sensors. For example, in some embodiments sensor 24 may include a pair of vision sensors positioned on opposite sides of the feed path, and/or a pair of triangulation sensors positioned on opposite sides of the feed path, between the splitter profiler apparatus/module and an upstream chipper (e.g., chipper 28 or 36), such that the sensors are positioned to view the cut/chipped faces of the primary workpiece upstream of the splitter profiler apparatus/module. In various embodiments, the splitter profiler system may include one or more sensors 24 and/or other sensors located upstream, downstream, or both upstream and downstream of the splitter profiler apparatus/module (see e.g., FIGS. 1D-E). Alternatively, the splitter profiler system may lack sensors 24.

Figure 16:
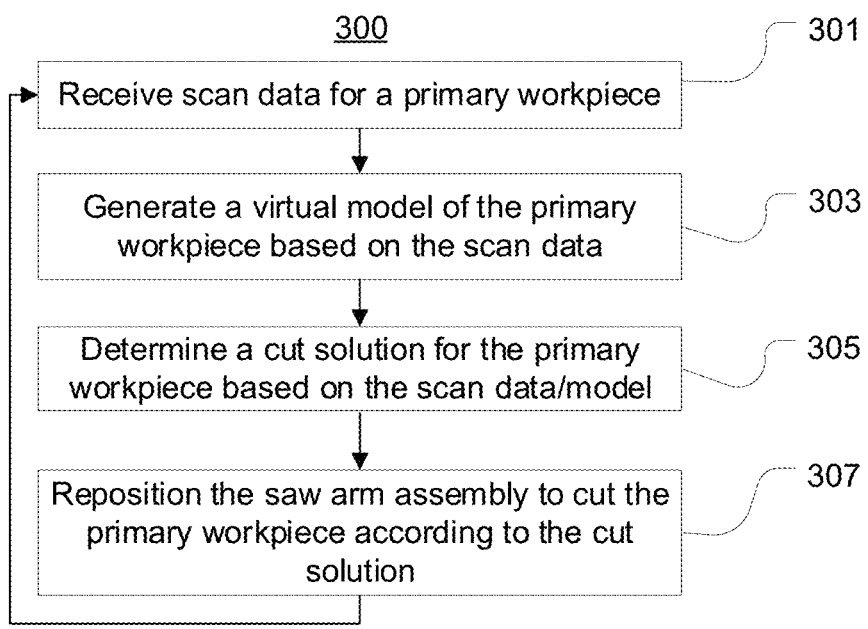
FIG. 16 is a flow diagram of a method of obtaining sideboards from a primary workpiece.

In various embodiments, the control system may be configured to control the first saw arm assembly to cut a primary workpiece according to a cut pattern for the primary workpiece. FIG. 16 illustrates a flow diagram of a corresponding computer-implemented method 300, in accordance with various embodiments.

Optionally, at block 301 the control system (e.g., computer system 54) may receive a scan of a primary workpiece, such as a log or a cant. The scan may be received from one or more sensors (e.g., sensor(s) 24) in the form of scan data. The scan data may include vision image data and/or 3D geometric data (e.g., from laser triangulation sensors).

Optionally, at block 303 the control system may generate a virtual model of the primary workpiece based on the received scan data. For example, the control system may combine multiple vision images into a single image, or assemble received dimension coordinates/data points into a 3D model, or both.

Optionally, at block 305, the control system may determine a cut solution for the primary workpiece based on the scan data and/or virtual model. In some embodiments, the control system may compare the model with a group of predetermined cut solutions to identify the cut solution that best fits the model or is the most profitable. In other embodiments, the control system may determine a cut solution according to a set of rules entered by the operator, with or without the use of predetermined cut solutions. In some embodiments the control system may identify a desired position (e.g., rotational position, lateral offset, and/or skew) for the primary workpiece on a conveyor (e.g., a sharp chain), and the control system may select or determine a cut pattern for the primary workpiece in that position. The desired position may be chosen based at least in part on various factors such as a predicted stability of the primary workpiece on the conveyor (e.g., a 'horns down' orientation may be more stable than a 'horns up' orientation), the configuration/layout of downstream processing equipment (e.g., whether the downstream saw center cuts vertically or horizontally), desired cut products, predicted value of cut products, processing speed through various machine centers, and/or other such factors.

In other embodiments, blocks 301-305 may be omitted, and method 300 may begin at block 307. For example, in some embodiments the control system may be configured to receive the cut pattern from another computer system, and to control the saw arm assembly(ies) based at least in part on the received cut pattern. This may decrease the processing load on the control system. In either case, the cut solution may define predicted cut lines along which the primary workpiece is to be cut to obtain desired cut products. In some cases, one or more of the cut products may be sideboards.

At block 307, the control system may reposition a saw arm assembly (e.g., saw arm assembly 174, 174a, or 174b) of a splitter profiler module to cut the primary workpiece according to the cut solution. A corresponding process 400 is shown by way of example in FIG. 17.

Figure 17:
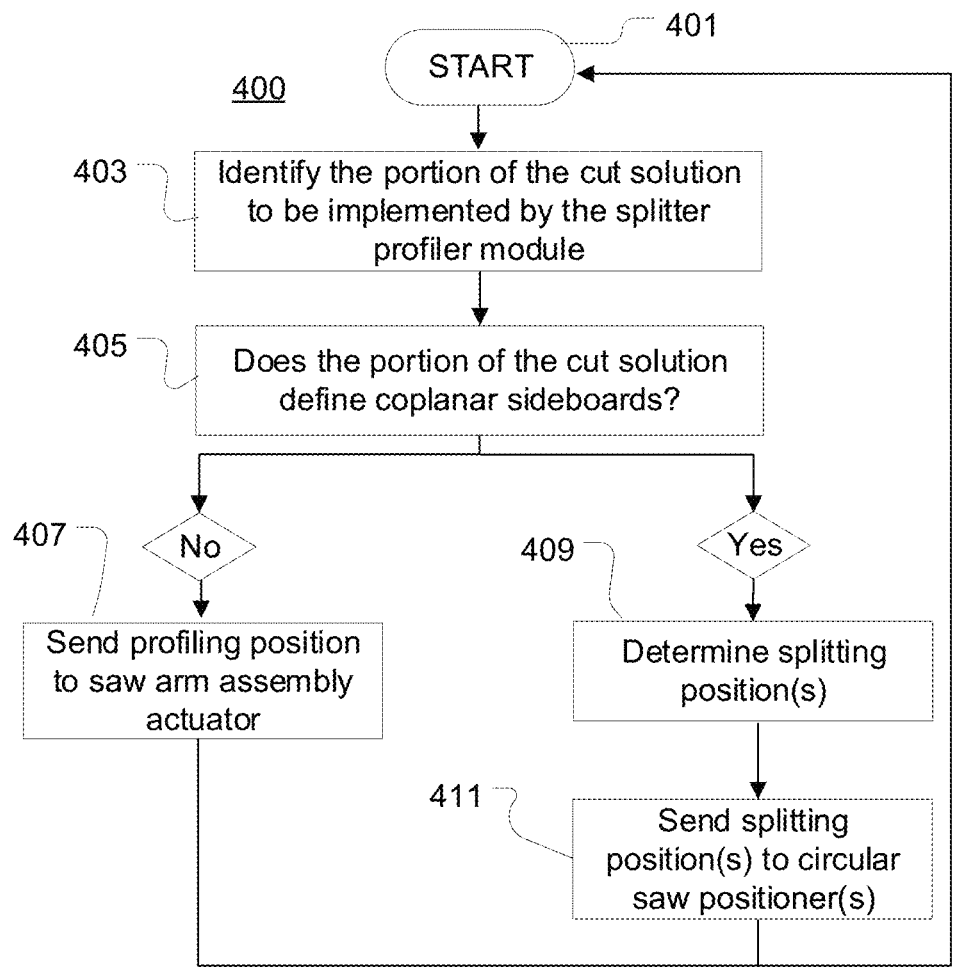
FIG. 17 is a flow diagram of a method of controlling a splitter profiler module/apparatus.

Referring now to FIG. 17, process 400 may begin at block 401. In some embodiments, the control system may proceed from block 401 to 403 in response to receiving (or determining, or selecting) a cut solution for the primary workpiece.

At block 403, the control system may identify the portion of the cut solution that is to be implemented by the splitter profiler module. In some embodiments, the control system may receive this information from another computer system as part of the cut solution, or with the cut solution. Alternatively, the control system may be programmed to identify the corresponding portion of the cut solution based on factors such as the location of the splitter profiler module relative to the feed path (e.g., whether it is to the right or left, or above or below, the feed path) and/or relative to other equipment along the same primary breakdown line (e.g., whether it is part of a first splitter profiler apparatus that is used to form outer sideboards or part of a second splitter profiler apparatus that is used to form inner sideboards).

For example, if the splitter profiler module is positioned along the left side of the flow path and no other splitter profiler modules are upstream of it along that side of the flow path, the control system may identify the left outer sideboard portion of the cut solution as the corresponding portion. As another example, if the splitter profiler module is positioned along the right side of the flow path and another splitter profiler module is upstream of it along the flow path, the control system may identify the right inner sideboard portion of the cut solution as the corresponding portion.

At block 405, the control system may determine whether the corresponding portion of the cut solution defines coplanar sideboards. In some embodiments, the computer system may identify coplanar sideboards by determining whether the corresponding portion of the cut solution includes one side board or more than one side board. If the splitter profiler module includes two saw arm assemblies with respective circular saws, the computer system may also determine whether the corresponding portion of the cut solution includes three sideboards. If the cut solution defines only one side board, the method may proceed to block 407.

At block 407, the control system may send instructions to the corresponding actuator (e.g., actuator 182c or 182d) to move the saw arm assembly to a profiling position in which the circular saw (e.g., circular saw 172, 172a, or 172b) coupled to the saw arm assembly is in contact with, or nearly in contact with (e.g., within 2 mm away from) a corresponding surface of the corresponding profiler head. If the splitter profiler module includes two saw arm assemblies (e.g., saw arm assemblies 174a and 174b), the control system may send instructions to both corresponding actuators (e.g., actuators 182c and 182d) to move the respective saw arm assemblies to the respective profiling positions, such that both of the circular saws are in contact with, or nearly in contact with, the corresponding profiling heads.

In some embodiments, the control system may instruct the corresponding actuator to move the saw arm assembly toward the corresponding profiler head until a predetermined amount of resistance is detected (as the result of contact between the circular saw and profiler head, or contact between the saw arm assembly and the profiler arm assembly). Alternatively, the control system may determine the profiling position based on the cut solution, an actual or predicted position of the corresponding profiler arm assembly, and/or a lookup table. In some embodiments, the control system may be configured to determine the profiling position in the same or similar manner as the desired positions for the profiler arm assemblies/profiler heads. The control system may then return to block 401 until the next cut pattern is received, determined, or selected.

If the control system determines at block 405 that the corresponding portion of the cut solution defines two sideboards, and the splitter profiler apparatus has only one saw arm assembly, the method may proceed from block 405 to block 409. Likewise, if the splitter profiler apparatus has two saw arm assemblies and the control system determines at block 405 that the corresponding portion of the cut solution defines three sideboards, the method may proceed to block 409.

At block 409, the control system may determine the splitting position(s) for the saw arm assembly(ies). Again, the control system may determine a splitting position based on the cut solution, an actual or predicted position of the corresponding profiler arm assembly, and/or a lookup table. In some embodiments, the control system may be configured to determine the splitting position in the same or similar manner as the desired positions for the profiler arm assemblies/profiler heads. The control system may send the splitting position(s) to the corresponding actuator(s) at block 411. The control system may then return to block 401.

If the splitter profiler module includes two saw arm assemblies, and the control system determines at block 405 that the corresponding portion of the cut solution defines only two sideboards, the control system may send a profiling position for one of the saw arm assemblies to the corresponding actuator, and send a splitting position for the other saw arm assembly to that corresponding actuator. Thus, in some embodiments the control system may perform blocks 407 and blocks 409/411, either simultaneously or in succession, and then return to block 401. Likewise, if the control system is controlling multiple splitter profiler modules, or multiple splitter profiler apparatuses, the control system may perform any or all of these operations for each of the saw arm assemblies simultaneously and/or in succession.

Optionally, the control system may be programmed to receive position data from the linear position sensor(s). The control system may also be programmed to implement a corrective action based at least in part on data received from the linear position sensor. For example, the control system may be programmed to instruct motor 199a/199b to shut down in response to a determination that the actual position of the saw arm assembly is incorrect, or has not changed in response to prior repositioning instructions.

Figure 18:
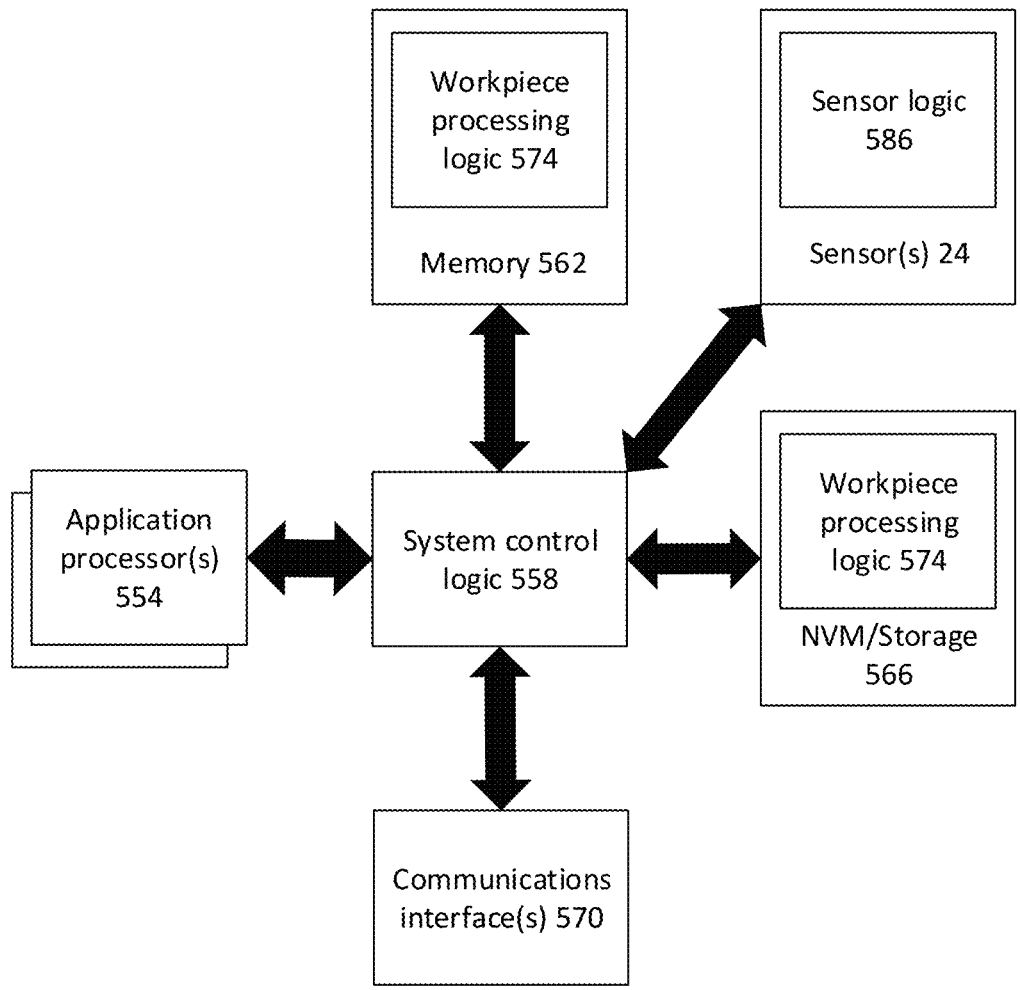
FIG. 18 is a schematic diagram of a computer system suitable for use with a splitter profiler module/apparatus.

FIG. 18 illustrates an example of a computer system 54 suitable for performing some or all of the operations/methods described herein, in accordance with various embodiments.

As illustrated, computer system 54 may include system control logic 558 coupled to at least one of the processor(s) 554, memory 562 coupled to system control logic 558, non-volatile memory (NVM)/storage 566 coupled to system control logic 558, and one or more communications interface(s) 570 coupled to system control logic 558. In various embodiments, system control logic 558 may be operatively coupled with sensors (e.g., sensor(s) 24) and/or an output device (e.g., a user interface, display, another computer, etc.). In various embodiments the processor(s) 554 may be a processor core.

System control logic 558 may include any suitable interface controller(s) to provide for any suitable interface to at least one of the processor(s) 554 and/or any suitable device or component in communication with system control logic 558. System control logic 558 may also interoperate with the sensors and/or the output device(s).

System control logic 558 may include one or more memory controller(s) to provide an interface to memory 562. Memory 562 may be used to load and store data and/or instructions, for example, for various operations of a splitter profiler module (e.g., splitter profiler module 101, 101a, or 101b) or splitter profiler apparatus (e.g., splitter profiler apparatus 100/200). In one embodiment, system memory 562 may include any suitable volatile memory, such as suitable dynamic random access memory ("DRAM").

System control logic 558, in one embodiment, may include one or more input/output ("I/O") controller(s) to provide an interface to NVM/storage 566 and communications interface(s) 570.

NVM/storage 566 may be used to store data and/or instructions, for example. NVM/storage 566 may include any suitable non-volatile memory, such as flash memory, for example, and/or any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 566 may include a storage resource that may physically be a part of a device on which computer system 54 is installed, or it may be accessible by, but not necessarily a part of, the device. For example, the NVM/storage 566 may be accessed over a network via the communications interface(s) 570.

System memory 562, NVM/storage 566, and/or system control logic 558 may include, in particular, temporal and persistent copies of workpiece processing logic 574. The workpiece processing logic 574 may include instructions operable, upon execution by at least one of the processor(s) 554, to cause computer system 54 to practice one or more aspects of operations described herein (e.g., receive and process scan data, generate a 3D model of a primary workpiece, determine a desired rotational position/skew/offset position, determine/select/receive a cut solution, determine actual and/or desired positions of the saw arm assembly(ies), determine profiling positions and splitting positions for the saw arm assembly(ies), generate and send positioning instructions to actuators to reposition saw arm assembly(ies), profiler arm assembly(ies), and/or splitter profiler modules, monitor/analyze performance of saw arm assembly positioners and other equipment, etc.)

Communications interface(s) 570 may provide an interface for computer system 54 to communicate over one or more network(s) and/or with any other suitable device. Communications interface(s) 570 may include any suitable hardware and/or firmware, such as a network adapter, one or more antennas, a wireless interface, and so forth. In various embodiments, communication interface(s) 570 may include an interface for computer system 54 to use NFC, optical communications (e.g., barcodes), BlueTooth or other similar technologies to communicate directly (e.g., without an intermediary) with another device. In various embodiments, the wireless interface may interoperate with radio communications technologies such as, for example, WCDMA, GSM, LTE, and the like.

The capabilities and/or performance characteristics of processors 554, memory 562, and so forth may vary. In various embodiments, computer system 54 may include, but is not limited to, a smart phone, a computing tablet, a laptop computer, a desktop computer, a programmable logic controller (PLC), and/or a server. In various embodiments computer system 54 may be, but is not limited to, one or more servers known in the art.

In one embodiment, at least one of the processor(s) 554 may be packaged together with system control logic 558 and/or workpiece processing logic 574. For example, at least one of the processor(s) 554 may be packaged together with system control logic 558 and/or workpiece processing logic 574 to form a System in Package ("SiP"). In another embodiment, at least one of the processor(s) 554 may be integrated on the same die with system control logic 558 and/or workpiece processing logic 574. For example, at least one of the processor(s) 554 may be integrated on the same die with system control logic 558 and/or workpiece processing logic 574 to form a System on Chip ("SoC").

The computer system 54 may be configured to perform any or all of the calculations, operations, and/or functions described above and/or in FIGS. 16-17 or other Figures.

Figure 19:
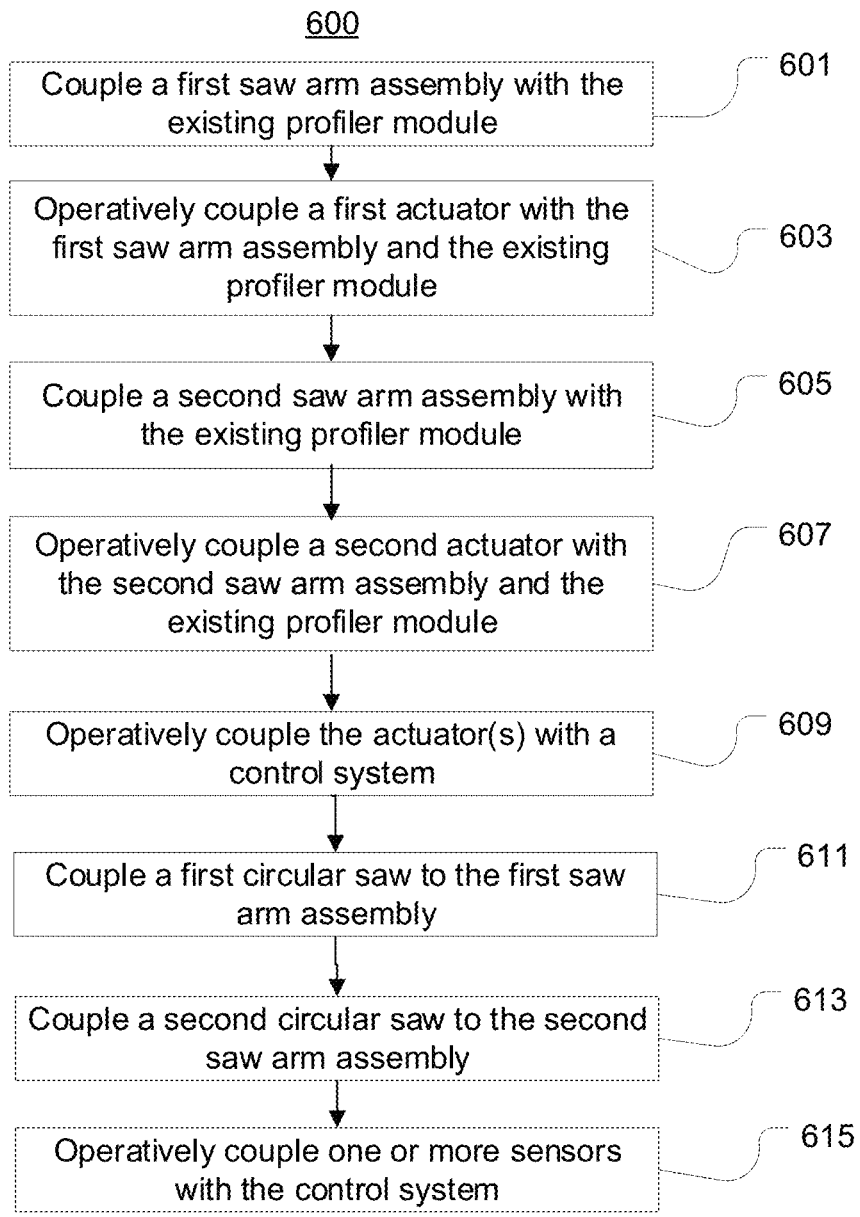
FIG. 19 is a flow diagram of a method of modifying an existing profiler module/apparatus to form a splitter profiler module/apparatus, all in accordance with various embodiments.

In some embodiments, an existing profiler module, apparatus, or system may be upgraded to a splitter profiler module, apparatus, or system. An example of such a method is illustrated in FIG. 19, in accordance with various embodiments.

Some or all of the operations of method 600 may be performed to modify a profiler module to form a splitter profiler module. For example, the method may be used to modify a single, stand-alone profiler module intended for use along a primary breakdown line that cuts sideboards from only one side of the primary workpiece, or a primary breakdown line that sends the primary workpiece through the profiler module multiple times to cut outer and inner sideboards from one side, or turns the primary workpiece before returning the workpiece through the profiler module to cut sideboards from multiple sides in succession.

A profiler apparatus that includes a pair of profiler modules may be modified to form a splitter profiler apparatus by performing some or all of the operations of method 600 to modify one of the profiler modules and repeating at least some of those operations to modify the other profiler module of the pair. Likewise, a second splitter profiler apparatus may be modified in the same or similar manner. Alternatively, the method may be used to modify only one of the profiler modules of a pair. For example, if the mill wishes to cut coplanar sideboards from one side of the primary workpieces, and the primary workpieces are to be turned upstream of the profiler module to position the coplanar sideboards on a particular side (e.g., the left side, the right side, the top, the bottom, etc.), the profiler module on that side may be modified without modifying the other profiler module of the pair.

While various operations of method 600 are described below in a particular order by way of example, the operations may be performed in any order. Various operations may be omitted, repeated, or performed simultaneously.

In various embodiments, method 600 may begin at block 601. At block 601, a first saw arm assembly (e.g., saw arm assembly 174/174a) may be coupled with the existing profiler module. The existing profiler module may be a stand-alone profiler module or one of a pair of the profiler modules of a profiler apparatus/system. Regardless, the existing profiler module may have a frame (e.g., frame 210) configured to support an arbor (e.g., arbor 122), and one or more profiler heads (e.g., profiler heads 132/52) configured to be mounted along the arbor to be driven in rotation by the arbor. Optionally, the existing profiler module may further include various drives, guards, guides, and other such components.

The first saw arm assembly may be configured to be coupled with a circular saw (e.g., circular saw 172). In various embodiments, the first saw arm assembly may be coupled with the existing profiler module by coupling the saw sleeve assembly to the frame, or to the arbor, or to both the frame and the arbor, of the existing profiler module. For example, the first saw sleeve assembly may include a saw arm (e.g., first saw arm 178) with one or more carriages (e.g., carriages 175), and the saw arm may be coupled with the existing frame by movably coupling the carriage(s) to corresponding guide member(s) of the existing frame (e.g., guide members 115). If the frame does not include the guide member(s), the method may further include coupling the guide member(s) with the frame.

As another example, the first saw arm assembly may include the saw arm and a saw sleeve assembly (e.g., saw sleeve assembly 174/174a), and the first saw arm assembly may be coupled with the existing profiler module by coupling the saw sleeve assembly to the arbor (e.g., arbor 122) and coupling the first saw arm to the saw sleeve assembly. Optionally, coupling the first saw arm assembly with the frame may further include rotatably coupling the arbor to the frame.

In some embodiments, the first saw arm assembly may include a saw arm, a saw sleeve assembly coupled to the saw arm, and one or more guide members coupled to the saw arm, and the first saw arm assembly may be coupled with the existing profiler module by movably coupling the first saw arm assembly to the frame and coupling the saw sleeve assembly with the arbor generally as described above.

At block 603, a first actuator (e.g., actuator 182c) may be operatively coupled with the first saw arm assembly. In some embodiments, a first portion of the first actuator (e.g., a cylinder) may be attached to the frame of the existing profiler module, and a second portion of the first actuator (e.g., shaft 185*a*) may be connected to the first saw arm. The second portion of the first actuator may be connected to the first saw arm directly or indirectly via an extension shaft, an alignment cylinder, and/or fasteners (e.g., nuts, bolts, etc.).

Optionally, at block 605, a second saw arm assembly (e.g., saw arm assembly 174*b*) may be coupled with the existing profiler apparatus in the same or similar manner as described above with regard to block 601. If so, at block 607 a second actuator (e.g., actuator 182*d*) may be coupled with the existing profiler apparatus and the second saw arm assembly in the same or similar manner as described above with regard to block 603. In other embodiments, blocks 605 and 607 may be omitted.

Optionally, at block 609, the actuator(s) may be operatively coupled with a control system (e.g., computer system 54). The control system may be programmed to determine a desired position for the saw arm assembly based on a cut solution for the primary workpiece, and to send positioning instructions to the respective actuator to thereby cause the saw arm assembly to be moved to the desired position. In various embodiments, the computer system may be programmed to perform any or all of the operations described above with regard to FIGS. 16-18.

Optionally, at block 611, a first circular saw (e.g., circular saw 172) may be coupled to the first saw arm assembly. In some embodiments, the circular saw may be coupled to the first saw arm assembly with fasteners such as bolts, screws, or other such items. In some embodiments, the fasteners may extend through the circular saw into a portion of the first saw arm assembly. If a second saw arm assembly was coupled with the existing profiler module at block 605, at block 613 a second circular saw may be coupled to the first saw assembly in the same or similar manner.

Optionally, at block 615, the control system may be operatively coupled with one or more sensors (e.g., sensor(s) 24). In some embodiments, the control system may be configured to receive data from the sensor(s) and to determine or modify the desired saw position based at least on part on the received data. Similarly, in some embodiments the control system may be operatively coupled with other sensors and/or computer systems along the primary breakdown line or other processing lines. This may be done, for example, to enable the control system to receive scan data, cut patterns, models of workpieces, and other useful information, and/or to decrease processing load on the control system by allocating processing tasks among multiple computers.

Again, some of the above operations may be omitted in some embodiments. For example, some embodiments of method 600 may include only block 601, or only blocks 601 and 603, or only blocks 601, 603, and 609. Other embodiments may include only block 609, or only blocks 609 and 615.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A splitter profiler module for forming board profiles along wood workpieces such as logs or cants, the splitter profiler module comprising:
   a frame;
   an arbor rotatably coupled with the frame;
   a first profiler head and a second profiler head mounted along the arbor, wherein the profiler heads are configured to chip wood material from the wood workpieces; and
   a first saw arm assembly movably coupled to the arbor and the frame, wherein the first saw arm assembly is configured to retain a first circular saw blade mounted along the arbor between the profiler heads, and the first saw arm assembly is selectively moveable relative to the frame to thereby move the first circular saw blade axially along the arbor, wherein the first saw arm assembly includes a saw sleeve assembly with an opening configured to slideably engage the arbor, and wherein the first saw arm assembly is movable relative to the frame from a profiling position, in which the first circular saw blade is in contact with or substantially abutting the first profiler head, to one or more splitting positions in which the first circular saw blade is spaced apart from the first profiler head along the arbor.

2. The splitter profiler module of claim 1, wherein the saw arm assembly includes a saw arm, and the saw sleeve assembly is mounted to the saw arm, and wherein the first saw arm assembly is configured to hold the first circular saw blade within 2 millimeters away from a corresponding surface of the first profiler head while the first saw arm assembly is in the profiling position.

3. The splitter profiler module of claim 1, wherein the saw sleeve assembly includes a first portion and a second portion, the first portion includes said opening, and the first portion is disposed at least partially through the second portion.

4. The splitter profiler module of claim 3, wherein the first portion includes a bearing housing, a bushing, or a sleeve bearing, and the second portion includes a roller bearing.

5. The splitter profiler module of claim 4, wherein the first portion has a flange with a plurality of through-holes for coupling the circular saw blade to the flange.

6. The splitter profiler module of claim 1, wherein the first and second profiler heads are mounted to first and second profiler arms, respectively, the first saw arm is between the first and second profiler arms, and the first saw arm is configured to contact, or to nest partially within, a respective portion of the first profiler arm while in the profiling position.

7. The splitter profiler module of claim 1, further including a carriage coupled to the saw arm and a guide member coupled to the frame, wherein the guide member is oriented substantially parallel to the arbor and the carriage is configured to movably engage the guide member.

8. The splitter profiler module of claim 7, further including a first actuator coupled to the frame and the saw arm, wherein the first actuator includes a cylinder and a piston, the cylinder is mounted to the frame and the piston is coupled to the saw arm and oriented generally parallel to the arbor, and the first actuator is selectively operable to move the saw arm relative to the frame.

9. The splitter profiler module of claim 8, further including a first profiler arm assembly with a profiler arm, and a second actuator coupled with the frame and the profiler arm, wherein the profiler arm is movably coupled with the frame and the first profiler head is mounted to the profiler arm, and the second actuator is selectively actuable to move the profiler arm relative to the frame to thereby move the first profiler head axially along the arbor.

10. The splitter profiler module of claim 9, further including a second profiler arm assembly with a second profiler arm, and a third actuator coupled with the frame and the second profiler arm, wherein the second profiler arm is movably coupled with the frame and the second profiler head is mounted to the second profiler arm, and the third actuator is selectively actuable to move the second profiler arm relative to the frame to thereby move the second profiler head axially along the arbor.

11. The splitter profiler module of claim 9, wherein the first actuator further includes a shaft with a first end and an opposite second end, the first end is coupled to the piston and the second end is coupled to the saw arm, and the shaft is disposed through an opening in the profiler arm.

12. The splitter profiler module of claim 1, further including a second saw arm assembly with a second saw arm, wherein the second saw arm is movably coupled with the frame and configured to retain a second circular saw blade between the first circular saw blade and the second profiler head, and wherein the second saw arm is movable relative to the frame from a second profiling position, in which the second circular saw blade is in contact with or substantially abutting a respective side of the second profiler head, and one or more second splitting positions in which the second circular saw blade is spaced apart from the second profiler head along the arbor.

13. The splitter profiler module of claim 12, further including a first actuator coupled with the frame and the first saw arm assembly and a second actuator coupled with the frame and the second saw arm assembly, wherein the first actuator and the second actuator are actuable independently of one another to move the first saw arm assembly and the second saw arm assembly, respectively, relative to the frame to thereby move the respective circular saw blades along the arbor.

14. The splitter profiler module of claim 3, wherein the saw sleeve assembly further includes a stiffening ring, the stiffening ring and said first portion are configured to retain the circular saw blade therebetween, and a first side of the first profiler head has a recess dimensioned to accommodate the stiffening ring therein.

15. A system for processing a wood workpiece, wherein the workpiece is a log or a cant, the system comprising:
a splitter profiler module, wherein the splitter profiler module includes
a frame,
an arbor rotatably coupled with the frame,
a first profiler head and a second profiler head mounted along the arbor,
wherein the profiler heads are configured to chip the wood workpiece,
a first saw arm assembly movably coupled to the arbor and the frame, wherein the first saw arm assembly is configured to retain a first circular saw blade mounted along the arbor between the profiler heads, and the first saw arm assembly is selectively moveable relative to the frame to thereby move the first circular saw blade axially along the arbor, and wherein the first saw arm assembly includes a saw sleeve assembly with an opening configured to slideably engage the arbor, and
a first actuator coupled with the first saw arm assembly and the frame; and
a controller operatively coupled with the first actuator, wherein the controller is configured to control the actuator to move the first saw arm assembly between a profiling position and one or more splitting positions while the arbor is rotated,
wherein the first saw arm assembly is configured to hold the first circular saw blade in contact with, or close proximity to, a surface of the first profiler head while the first saw arm assembly is in the profiling position.

16. The system of claim 15, wherein the controller is configured to
identify one of said positions based at least on a cut solution or a cut pattern for the workpiece, and
send one or more control signals to cause the first actuator to reposition the circular saw to the identified position.

17. The system of claim 15, further comprising a pair of chip heads disposed upstream of the splitter profiler module, wherein the chip heads are configured to chip flat faces along corresponding portions of the workpiece.

18. The system of claim 15, wherein the first saw arm assembly is configured to hold the first circular saw blade within 2 millimeters away from said surface of the first profiler head while the first saw arm assembly is in the profiling position.

19. The system of claim 18, wherein the first profiler head is mounted to a first profiler arm, the second profiler head is mounted to a second profiler arm, the first saw arm assembly includes a first saw arm and the saw sleeve assembly is mounted to the first saw arm, and the first saw arm is disposed between the first profiler arm and the second profiler arm.

20. The system of claim 15, wherein the first profiler head is mounted to a first profiler arm, the second profiler head is mounted to a second profiler arm, the first saw arm assembly includes a first saw arm and the saw sleeve assembly is mounted to the first saw arm, and the first saw arm is disposed between the first profiler arm and the second profiler arm.

* * * * *